United States Patent [19]
Rakib et al.

[11] Patent Number: 5,793,759
[45] Date of Patent: Aug. 11, 1998

[54] APPARATUS AND METHOD FOR DIGITAL DATA TRANSMISSION OVER VIDEO CABLE USING ORTHOGONAL CYCLIC CODES

[75] Inventors: Selim Shlomo Rakib; Yehuda Azenkot, both of Cupertino, Calif.

[73] Assignee: Terayon Corporation, Santa Clara, Calif.

[21] Appl. No.: 588,650

[22] Filed: Jan. 19, 1996

Related U.S. Application Data

[63] Continuation-in-part of Ser. No. 519,630, Aug. 25, 1995.
[51] Int. Cl.[6] .......................... H04B 1/69; H04B 7/216; H04J 13/00
[52] U.S. Cl. .......................... 370/342; 370/441; 348/6; 455/3.1
[58] Field of Search .......................... 370/280, 329, 370/335, 336, 337, 341, 342, 345, 347, 350, 441, 442, 479, 503, 208, 206; 375/205, 206, 208, 257, 316; 455/3.1, 4.1, 6.1, 38.1; 348/6, 10, 12

[56] References Cited

U.S. PATENT DOCUMENTS

| | | | |
|---|---|---|---|
| 4,460,992 | 7/1984 | Gutleber . | |
| 4,470,138 | 9/1984 | Gutleber . | |
| 4,475,208 | 10/1984 | Ricketts | 375/1 |
| 4,553,161 | 11/1985 | Citta . | |
| 4,554,579 | 11/1985 | Citta . | |
| 4,635,274 | 1/1987 | Kubota | 375/1 |

(List continued on next page.)

FOREIGN PATENT DOCUMENTS

| | | |
|---|---|---|
| PCT/US95/04329 | 10/1995 | WIPO . |
| PCT/US95/10899 | 3/1996 | WIPO . |

OTHER PUBLICATIONS

R. De Gaudenzi et al., "Performance Evaluation of Quasi-Synchronous Code Division Multiple Access (QS-CDMA) for Satellite Mobile Systems," GLOBECOM '90: IEEE Global Telecommunications Conference. 1800–1804. (Apr. 1990).

R. Lupas et al., "Linear Multiuser Detectors for Synchronous Code Division Mulitple Access Channels," IEEE Transactions on Information Theory, vol. 35, Issue 1, pp. 123–136. (Jan. 1989).

*Primary Examiner*—Chi H. Pham
*Assistant Examiner*—Ricky Q. Ngo
*Attorney, Agent, or Firm*—Ron Fish; Falk & Fish LLP

[57] ABSTRACT

A method and apparatus for carrying out synchronous co-division multiple access (SCDMA,) communication of multiple channels of digital data over a shared transmission media such as a cable television system coaxial cable, a fiber optic or copper conductor telephone link, terrestial microwave, satellite link, local or wide area network, wireless including cellur network or some combination of these media using suitable interface circuitry. The system includes modems at remote units and a central unit to receive time division multiplexed digital data arranged into timeslots or channels and uses orthogonal codes to encode each channel of multiple data and spread the energy of each channel data over a frame of data transmitted in the code domain. Spreading the data this way makes the system less susceptible to impulse noise. Frames are synchronized as between remote and central units using a ranging scheme which is also useful in any other system transmitting data by frames in a distributed system where synchronizing the frames as between all units regardless of differences in propagation delays is necessary. Each frame in the SCDMA modulation scheme includes a gap or guardband containing no other data. The ranging process involves training each remote unit to impose enough delay prior to re-transmission of a barker code received from the CU such that a barker code sent by the RU arrives at the CU during the gap. The process of setting the delay in each RU is a trial and error process, and each RU starts the ranging process asynchronously. Contention resolution protocols such that only one RU is aligning to the gap at any particular time are taught.

27 Claims, 29 Drawing Sheets

U.S. PATENT DOCUMENTS

| | | | |
|---|---|---|---|
| 4,688,210 | 8/1987 | Eizenhofer et al. | 370/335 |
| 4,723,164 | 2/1988 | Nienaber | 358/148 |
| 4,748,681 | 5/1988 | Schmidt | 455/33 |
| 4,757,468 | 7/1988 | Bione et al. . | |
| 4,773,066 | 9/1988 | Kirkman et al. . | |
| 4,811,365 | 3/1989 | Manno | 375/107 |
| 4,912,721 | 3/1990 | Pidgeon, Jr. et al. | 375/1 |
| 4,926,130 | 5/1990 | Weaver | 328/14 |
| 4,933,930 | 6/1990 | Lien et al. | 370/18 |
| 5,090,024 | 2/1992 | Vander Mey et al. | 375/1 |
| 5,193,094 | 3/1993 | Viterbi . | |
| 5,224,122 | 6/1993 | Bruckert | 375/1 |
| 5,231,664 | 7/1993 | Bestler et al. . | |
| 5,233,630 | 8/1993 | Wolf . | |
| 5,235,615 | 8/1993 | Omura . | |
| 5,235,619 | 8/1993 | Beyers, II et al. . | |
| 5,239,557 | 8/1993 | Dent . | |
| 5,280,472 | 1/1994 | Gilhousen et al. . | |
| 5,295,152 | 3/1994 | Gudmundson et al. | 375/1 |
| 5,297,162 | 3/1994 | Lee et al. . | |
| 5,305,308 | 4/1994 | English et al. | 370/32.1 |
| 5,309,474 | 5/1994 | Gilhousen et al. . | |
| 5,313,454 | 5/1994 | Bustini et al. | 370/13 |
| 5,319,634 | 6/1994 | Bartholomew et al. . | |
| 5,325,394 | 6/1994 | Bruckert | 375/1 |
| 5,327,455 | 7/1994 | De Gaudenzo et al. . | |
| 5,345,439 | 9/1994 | Marston | 370/18 |
| 5,345,472 | 9/1994 | Lee . | |
| 5,347,304 | 9/1994 | Moura et al. | 348/12 |
| 5,353,300 | 10/1994 | Lee et al. . | |
| 5,359,624 | 10/1994 | Lee et al. . | |
| 5,363,403 | 11/1994 | Schilling et al. . | |
| 5,363,404 | 11/1994 | Kotzin et al. | 370/352 |
| 5,373,502 | 12/1994 | Turban . | |
| 5,390,166 | 2/1995 | Rohani et al. | 370/335 |
| 5,394,391 | 2/1995 | Chen et al. . | |
| 5,398,258 | 3/1995 | Su et al. | 375/200 |
| 5,404,570 | 4/1995 | Charas et al. | 455/22 |
| 5,414,699 | 5/1995 | Lee . | |
| 5,416,797 | 5/1995 | Gilhousen et al. . | |
| 5,418,813 | 5/1995 | Schaffner et al. | 375/205 |
| 5,425,027 | 6/1995 | Baran | 370/69.1 |
| 5,440,585 | 8/1995 | Partridge, III | 375/261 |
| 5,442,625 | 8/1995 | Gitlin et al. . | |
| 5,442,627 | 8/1995 | Viterbi et al. | 370/22 |
| 5,442,662 | 8/1995 | Fukasawa et al. . | |
| 5,442,700 | 8/1995 | Snell et al. | 380/15 |
| 5,448,555 | 9/1995 | Bremer et al. | 370/20 |
| 5,452,328 | 9/1995 | Rice | 375/210 |
| 5,463,668 | 10/1995 | Fukasawa et al. . | |
| 5,467,342 | 11/1995 | Logston et al. | 370/17 |
| 5,481,533 | 1/1996 | Honig et al. | 375/206 |
| 5,488,412 | 1/1996 | Majeti et al. | 348/10 |
| 5,511,067 | 4/1996 | Miller | 370/18 |
| 5,512,935 | 4/1996 | Majeti et al. | 348/9 |
| 5,533,013 | 7/1996 | Leppanen | 370/206 |
| 5,534,913 | 7/1996 | Majeti et al. | 348/7 |
| 5,539,730 | 7/1996 | Dent | 370/320 |
| 5,557,316 | 9/1996 | Hoarty et al. | 348/7 |
| 5,583,853 | 12/1996 | Giallorenzi et al. | 370/441 |
| 5,586,121 | 12/1996 | Moura et al. | 370/404 |
| 5,594,872 | 1/1997 | Kawano et al. | 395/200.15 |
| 5,608,446 | 3/1997 | Carr et al. | 348/6 |
| 5,608,728 | 3/1997 | Ulm et al. | 370/488 |
| 5,619,531 | 4/1997 | Taylor et al. | 375/222 |

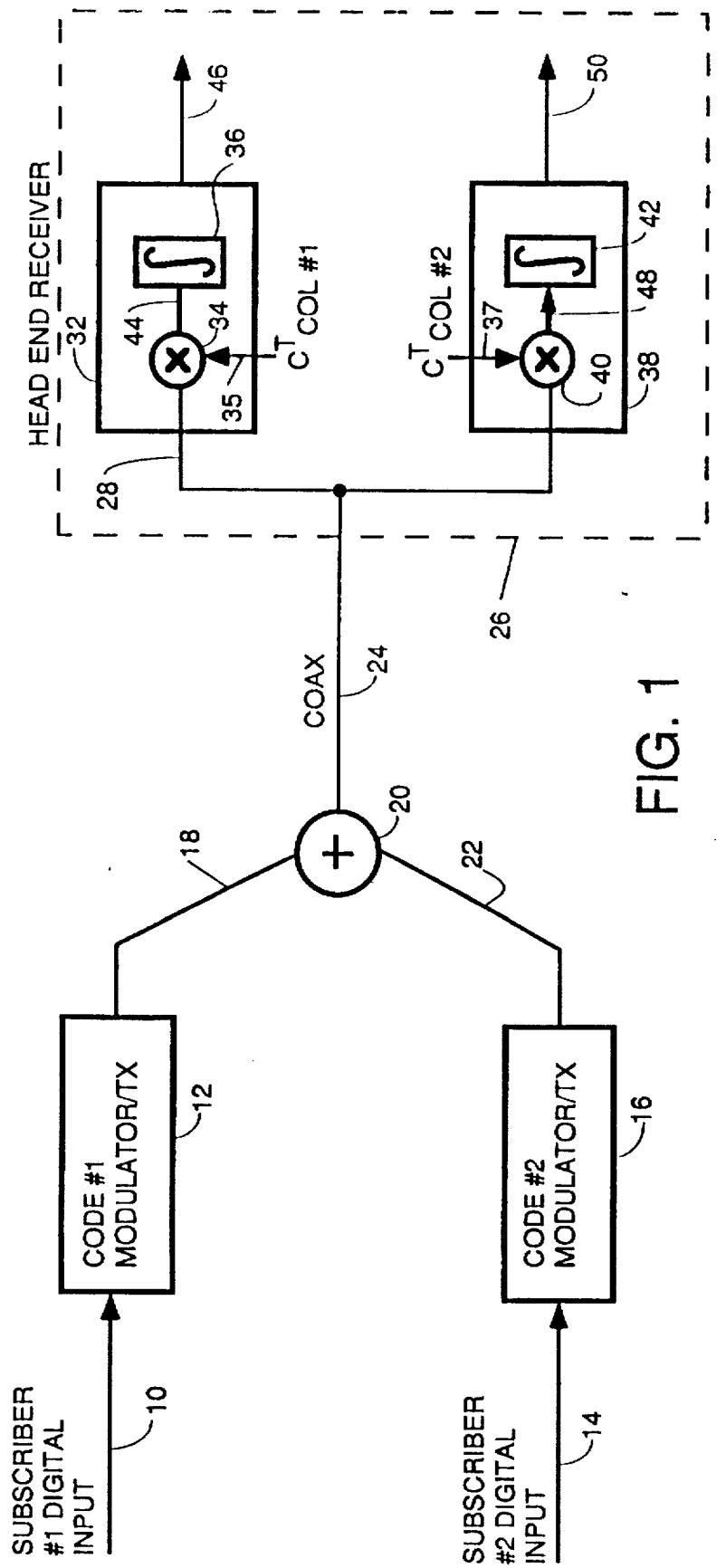

CODE 1 = $[1, 1]$
CODE 2 = $[1, -1]$

FIG. 3B

$$C = \begin{bmatrix} \frac{1}{\sqrt{2}} & \frac{1}{\sqrt{2}} \\ \frac{1}{\sqrt{2}} & \frac{-1}{\sqrt{2}} \end{bmatrix}$$

CODE #1, CODE #2

FIG. 3C

USER 1 FIRST FRAME DATA = 1

USER 2 FIRST FRAME DATA = -1

FIG. 3D

INFORMATION VECTOR FOR FIRST FRAME = $\beta$ = $[1, -1]$

FIG. 3E

COMBINED SIGNAL TO TRANSMIT DURING FIRST FRAME $$R = B \cdot C = \overset{B}{[1, -1]} \overset{C}{\begin{bmatrix} \frac{1}{\sqrt{2}} & \frac{1}{\sqrt{2}} \\ \frac{1}{\sqrt{2}} & \frac{-1}{\sqrt{2}} \end{bmatrix}}$$

$$= \left[ \left(\frac{1}{\sqrt{2}} + \frac{-1}{\sqrt{2}}\right), \left(\frac{1}{\sqrt{2}} + \frac{1}{\sqrt{2}}\right) \right] = R$$

$$= \left[ 0, \frac{2}{\sqrt{2}} \right] = R$$

TRANSMIT SIDE MATRIX MULTIPLICATION

FIG. 3F $$R \cdot C^T = \overset{R}{\left[ 0, \frac{2}{\sqrt{2}} \right]} \cdot \overset{C^T}{\begin{bmatrix} \frac{1}{\sqrt{2}} & \frac{1}{\sqrt{2}} \\ \frac{1}{\sqrt{2}} & \frac{-1}{\sqrt{2}} \end{bmatrix}} = \left[ \left(0 + \frac{2}{2}\right), \left(0 + \frac{-2}{2}\right) \right]$$

$$= [1, -1]$$

RECOVERED [B] AT RECEIVER = [1, -1]

FIG. 3G

GENERAL RANGING PROCESS

DEAD RECKONING RE-SYNC

PRECURSOR EMBODIMENT

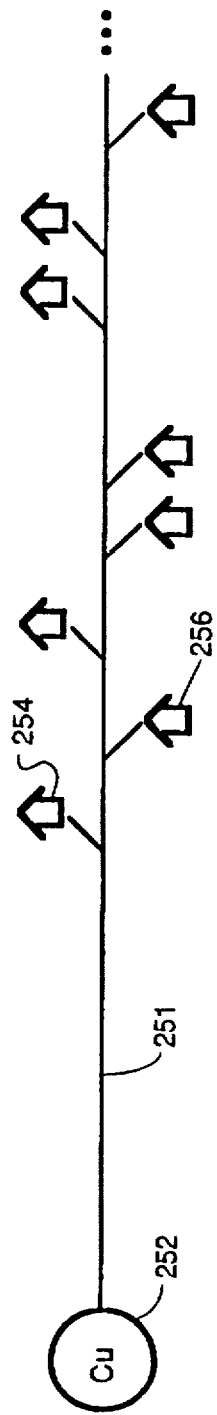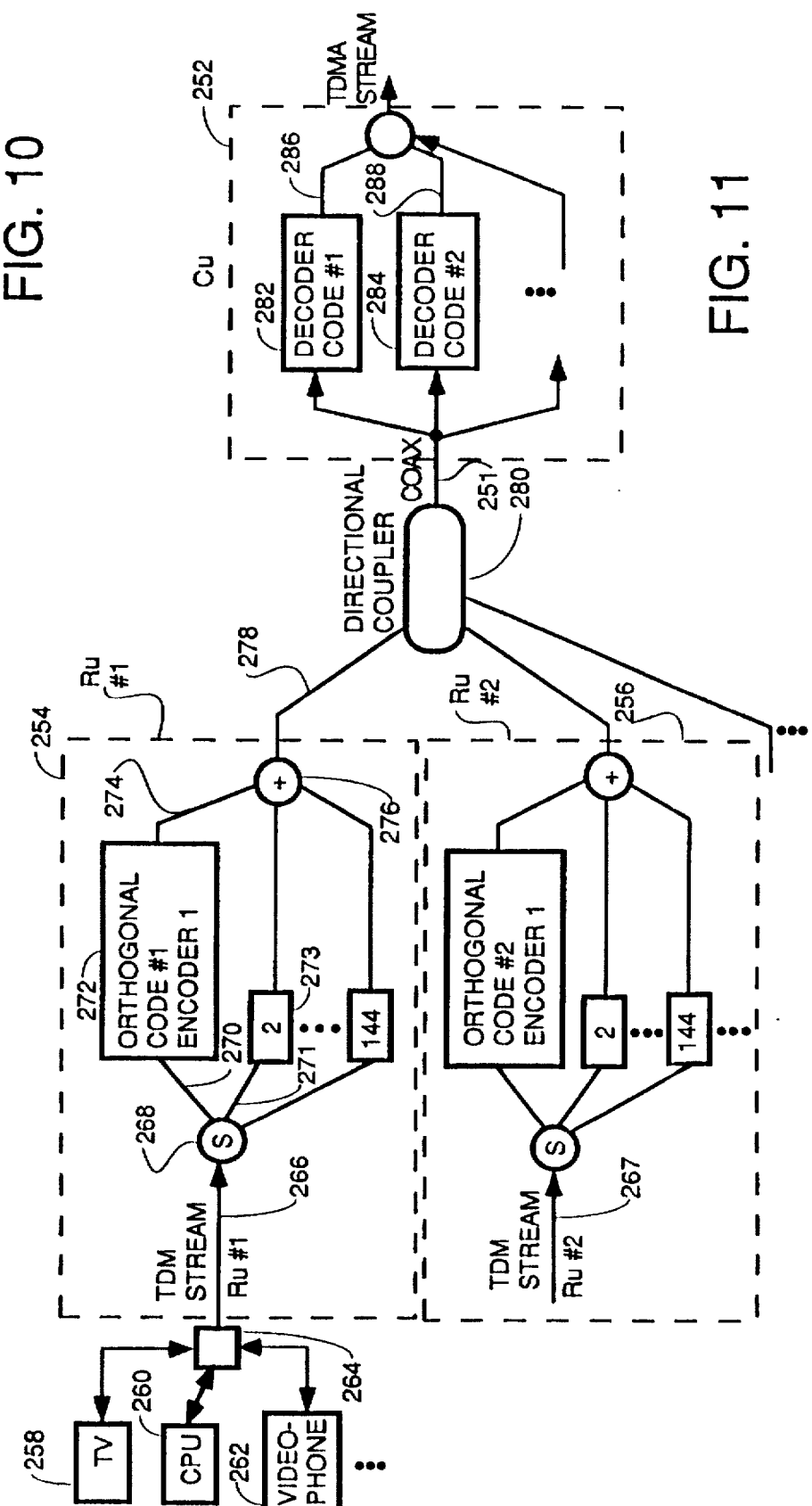
FIG. 10
FIG. 11

| CODE | INPHASE | QUADRATURE | |
|---|---|---|---|
| 0000 | 111 | 111 | = -1 - j |
| 0001 | 001 | 111 | = 1 - j |
| 0010 | 001 | 001 | = 1 + j |
| 0011 | 111 | 001 | = -1 + j |
| 0100 | 011 | 111 | = 3 - j |
| 0101 | 001 | 011 | = 1 + 3*j |
| 0110 | 101 | 001 | = -3 + j |
| 0111 | 111 | 101 | = -1 - 3*j |
| 1000 | 011 | 011 | =+3 + 3*j |
| 1001 | 101 | 011 | = -3 + 3*j |
| 1010 | 101 | 101 | = -3 - 3*j |
| 1011 | 011 | 101 | = 3 - 3*j |
| 1100 | 111 | 011 | = -1 + 3*j |
| 1101 | 101 | 111 | = -3 - j |
| 1110 | 001 | 101 | = 1 - 3*j |
| 1111 | 011 | 001 | = 3 + j |

INFORMATION VECTOR [B] FOR EACH SYMBOL $$\begin{matrix} 483 \\ 481 \end{matrix} \begin{bmatrix} 0 & 1 & 1 & 0 \\ 1 & 1 & 1 & 1 \\ 1 & 1 & 0 & 1 \\ 0 & 1 & 0 & 0 \\ \vdots & & & \end{bmatrix} \times \begin{bmatrix} c_{1,1} & c_{1,2} & \cdots & c_{1,144} \\ c_{2,1} & c_{2,2} & \cdots & c_{2,144} \\ \vdots & \vdots & & \vdots \end{bmatrix}$$

ORTHOGONAL CODE MATRIX

FIG. 23A

REAL PART OF INFO VECTOR [b] FOR FIRST SYMBOL

REAL PART OF RESULT VECTOR $$405 \begin{bmatrix} +3 \\ -1 \\ -1 \\ +3 \end{bmatrix} \cdot \begin{bmatrix} 1 & 1 & 1 & 1 \\ -1 & -1 & 1 & 1 \\ -1 & 1 & -1 & 1 \\ -1 & 1 & 1 & -1 \end{bmatrix}_{407} = \begin{bmatrix} 4 \\ 0 \\ 0 \\ -8 \end{bmatrix} 409$$

$$[b_{REAL}] \times [CODE\ MATRIX] = [R_{REAL}] = \text{"CHIPS OUT" ARRAY-REAL}$$

FIG. 23B

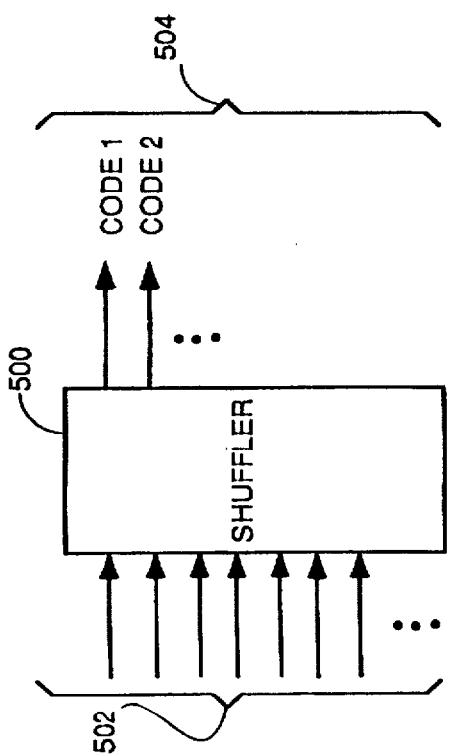
FIG. 27
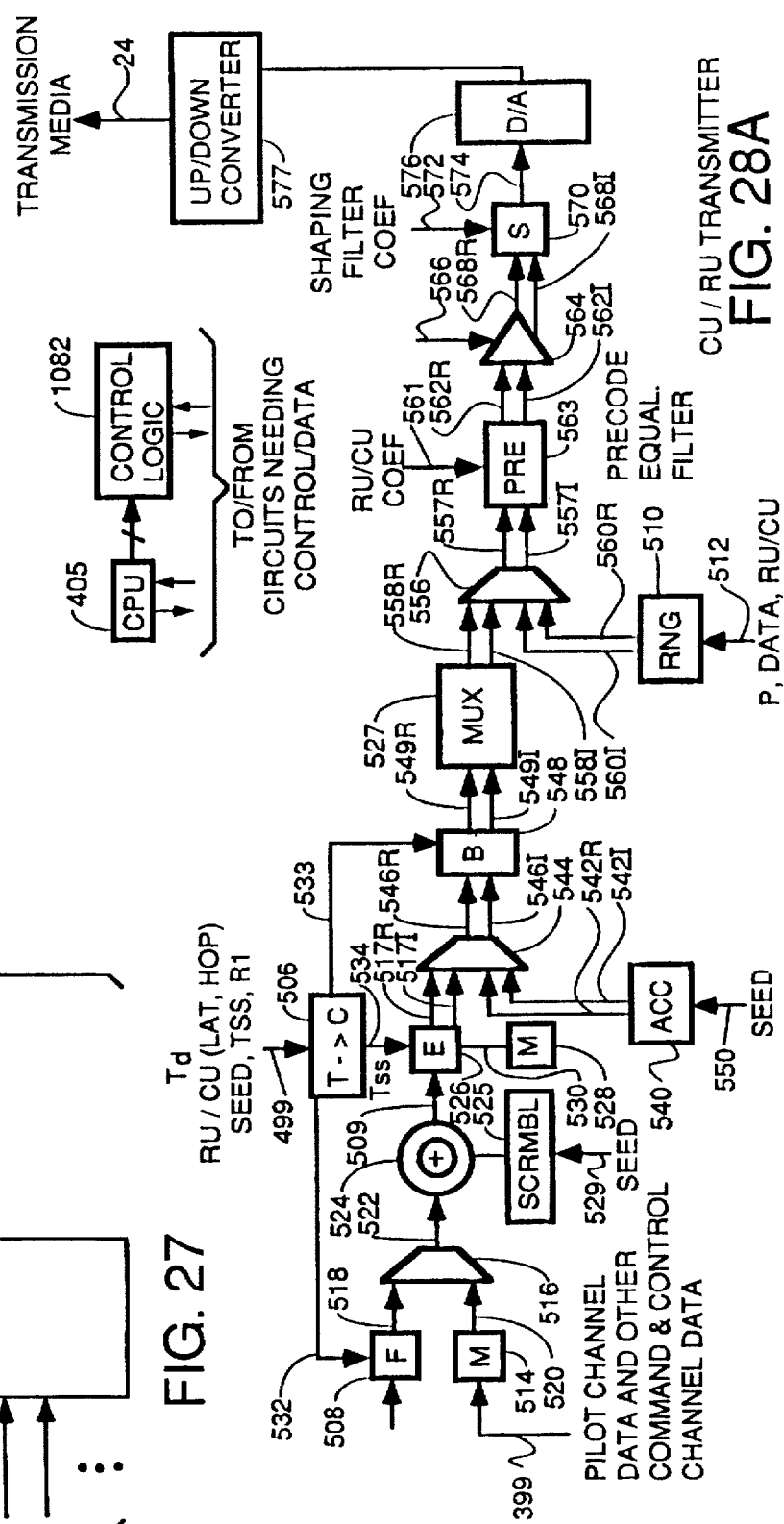
FIG. 28A CU/RU TRANSMITTER

RU RANGING

RANGING AND CONTENTION RESOLUTION
CU SIDE

RANGING - RU SIDE
BINARY TREE
ALGORITHM

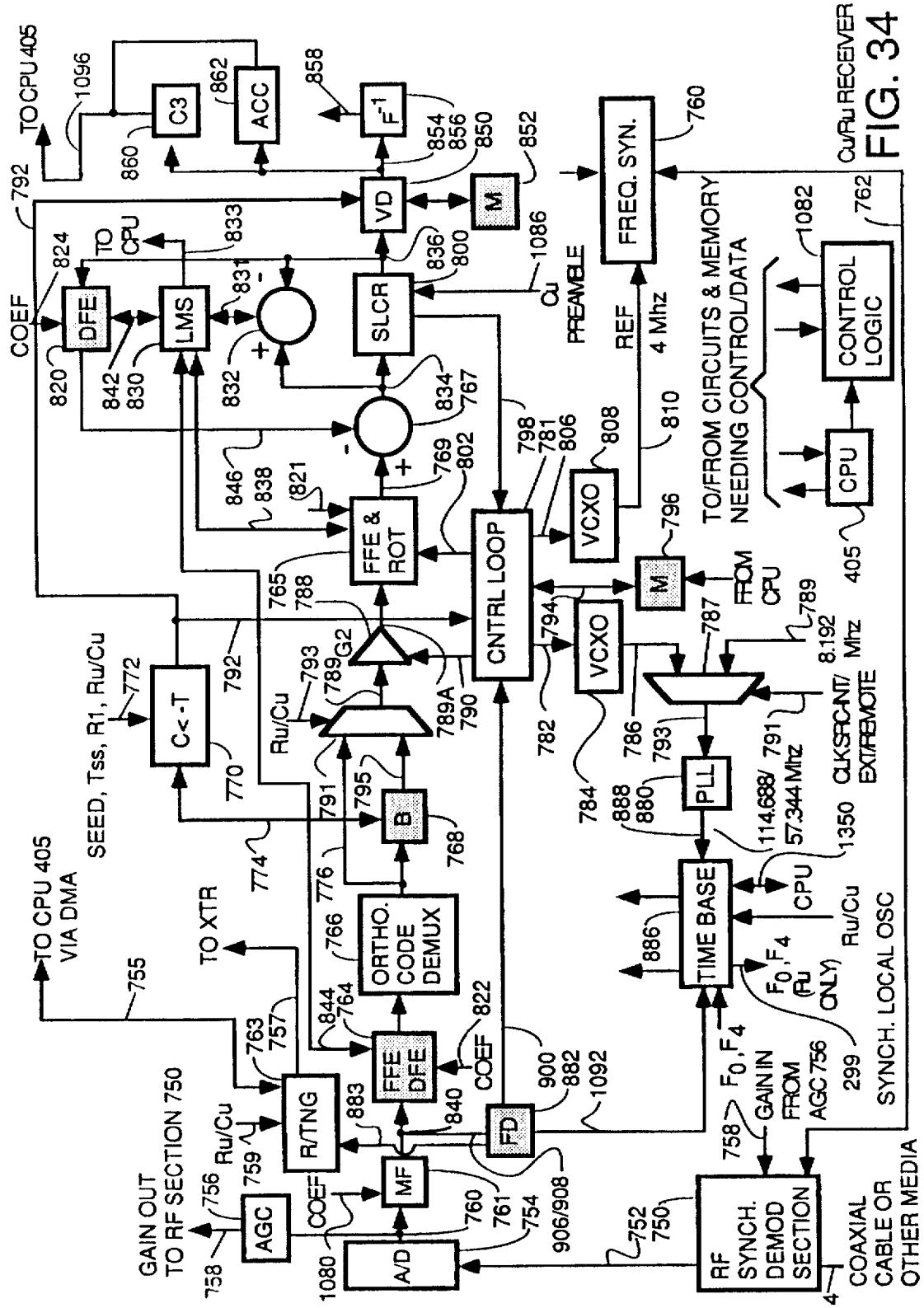

APPARATUS AND METHOD FOR DIGITAL DATA TRANSMISSION OVER VIDEO CABLE USING ORTHOGONAL CYCLIC CODES

This application is a continuation-in-part application of U.S. Ser. No. 08/519,630, filed Aug. 25, 1995, invented by Shlomo Rakib and Yehuda Azenkot.

FIELD OF THE INVENTION

The invention pertains to the field of bidirectional communication of digital data over coaxial cable or other transmission media. More particularly, the invention pertains to the field of provision of multiple channels of digital data including interactive TV services, digital telephony, video teleconferencing, video on demand, internet access at 10 megabit/second or media data rates etc., all provided to home or business establishments over cable TV coax or combinations of coaxial cable, fiber optic links, microwave or satellite links or other wireless systems using synchronous CDMA modulation.

BACKGROUND OF THE INVENTION

In order to provide bidirectional digital data communication over a cable TV coaxial network to multiple subscribers with multiple services available over a single coax cable (hereafter called interactive systems), several problems have to be solved. First, there is the problem of noise and interference. A second major problem, but related to the first problem, is synchronization of data transmission so that effective, error-free communication can be achieved. Cable networks typically involve a so-called head end or central unit from which video is transmitted to subscribers coupled to one or more main trunk lines from which extend numerous branch lines which may enter subscriber homes or which may couple to other branch lines. At each junction of a branch line to the trunk line or another branch line there is a directional coupler which is intended to direct transmissions from the head end to the subscribers in one direction and to direct transmissions from the subscribers back to the head end without leaking energy intended for transmission to the head end into branch lines coupled to other subscribers. In order to send digital data over video coax, a modem is necessary at both the head end and at all the subscriber locations to modulate digital data onto the coax as RF signals, and to receive RF signals carrying digital data and derive the digital data therefrom. Because RF signals are propagating along the cables, and because the couplers are not perfect, reflections occur at the directional couplers that cause noise and interference. This is because the reflections are frequently of the opposite polarity depending upon the impedance mismatch and the distances involved. These reflections are therefore sometimes additive and sometimes subtractive, thereby resulting in random variations in the amplitudes of the RF signals. These random variations make discrimination during the demodulation process to derive the digital data more difficult.

Further, because the subscribers are at physically different distances from the head end, the signals from each subscriber's modem arrive at the head end at different times because of different propagation delays. Because digital data is transmitted in frames and because all subscribers must be synchronized to the same frame timing, these different propagation delays for each subscriber cause problems in synchronizing data.

In the typical interactive system, there are bidirectional amplifiers. Each amplifier has two channels, one of which amplifies signals in a high frequency range from 45-750 mHz for transmission of data from the head end to subscribers, and the other of which amplifies signals in a low frequency range from 5-42 mHz for transmission of data from the subscribers to the head end. When the operating frequency is close to the edges of either the high or low band, group delay distortion can result in another impairment to noise free bidirectional communication.

Other forms of linear impairment result from the fact that the bandpass filters in the system do not have perfectly flat amplitude characteristics for their transfer functions across the entire passband, especially at the corner frequencies.

Other forms of impairments are so-called additive impairments resulting from taps on the system which are not properly terminated. These taps act as antennas and pick up broadcast signals from FM stations, CB radios, HF communication etc. Other sources of noise are impulse signals resulting from arcing in electrical appliances near taps. Arcing generates white noise type RF energy that is splattered across all bands and is radiated much like lightening. In addition, the amplifiers in the interactive system can sometimes break into oscillation thereby creating noise. Further the horizontal and vertical oscillators in television sets in the subscriber's household also can radiate RF interference signals. These sources of interference are a major contributor to noise in the system.

The collection of impairments described above are referred to as linear impairments because the system has a linear transfer function so that in the Fourier domain, all the impairment effects are additive.

In addition to the linear impairments, there also exist nonlinear impairments such as second and third order harmonics generated by the nonlinear junctions of transistors in the amplifiers in the system. When multiple sinusoidal signals arrive at the amplifiers, beat frequencies are generated in addition to the harmonics of the arriving signals because the nonlinear junctions act like mixers.

Other forms of nonlinear impairment are hum from saturation of magnetic cores of transformers in the amplifiers resulting from 60 volt, 60 Hertz AC square wave pulses sent to the amplifiers over the coax to supply the amplifiers with power. The amplifiers have rectifiers that rectify this square wave signal to derive power therefrom and this process generates noise in the form of hum. This hum is caused by amplitude modulation of the power supply signal resulting from the placement of the operating point on the hysteresis curve of the rectifier transformers.

Interactive systems typically involve in excess of one hundred different channels on which separate digital data streams can flow in addition to the separate channels on which the video signals are provided for normal cable TV service. To send digital data as RF signals, very complex constellations of separate amplitude and phase combinations are used to encode the digital characters being transmitted. Because of the large number of data points, the differences in phase and amplitude between the different points are not large. Therefore, the impairments described above can cause errors by causing misinterpretation by demodulators of what characters were actually sent.

There is only one conductive path between the head end and the subscribers that must be shared by all the subscribers to send and receive digital data. One approach that has been tried in prior art interactive cable TV systems is time division multiple access sharing (TDMA) with quadrature phase shift keying (QPSK) modulation schemes. In a TDMA system, each subscriber gets a short assigned time slot in which to transmit data to the head end. The TDMA approach has shortcomings in that it causes difficulty and complexity in achieving "alignment". Alignment refers to the proper timing of each subscriber's transmissions so that they arrive during the appropriate time slot at the head end despite the fact that the signals from each subscriber have different propagation times. Alignment in TDMA multiple access schemes is critical, and achieving it is difficult.

Another difficulty with the TDMA approach is the high susceptibility of QPSK modulation to narrowband interference. Narrowband interference results when a signal like Voice of America or a harmonic which has a bandwidth similar to the bandwidth of the channels upon which digital data is being transmitted enters the transmission media. Typically this happens at a tap which is not properly terminated. Narrowband interference adversely affects the receiver circuits and the alignment circuits that achieve synchronization of all the sources.

The use of TDMA schemes also complicates the alignment problem in the presence of narrowband interference and other noise because there is such a short time for synchronization. Synchronization of the head end to all the subscribers is necessary so that the clock signal and other reference signals such as the carrier can be recovered from the transmitted signals without being separately transmitted. These recovered signals are critical to proper operation of the system in demodulating the transmitted data. Narrowband interference also adversely affects the decision making circuits that decipher which characters have been transmitted thereby increasing the error rate. Increased error rate requires more bandwidth to be consumed in retransmitting data and wastes processing power in detecting and correcting errors and retransmitting data with errors that are beyond the correction range of the ECC bits transmitted with the data.

Also, because in TDMA schemes the timeslots are very short, TDMA systems are susceptible to loss of data caused by long bursts of noise. Typical bursts of impulse noise are quite long relative to the length of the TDMA timeslots. Long bursts often wipe out entire groups of timeslots thereby requiring retransmission of all the data in these timeslots. Modulation and multiple access schemes that spread out the energy of transmitted data over longer times, such as FDMA schemes, are less susceptible to this type of burst noise. However, FDMA schemes have other drawbacks.

QPSK modulation used in TDMA schemes is also not the most efficient modulation scheme in terms of spectral efficiency, i.e., speed of transmission in bits/second/Hertz over a given bandwidth. However, QPSK modulation is used because it has a sufficiently large distance between points in the constellation to maintain relatively good noise immunity. Noise immunity refers to the ability of a system to achieve a certain bit error rate that is deemed to be tolerable for a given signal to noise ratio. If the signal to noise ratio decreases for a given noise immunity characteristic, the bit error rate will rise.

Typically, channel bandwidths are 6 mHz, and spectral efficiency of 27 megabits/second/Hertz is desired. Therefore, a data transfer rate of $162 \times 10^{12}$ is achievable over one channel at this typical spectral efficiency and bandwidth. However spectral efficiency for QPSK modulation is on the order of 1 bits/second/Hertz or less so this modulation scheme is too slow for high traffic volume applications such as video on demand, video teleconferencing etc.

Another approach that has been tried in the prior art is frequency division multiple access (FDMA). In FDMA, each subscriber transmits data on a different carrier frequency as opposed to at a different time in TDMA. FDMA schemes suffer from different drawbacks than TDMA schemes. Because there are multiple carriers in FDMA schemes, there are more intermodulation products in the received signals. These intermodulation products can coherently add to each other thereby causing peaks in amplitude which are far greater than the average signal. This causes difficulty in designing analog circuits with adequate ranges of linearity to handle these signals without clipping the peaks. These peaks often penetrate into the nonlinear or saturation range of operation of analog circuits in the system exposed to these signals thereby introducing nonlinearities. Even without these nonlinearities, the intermodulation components tend to cause crosstalk between adjacent channels which increases the error rate.

FDMA schemes are also sensitive to narrowband interference signals that suddenly appear causing unanticipated "jamming" of one or more channels thereby causing long bursts of errors. FDMA channels are narrow, and claims have been made that because of this fact narrowband interference can be avoided. However, narrowband interference is dynamic, because there are multiple sources thereof at different frequencies. As a result, narrowband interference signals can suddenly "pop up" when a subscriber turns on his or her TV or when Voice of America starts broadcasting. This sudden pop-up interference can jam a channel thereby causing error bursts.

Therefore, a need has arisen for a method and apparatus that can support interactive digital systems that eliminates some of these drawbacks.

SUMMARY OF THE INVENTION

According to the teachings of the invention, there is provided a code division multiplexing multiple access (CDMA) scheme using orthogonal codes to encode multiple channels of digital data for simultaneous transmission over a cable television media which is also carrying frequency division multiplexed cable television programming. Further, in the preferred embodiment, alignment of multiple subscriber remote units at diverse locations on the cable television media to the same frame alignment is used to substantially reduce crosstalk between adjacent codes. Any of the known ways of achieving frame alignment may be used to achieve synchronous code division multiple access data transmission. In the preferred embodiment, frame alignment is achieved by alignment of timing signals transmitted by remote units to guardbands or gaps between frames.

One inventive concept disclosed herein is to achieve high noise immunity by spreading the energy of the transmitted data out over time during transmission, and then compressing the energy again at the receiver to recover the data. Spreading the energy of the transmitted data out over time reduces susceptibility to burst errors and impulse noise. In addition to this spreading concept, the spectral efficiency of the system is enhanced by transmitting multiple separate channels of data over the same media without interference by using separate orthogonal codes to encode the data of each channel so that no interference results when all channels are simultaneously transmitted so long as proper frame alignment is maintained. In this way, the spectral efficiency, i.e., a measure of the amount of data that can be sent from one place to another over a given bandwidth, is enhanced without degradation of the data by crosstalk interference.

The orthogonality of the codes used for each data stream minimizes crosstalk between data streams where the system is properly aligned, i.e., synchronized, and, using cyclic, orthogonal codes further enhances noise abatement by providing the ability to perform equalization. Equalization, as that term is used herein, refers to the process of determining the amount of crosstalk between adjacent codes resulting from minor errors of frame timing alignment and then generating signals which can be used to negate the crosstalk. In the preferred embodiment, the orthogonal codes are cyclic codes.

In some species within the genus of the invention, code diversity is used to achieve further noise immunity. It has been found that some orthogonal codes are less immune to narrow band interference and other sources of noise than others. To avoid using such codes to spread the data from the same channel or timeslot all the time, code hopping is used in these preferred species of the inventive genus. Code diversity is achieved in several different ways, but, in the preferred embodiment, each transmitter uses a code shuffler circuit and each receiver uses a code deshuffler circuit. All shuffler and deshuffler circuits receive the same seed and generate the same sequence of pseudorandom numbers therefrom. These pseudorandom numbers are used to generate read pointers to a framer memory and write pointers to a buffer memory. The framer memory is where the information vectors or symbols are stored, and the read pointers generated by the shuffler circuits are used to read the timeslot data, i.e., symbol/information vector elements out in pseudorandom fashion and store them in a buffer in accordance with the write pointers generated by the code hopping shuffler circuit. The information vector elements thus stored in the buffer are used to do the matrix multiplication required by the code division multiplexing scheme. Alternatively, the symbol elements may be read out sequentially from the framer memory and stored pseudorandomly in the buffer.

The effect of this synchronous CDMA scheme is to "whiten" the noise sources such that no matter how complex the noise signals, the noise can be effectively managed using conventional error detection and correction bits. In other words, the digital data providing the interactive or bidirectional data communication is sent using a CDMA scheme, but for purposes of synchronization, the CDMA scheme is mixed with a TDMA scheme. More precisely, a guardband free of data is added to the CDMA signal. Digital data is transmitted in frames, each frame comprising 3 data symbols and a guardband. The guardband is used for non-data usage such as ranging, alignment and equalization.

The synchronous CDMA modulation scheme disclosed herein may be used with any shared transmission media and with any apparatus or method that can get all remote units synchronized to the frame timing of the central unit including the ranging/alignment scheme disclosed herein. Other possible methods of synchronizing to the same frame timing are for all remote units and the central unit to receive the same timing reference signals from some source such as internal atomic clocks or from an external source such as a Global Positioning System satellite from which all remote units and the central unit are effectively equidistant.

Likewise, the ranging/alignment scheme disclosed herein is useful for any other modulation scheme which transmits digital data in frames, requires frame synchronization and can insert a guardband between the frames.

Some species within the inventive genus use M-ary modulation code division multiplexing. Each remote unit receives a time division multiplexed stream of digital data. Each timeslot contains 9 bits of data. Each 9 bits is stored in a framer memory, and is divided into three tribits, each having 3 bits during readout of the memory. Each of the three symbols transmitted each frame is comprised of 144 of these tribits, one for each timeslot or channel. These tribits are encoded with a 4th bit prior to spreading by the code division multiplexing operation. The 4th bit is added to each tribit based upon the three bits of the tribit and based upon the previous state for this timeslot's data during the last frame. This 4th bit adds sufficient redundancy to enable a Viterbi Decoder in the central unit receiver to make a more error free determination of what data was actually sent in the presence of noise. The 4th bit also maps each tribit to a 16 point QAM (quadrature amplitude modulation) constellation by using the first two bits to represent the inphase or I axis amplitude and the last two bits to represent the quadrature or Q axis amplitude. Thus, M-ary modulation is used to achieve greater spectral efficiency.

Any method or apparatus that uses these inventive concepts is within the teachings of the invention and is deemed to be equivalent to the apparatus and methods described herein.

BRIEF DESCRIPTION OF THE DRAWINGS

FIG. 1 is a block diagram of a general system according to the genus of the invention for simultaneous transmission of digital data from multiple subscribers to a head end receiver over a shared coaxial cable using orthogonal codes and for recovery of the separate data streams from each subscriber at the head end receiver.

FIG. 2 is the mathematical relationship that defines the property of orthogonality of the codes used by the modulator/transmitters in FIG. 1.

FIG. 3A is the mathematical relationship that the system of FIG. 1 uses to recover the individual data streams sent by the subscribers at the head end and vice versa, and FIGS. 3B through 3G illustrate a specific working example of how the mathematical relationship of FIG. 3A could be used to transmit two channels of data simultaneously over the same shared media.

FIG. 10 shows a typical cable television system arrangement in which the teachings of the invention find utility in a multi-RU, multichannel environment where the head end at the location of the CU sends FDMA cable television programming to television sets at the locations of the Rus and the Rus and Cus simultaneously communicate multiple channels of digital data over the same CATV coax using a combination of TDMA/CDMA and FDMA in some embodiments.

FIG. 11 is a block diagram of one general multichannel embodiment for the internal structure of each RU modem's transmit channel circuitry for transmitting data to the CU and a general structure for a CU to recover the data and illustrating how multiple external devices send data to each RU in TDMA streams.

FIG. 13 also shows a number of other signals generated by time base generator 350 in FIG. 12.

FIG. 23A illustrates how the information vector [b] for each symbol has its energy spread over time by the process of code division multiplexing implemented using matrix multiplication of the information vector [b] of each symbol times a matrix of orthogonal codes.

FIG. 23B is another illustration of the matrix multiplication process carried out in encoder 402 in FIG. 19 to encode the real or I coordinates of each information vector using an orthogonal code matrix to generate the real or I coordinates of a result vector for use by the QAM modulator.

FIG. 27 is a general block diagram illustrating a shuffler circuit useable in some embodiments to achieve code diversity.

FIG. 28A is a block diagram of the preferred embodiment of a transmitter within the inventive genus of the invention using bit parsing from each timeslot, TDMA/CDMA spreading, M-ary QAM modulation, code diversity, encoding of each tribit with redundant bits for forward error correction and to aid Viterbi Decoding in the receiver, scrambling of bits of each tribit for security and signal to noise improvements, ranging according to the preferred species and equalization circuitry.

FIG. 34 is a block diagram of the preferred species of a receiver within the inventive genus which can receive data transmitted by the transmitter of FIG. 28A and supports TDMA/CDMA spreading, code deshuffling supporting code diversity, forward error correction, equalization, and Viterbi Decoding.

DETAILED DESCRIPTION OF THE PREFERRED EMBODIMENT

Figure 4A:
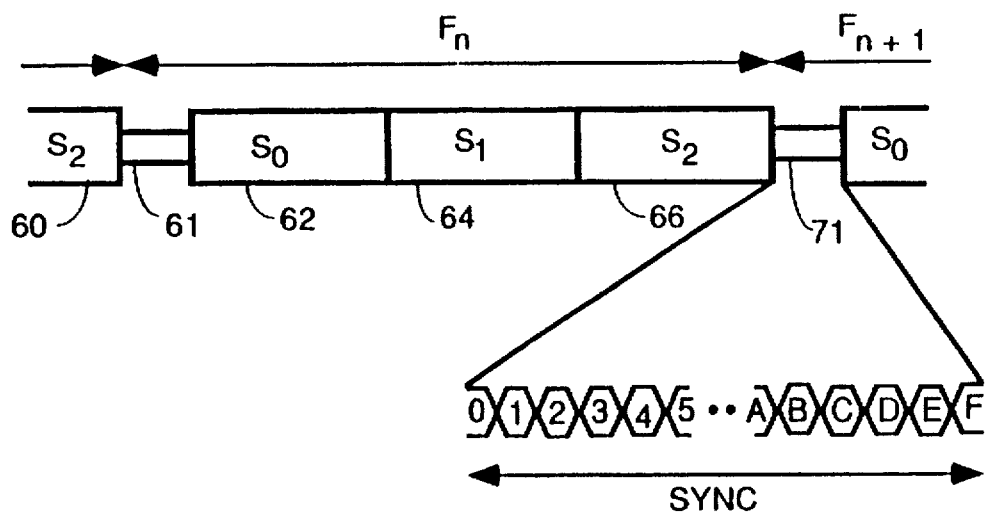
FIG. 4A shows a typical data structure for a frame.

Code Division Multiple Access System For CATV Media

Referring to FIG. 1, there is shown a conceptual diagram of a system for multiple access digital communication over a cable TV coaxial conductor distribution system using orthogonal codes for CDMA. The system of FIG. 1 depicts only the circuitry to transmit data from multiple subscribers to a head end receiver. Similar circuitry to transmit data from the head end back to the subscribers exists but is not shown for simplicity. The details of how to design circuits to carry out the various functions described herein are known in the art including the excellant treatise, Dixon, "Spread Spectrum Systems with Commercial Applications", Third Edition, 1994 (Wiley & Sons, New York), the entirety of which is hereby incorporated by reference.

FIG. 2 is the mathematical relationship that defines the property of orthogonality of the codes used by the modulator/transmitters in the system. The codes used in modulator/transmitters 12 and 16 are orthogonal if the summation of the product thereof over time from 0 to T is equal to 1 if the codes are the same code, i.e., if i=j where i=code #1 and j=code #2, but is zero if i is not equal to j. In other words, if the codes are different and orthogonal, the summation of the products of the signals modulated by these orthogonal codes is zero, meaning that signals modulated by the different orthogonal codes can travel over the same conductor without interference and without crosstalk. There is more that one set of orthogonal codes, but any orthogonal code will suffice to practice this aspect of the teachings of the invention.

FIG. 3A is the mathematical relationship which the system of FIG. 1 uses to send multiple channels of digital data over the same conductor without interference between channels. [b] in FIG. 3A represents an information vector that contains a symbol to be transmitted on each channel as a vector element. [c] represents a code matrix having the unique orthogonal code for each channel as its columns. $[c^T]$ represents the transpose matrix of the code matrix [c] where each column of [c] becomes a row of $[c^T]$. Finally, [i] represents the identity matrix where all entries are zeroes except for a line of 1's along the diagonal. In FIG. 1 to be described below, the matrix multiplication [b]×[c] is the processing that occurs on the transmit side of each transmission. The processing that occurs on the receiver side of the transmission is a matrix multiplication of the transpose matrix $[c^T]$ times the signals generated on the transmit side by the multiplication of the information vector [b] times the code matrix [c] to yield a matrix representing the product [b]×[i]. Because the identity matrix is known, the product [b]×[i] allows recovery of the information vector [b].

To utilize these mathematical relationships of FIGS. 2 and 3A and convert them into a practical digital data communication system, symbolized by the system of FIG. 1, subscriber #1 provides a digital input stream of symbols or bits using any input device or computer (not shown). This digital data stream to be transmitted to the head end arrives on bus 10 at the data input of a code #1 modulator/transmitter 12. This digital data stream will be divided into individual symbols transmitted at the rate of three symbols/frame in the preferred embodiment. The teachings of the invention can be employed using symbols, data bytes or any other grouping of digital data. The first bit from the stream on bus 10 will be the first vector element in the information vector [b]. For the sake of simplicity, the manner in which symbols are formed from the incoming data stream will not be described here, but will be described in greater depth below herein. In the preferred embodiment, symbols are formed by filling individual address locations in a framer memory (not shown) with 9 bit bytes which arrive one per timeslot. The individual data streams on buses 10 and 14 are TDMA streams divided into multiple successive timeslots. Thus, time increases along one axis of the framer memory. Symbols are formed by reading the memory "across time", i.e., along an axis orthogonal to the axis of increasing time.

In the embodiment shown in FIG. 3A, modulator/transmitter 12 converts the digital data in the data stream arriving on bus 10 into amplitude modulations of a carrier signal using a first orthogonal code, and outputs the modulated carrier signal on feeder link coaxial conductor 18 coupled to an input of a summer 20. To do this, the modulator/transmitter 12 performs a matrix multiplication of the the element of the information vector |b| from the TDMA stream on bus 10 times the appropriate element of the first column of code matrix |c|, i.e., code #1 and uses the results to control a modulator which appropriately modulates an RF carrier. All other elements of the information vector |b| representing data from other TDMA streams at other locations are set to zero at the location of modulator/transmitter 12 but are set to the appropriate values at the modulator/transmitters at the locations of their respective TDMA streams. Thus, each modulator/transmitter does only the portion of the matrix multiplication |b|×|c| for data from its TDMA stream. The individual partial products from each modulator are summed by a summer 20 to give a result vector R=|b|×|c| representing the final result of the full matrix multiplication.

Likewise, subscriber #2 provides a digital data input stream on bus 14 to a code #2 modulator/transmitter 16. This digital data stream on bus 14 will be divided into individual symbols or bits to be transmitted. The first bit from the stream on bus 10 will become the second vector element in the information vector |b|. Modulator/transmitter 16 converts the digital data in the data stream arriving on bus 14 into amplitude modulations of a carrier signal by partial matrix multiplication similar to that done by modulator/transmitter 12 using a second code, i.e., another column of the code matrix [c] which is orthogonal to said first code.

Modulator/transmitter 16 then outputs the modulated carrier onto a feeder link coaxial cable 22 coupled to another input of summer 20. That is, the modulator/transmitter 16 performs the multiplication of the second element of information vector |b| times the appropriate element of the second column of code matrix |c|, i.e., code #2.

The effect of the multiplications by the modulator/transmitters 12 and 16 is to spread the energy of each bit or symbol to be transmitted out over time by multiplication of each bit in the information vector by the multiple code elements in the appropriate column of the code matrix [c].

Further, because the symbols are read from the framer memory "across time", the individual bits in the TDMA streams in the time domain on buses 10 and 14 are not transmitted in contiguous temporal relationship in the symbols used in the matrix multiplications to generate the signals transmitted in the code domain on coaxial/fiber data paths 18, 22 and 24. This form of spread spectrum modulation renders the system less susceptible to burst or impulse noise interference that adversely affects timeslots in the TDMA streams. The use of orthogonal codes provides simultaneous multiple access such that multiple digital channels can be simultaneously transmitted over a shared data path, and minimizes crosstalk between digital channels, especially where proper frame timing alignment among multiple subscribers is utilized. To implement this modulation scheme, each of the modulator/transmitters 12 and 16 uses the partial results of the multiplication |b|×|c|, i.e., one element of the |b| vector times the appropriate element of a column of the |c| matrix, to modulate a carrier signal generated therein to generate the RF signals which are summed by summer 20 and transmitted to the head end receiver 26 on coaxial links 18 and 22.

As a specific example to illustrate how the information vector is multiplied by the code matrix in the transmittter/modulators, please refer to the following. In this hypothetical, assume that code #1 for user 1 is |1,1| and that code #2 for user 2 is |1,−i|, as depicted on FIG. 3B. Thus, the first column of the code matrix will be $1/\sqrt{2}$, and $1/\sqrt{2}$ from top to bottom and the second column of the code matrix will be $1/\sqrt{2}$, and $-1/\sqrt{2}$ from top to bottom, all as shown in FIG. 3C. Note that each code element in this embodiment is divided by $\sqrt{2}$ for reasons which will be described below.

Also, assume that user 1 asked for and received one channel designated channel #1 from a head end allocation circuit (not shown) and wants to transmit a +1 during a first frame of data on transmission media 24. Also, assume that user 2 asked for and received one channel to transmit data and that channel is designated channel #2, and assume that user 2 wants to transmit a −1 during the first frame. In such a case, the information vector [b] for the first frame of data to be transmitted is [1,−1] with the first element, 1, representing the number the first user wants to send during the first frame on channel 1, and the second element, −1, representing the number the second user wants to send during the first frame on channel #2. These concepts are all represented by FIGS. 3D and 3E.

The multiplication of the information vector [b] times the code matrix [c] results in a result vector R for transmission of $[0,2/\sqrt{2}]$. This multiplication is done by multiplying information vector |1,−1| times the first column of the matrix and summing the two products $1/\sqrt{2}$ and $-1/\sqrt{2}$) to yield 0 as the first element of the result vector. Next, the information vector |1,−1| is multiplied by the second column of the code matrix to yield two partial product results of $1/\sqrt{2}$ and $1/\sqrt{2}$. These two partial product results are summed by the summer 20 to yield the second element in the result matrix, $2/\sqrt{2}$, all as shown in FIG. 3F. Therefore, the modulator/transmitter 12 will modulate the carrier to an amplitude or frequency representing the level 0 of the first element of the result vector R=|0,2/√2| during a first time and drive the carrier so modulated onto coaxial link 18 during the first time. Likewise, the modulator/transmitter 16 will modulate the carrier to an amplitude or frequency representing the level 2/√2 of the second element of the result vector R during a second time and drives the carrier so modulated onto coaxial link 22 as the combined signal carrying the data from both channels #1 and #2 simultaneously across the shared transmission media 24.

Shared transmission media 24 can be any metallic or fiber optic media, terrestial microwave link or satellite/cellular link. Appropriate interface circuitry to place the result signal represented by the vector [0,2/√2] onto the particular transmission media are known and are not critical to the invention.

The multiplication [b]×[c] is carried out by the two code modulator/transmitters 12 and 16, each doing a part of the multiplication. Modulator 12 multiplies the first element of the information vector [b] from subscriber #1 times the elements in the first row of the code matrix and outputs the resulting partial products during two successive intervals on line 18 coupled to the input of the summer 20. Likewise, the code #2 modulator 16 multiplies the second element of the information vector [b] from subscriber #2 times the two elements in the second row of the code matrix [c] and outputs the resulting two partial products on line 22 to the summer 20 during the same two successive intervals used by modulator 12. The signals output by the modulator/transmitters 12 and 16 during the first of the two successive intervals are summed by summer 20 and output on coaxial cable 24 as the first component, 0, of the result vector R=|0,2/√2|. The signals output by the modulator/transmitters 12 and 16 during the second of the two successive intervals are summed by summer 20 and output on coaxial cable 24 as the second component, 2/√2, of the result vector |0,2/√2|.

Not shown in FIG. 1 for simplicity is a modulator that takes the result vector and uses it to modulate the amplitude, phase or frequency (or some combination of these) of a radio frequency carrier, which is then input to the shared transmission media 24 for transmission to the head end.

To recover the original information vector [b], on the receiver side of the transaction, the receivers multiply the received signals times the transpose code matrix $[c^T]$ in a manner to reverse the encoding process. To derive the transpose matrix, the columns of the code matrix [c] become the rows of the transpose matrix [cT]. In the hypothetical example at hand, the transpose matrix will have $[1/\sqrt{2},1/\sqrt{2}]$ as its first row corresponding to the first column of the code matrix [c]. The second row of the transpose matrix will be $[1/\sqrt{2},-1/\sqrt{2}]$ corresponding to the second column of the code matrix [c], as shown in FIG. 3G. Thus, in the example at hand, the transpose matrix $[c^T]$ is actually identical to the code matrix [c]. The result of multiplication of the result vector R=[0,2/√2], representing the signal on coaxial cable 24, times the first column of the transpose matrix is 0+2/2=1 for the first element of the recovered information vector [b]. The result of multiplication of the result vector [0,2/√2] times the second column of the transpose matrix is 0+(−2/2) =−1 for the second element of the recovered information vector [b]. The resulting recovered information vector [b] is [1,−1].

In the preferred embodiment, a normalization factor, equal to the square root of the number of separate codes in use, is used on both the transmit and receive sides as a denominator for each code matrix element and as a denominator for each transpose matrix element. This enables recovery by the receivers of an information vector [b] which has elements which are equal to the original data generated by the users. In the example of FIGS. 3B through 3G, each of the elements in the code matrix [c] (and, consequently, its transpose matrix $[c^T]$) are divided by this normalization factor √2.

Returning to the discussion of FIG. 1, coaxial cable 24 is coupled to a head end receiver 26. At the head end receiver, the signal on cable 24 is split onto separate coaxial cable links 28 and 30, each of which is coupled to a receiver of which receivers 32 and 38 are typical. The function of the receivers is to demodulate the received signals to derive the elements of the result vector which were used as modulation factors, and to multiply these result vector elements times the columns of the transpose matrix $[c^T]$ to recover the information vector [b] originally transmitted. To accomplish this function, link 28 is coupled to the analog input of a receiver 32 which is comprised of a multiplier 34 and an integrator 36.

Not shown, for the sake of simplicity, is a demodulator/discriminator which converts the amplitude, phase or frequency variations (or some combination of the two) of the incoming RF signals received from coaxial cable/fiber optic data path 24 into analog signals representing the result vector elements which are coupled to the analog inputs of the multipliers 34 and 40.

The multiplier 34 receives as one input the demodulated analog signal on link 28 and as another input on line 35 an analog signal representing the elements in column 1 of the transpose matrix $|c^T|$.

Likewise, link 30 and the demodulator/discriminator (not shown) is coupled to a receiver 38 which is comprised of a multiplier 40 and an integrator 42. The multiplier 40 has as one input, the analog demodulated signal from link 30 and has as another input a signal on line 37 representing the elements of column 2 of the transpose matrix $|c^T|$.

Multiplier 34 multiplies the signals on link 28 during a first time interval times the first column element of the first column of the transpose matrix and outputs the result on line 44 to the summation input of integrator 36. During the second time interval when the second element of the result vector $|0,2/\sqrt{2}|$ is arriving, the multiplier 34 multiplies the second element thereof, $2/\sqrt{2}$, times the second element in the first column of the transpose matrix $|c^T|$ and outputs the partial product result on line 44 to the summation input of the integrator 36. The integrator 36 sums the two partial products from the first and second time intervals, and outputs the sum on line 46 as the first element, 1, of the recovered information vector [b].

Likewise, multiplier 40 multiplies the signals on line 30 during a first time interval when the first element, 0, of the result vector $[0,2/\sqrt{2}]$ is arriving times the first element of the second column of the transpose matrix $[c^T]$ arriving on line 37. The resulting partial product is output on line 48 to the input of the integrator 42. During the second time interval, when the second element $2/\sqrt{2}$ of the result vector $[0,2/\sqrt{2}]$ is arriving on coaxial link 30, multiplier 40 multiplies this second element times the second element of second column of the transpose matrix. The resulting partial product during the second time interval is output on line 48 to the integrator 42. The integrator sums the two partial product results on line 48 over time, and outputs the result on line 50 as the second element, −1, of the recovered information vector [b]. The information vector [b] can then be disassembled into its components such that the TDMA data streams from which data was taken to compose the information vector can be re-created at the receiver end of the transaction.

Those skilled in the art will appreciate that the first and second conductors could also be assigned to carrying two different data streams sent on different channels both of which were originated by the same subscriber.

Throughout this example, the conductors of the distribution system have been referred to as coaxial cable. Those skilled in the art will appreciate that with suitable adjustments of the frequencies of operation and addition of appropriate transmit and receive circuitry, one or more of the various coaxial cable links described herein could be fiber optic cable, microwave links, radio frequency links, etc. since the medium of transmission is not critical to the invention.

Use of Cyclic Codes in Code Division Multiple Access For Better Performance

In the preferred embodiment, the orthogonal codes used in the modulator/transmitters are cyclic codes. In cyclic orthogonal codes, all codes used are the same sequence of numbers, but each code is shifted by one or more bit positions from the preceding code. Although any set of orthogonal codes will work to implement the invention, the cyclic orthogonal codes simplify implementation issues by reducing the amount of storage needed to store the codes.

Those skilled in the art will appreciate that each subscriber transmitter may transmit multiple channels of digital data, and that the matrix multiplication and summation operations described above may be performed with digital circuitry such as suitably programmed microprocessors.

In an alternative embodiment, the separate streams of digital data are transmitted using spread spectrum frequency hopping techniques. In this embodiment, a first stream of digital data will be transmitted from one end to the other using a carrier that hops in frequency in accordance with a first predetermined coded sequence. Likewise, the second stream of digital data is transmitted on a carrier that hops in frequency in accordance with a second predetermined sequence. In this embodiment, the transmitter/modulators receive code sequence inputs that control the frequency of an oscillator that generates a carrier frequency. The codes that control the frequency of the transmitters for the various channels are orthogonal. The receiver for channel 1 receives the same code sequence that was fed to the transmitter for channel 1. This code sequence controls the frequency of a local beat frequency oscillator for receiver 1 and is synchronized with the code sequence fed to the transmitter for channel 1. Likewise, the receiver for channel 2 receives a code sequence that is orthogonal to the receiver for channel 1 code sequence and controls the beat frequency oscillator of the receiver for channel 2 to synchronously generate hops in the local oscillator frequency that track the hops in the frequency of the carrier for the transmitter for channel 2.

Synchronous CDMA: The Alignment/Ranging Process to Achieve Frame Synchronization Alignment is an important issue for optimal operation of the system of the genus represented by FIG. 1 with minimal cross talk between channels. In the system of FIG. 1, the time slots in the TDMA streams on lines 10 and 14 are the channels. The digital data in each time slot in the TDMA streams on lines 10 and 14 is data transmitted on that channel. The digital data in the TDMA streams is re-arranged into symbols, as described briefly above, and is transmitted in frames, with three symbols plus one guard band or gap per frame. The guardband or gap is reserved for transmission of alignment barker codes, and no other data is supposed to be transmitted during the gaps.

The concept in alignment is to adjust variable delays imposed at the site of each transmitter prior to transmission of a barker code so as to compensate for different propagation delays from each transmitter site such that the barker code from each subscriber transmitter trying to align arrives at the head end receiver during the same gap. When the variable delays at each subscriber transmitter are adjusted properly, each subscriber will be said to be in alignment so that the signals encoding the symbols that are simultaneously transmitted on the shared data path 24 will all be transmitted with the same frame timing.

Alignment is important to obtain pure orthogonality so as to obtain zero cross talk. If the transmitters are not perfectly aligned, the signals transmitted can still be recovered, but there is some cross talk between channels which will limit the capacity of the system to carry information.

This process of aligning all the delay circuits in the transmitters is sometimes alternatively called ranging herein and is broadly applicable to other types of multiple access digital data transmission systems also which suffer from different propagation times from different transmitter sites such as time division multiple access systems that form part of the prior art discussed above.

Referring to FIG. 4A, there is shown a diagram of the typical frame structure. In the preferred embodiment, each frame is composed of three symbols of 144 chips each and a gap or guardband comprised of 16 chips for a total of 448 chips each having 278 nanoseconds duration. The chip is the basic unit of time in the "code domain", where code domain refers to the signals propagating across the shared media. In the preferred embodiment, each chip is a QAM modulated element of a result vector where the result vector is comprised of a number of elements equal to the number of timeslots and is the result of code division spreading of the elements of an information vector constructed from the bits of each channel or timeslot. In the preferred embodiment, each receiver receives a TDMA serial bit stream comprised of 144 individual timeslots or channels each of which contains 8 bits. To these 8 bits there is added a 9th bit in the preferred embodiment which can be used for side channel conversations with the CU unrelated to the data received from the external device. These 9 bits are divided into three tribits of 3 bits apiece. A collection of 144 of these tribits is stored in a framer memory and, in some species within the inventive genus, these 144 tribits will be the information vector which is multiplied by the code matrix to generate a result vector having 144 elements. These 144 result vector elements will be QAM modulated to generate the 144 chips that are transmitted as a symbol. This process is repeated for each of the three tribits of each timeslot thereby resulting in the transmission of three symbols in each frame. In the preferred embodiment however, each tribit is encoded with one or more redundant bits based upon the three bits and the state of these same three bits of the same timeslot during the last frame. The redundant bit(s) is calculated to aid a Viterbi Decoder in a receiver in the central unit to ascertain with a higher degree of accuracy from the received signals which have been corrupted by media impairments what bits were originally present as each tribit. Some species within the inventive genus may omit the addition of the redundant bits and the Viterbi Decoder and many advantages within the genus of the invention will still be present although a higher bit error rate will result.

One skilled in the art will appreciate that the construction of the information vector which will be used to generate each symbol by taking only some of the bits from each timeslot spreads the data from each timeslot out over time. This renders the data less susceptible to burst noise. The code division multiplexing allows multiple channels of digital data to be simultaneously transmitted in a 6 mHz channel without interference between channels. In addition, frequency division multiplexing may be utilized to transmit even more channels of digital data above and beyond the 144 channels transmitted in the first 6 mHz channel. In other words, another 144 different TDMA digital channels may be code division multiplexed and transmitted simultaneously with the first 144 digital channels but on a second 6 mHz channel. This second 6 mHz channel has a different center frequency than the first 6 mHz channel which is separated from the center frequency of the first 6 mHz channel sufficiently to not interfere therewith. Both the first and second 6 mHz channels have center frequencies which are separated sufficiently from the center frequencies of the cable television programming sharing the same media so as to not interfere therewith. In alternative embodiments, this scheme can be replicated with any number of symbols greater than 1, or with only one symbol if immunity to burst noise is not important.

In FIG. 4A, the three symbols of frame $F_n$ are symbolized by blocks 62, 64, and 66. The gap or guardband is symbolized by blocks 60 and 71. There is one guardband associated with each frame. The guardband 71 (sometimes also referred to herein as the gap) is used for synchronization and equalization purposes for the frame comprised of symbols 62, 64, 66 and guardband 71. The symbols carry the information for the various channels of digital data provided to the subscribers. The frame period is 125 microseconds. The frame data payload is 128 channels times 72 kilobits per second per channel plus 16 control and management channels each of which has a data rate of 72 kilobits per second for management and control information.

Hereafter, each subscriber transmitter will be referred to as a remote unit or RU, and the central unit or head end will be referred to as the CU.

The process of synchronization is the process wherein each RU is "trained", i.e., has a variable delay in its transmitter set using feedback from the CU on one of the management and control channels such that the transmitted frame from each RU arrives at the CU at the same time. Alignment of all frames from all RUs results in the beginning of the gap 60 for each frame from each RU occurring at the same time at the location of the CU regardless of differences in propagation delays from the various RUs to the CU. In FIG. 4A, time increases to the right. Therefore the beginning of the guardband 60 is located at point 61.

Figure 4B:
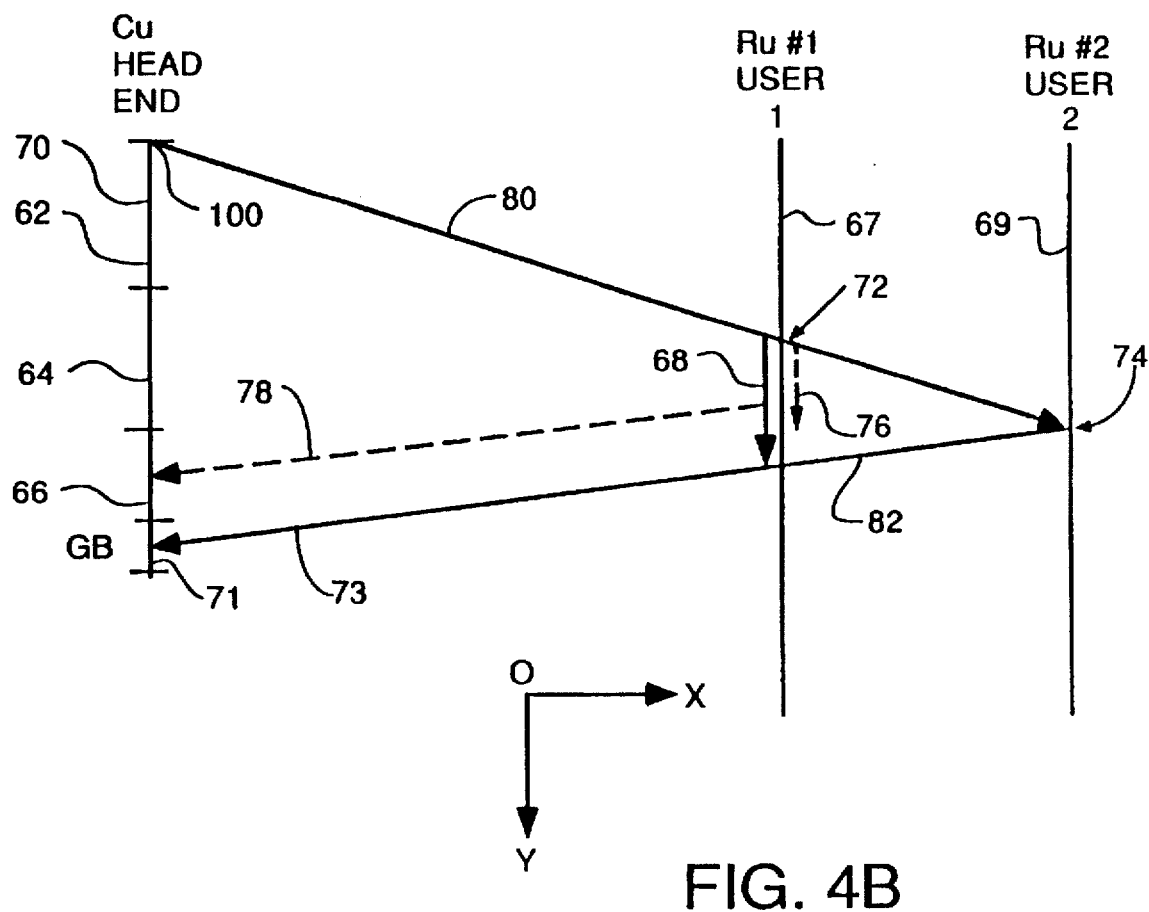
FIG. 4B is a symbolic diagram illustrating the concepts involved in alignment to achieve frame synchronization, also called ranging herein, for the preferred species within the genus of the invention.

Alignment of Any Digital Data System That Sends Data Bits Collected As Frames Referring to FIG. 4B, there is shown a symbolic diagram illustrating the concepts involved in alignment. In FIG. 4B points having increasing positive coordinates along the y-axis starting from the origin at 100 represent increasing time. Points along the x-axis to the right of origin represent increasing distance from the central unit which is designated at position 70. Time 100 represents the beginning of symbol 62 in FIG. 4A at the CU. The gap 71 at the end of the three symbols will be used for alignment, and the end of gap 71 will be deemed the end of the frame.

The alignment process is started asynchronously by any RU that needs to align. The central unit transmits a barker code during each frame at the same time in the frame. This barker code is received by each remote unit at a different time because of different propagation delays, but as to any particular RU, the barker code is always received at the same time during every frame until the CU changes its delay (a concept to be discussed more fully below). The barker code represents a trigger to any RU attempting to align and marks the receive frame timing reference for that RU. The time of receipt of the barker code represents the start of the variable delay interval being adjusted by the RU during the alignment process.

The CU's "every frame" barker code transmission during the frame shown in FIG. 4B is represented by line 80. The barker code is received by RU #1 at position 67 at time 72. The barker code is received by RU #2 at position 69 at time 74. The alignment process is a trial and error process of adjusting a delay from the time of receipt of the barker code to the time of transmission of the same barker code by each RU back toward the central unit 70 until the delay is properly adjusted such that the re-transmitted barker code arrives at the CU during the gap. Vector 68 represents correct delay timing for RU #1 at position 67 such that its barker code transmission 73 arrives in the middle of the gap 71. Dashed vector 76 represents an incorrect delay resulting in a barker code transmission, represented by dashed line 78, from RU #1 which arrives sometime during the middle of symbol 66 thereby missing the gap 71. This condition represents an incorrect alignment and may result in crosstalk.

Likewise, the RU #2 at position 69 uses zero delay and emits a barker code transmission 82 immediately upon receipt of the barker code trigger transmission 80 from the CU 70. This barker code transmission 82 from RU #2 also arrives during the middle of gap 71 thereby indicating that RU #1 and RU #2 are correctly aligned.

The alignment barker code transmissions are typically short bursts having energy levels which are sufficient to make detection during gap 71 easy even though gap 71 also includes random noise energy.

The alignment barker code transmissions are detected during the gap by performing a correlation mathematical operation in the CU receiver between the barker code that was transmitted and the received signal. If the received signal was the same barker code that was transmitted by the CU, the correlation operation will output a signal that peaks at the time of maximum overlap between the barker code transmitted by the CU and the received signal. The timing of this peak indicates the alignment state of the RU that transmitted the barker code which resulted in the peak. Because the barker code transmissions are relatively short in duration and their amplitudes are not excessive, arrival of a barker code transmission during the middle of a symbol will generally not cause errors in the interpretation of symbol 66 by the CU receiver. Each symbol encoded in the code domain includes error detection and correction bits (ECC bits) such that any errors that occur can usually be detected and corrected when the symbols are re-constituted by the framer circuitry in the receiver. Therefore, if the barker code alignment transmission does result in an error, that error will usually be within the detection and correction range of the ECC bits of each symbol.

Figure 5:
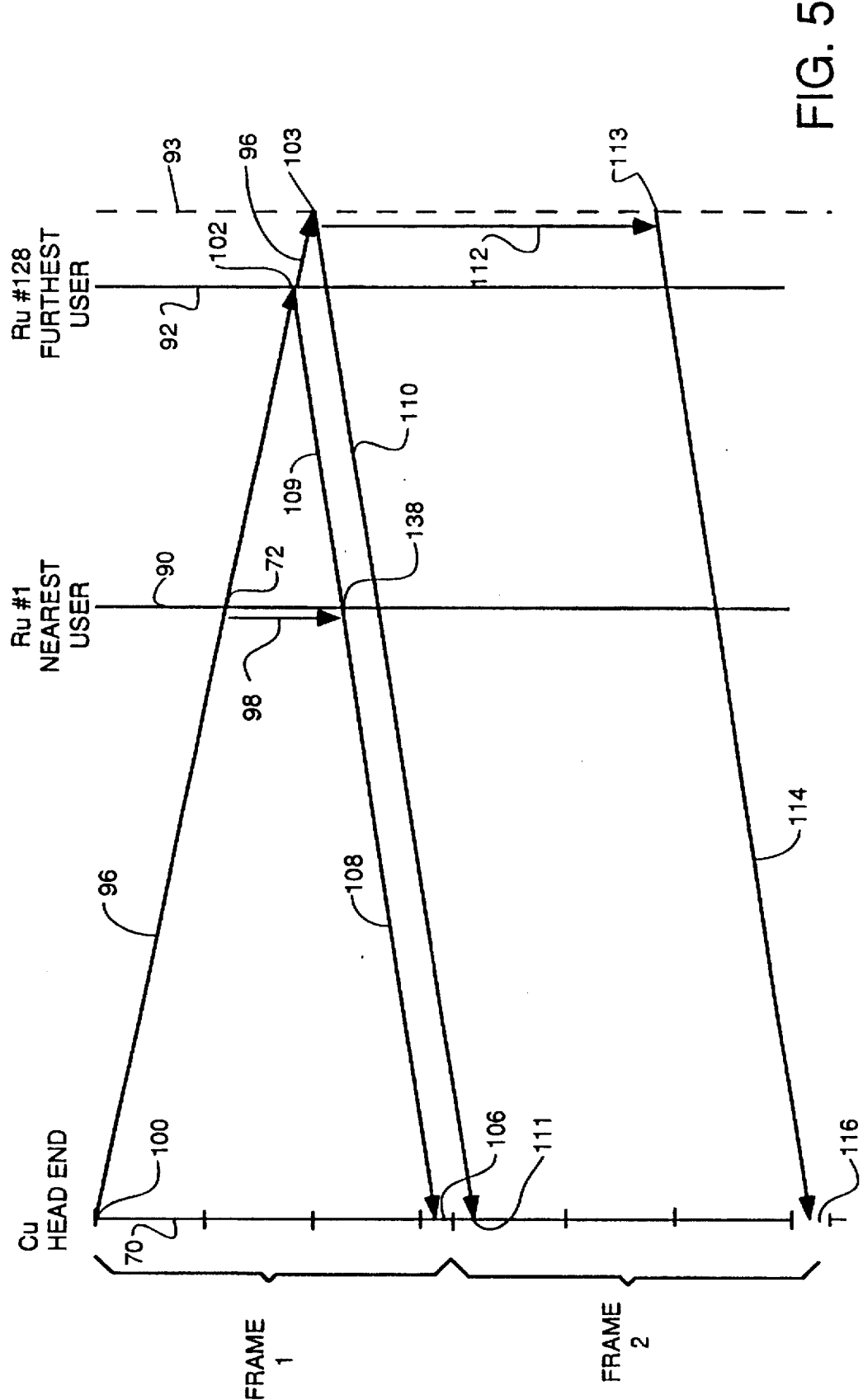
FIG. 5 is a diagram like that of FIG. 4B which illustrates a problem requiring re-alignment which occurs when the network physically expands.

Referring to FIG. 5, there is shown a diagram like that of FIG. 4B which illustrates a problem which occurs when the network physically expands. This can occur under certain circumstances such as during the heat of a summer afternoon when the physical media thermally expands thereby altering the propagation times of barker code signals from the CU to the RUs and from the RUs back to the CU. In the example shown, the CU 70 transmits barker code 96 at time 100. This barker code reaches the nearest RU, RU #1, at position 90 at time 72. The same barker code reaches the furthest RU, RU #128, located at position 92 at time 102. RU #1 uses a delay symbolized by vector 98 and re-transmits the barker code 108 at time 138. This alignment transmission hits gap 106 in frame #1 indicating that RU #1 is properly aligned.

The RU #128, when located at position 92 uses no delay and immediately retransmits barker code transmission 109 at time 102. Transmission 109 also arrives during gap 106 indicating that, at least at position 92, RU #128 is properly aligned.

Now suppose that the network physically expands such that RU #128 finds itself physically at position 93. In this position, RU #128 receives barker code transmission 96 from the CU at time 103, and, because RU #128 is already using the minimum possible delay for retransmission of an alignment code, alignment transmission 110 is also transmitted at time 103. However, because of the physical expansion of the network, alignment transmission 110 reaches the CU at time 111 which is after the end of the gap 106 and sometime in the middle of the first symbol of frame #2.

When an RU properly hits the gap, it is authenticated, i.e., identified, and the CU tells it that alignment has been achieved thereby causing the RU to stop adjusting its delay by trial and error. Because RU #128 does not receive any acknowledgement from the CU that it is properly aligned, its starts incrementing its delay vector in a trial and error process. After several incrementations, the delay vector finally reaches the delay represented by vector 112. With this delay vector, an alignment transmission 114 is transmitted from RU #128 at time 113 which reaches gap 116 located at the end of frame 2. However, this means that RU #128 is synchronized with the wrong frame. It is required for proper operation of the system to have all RUs synchronized to the gap at the end of the same frame in which the barker code transmission from the CU which triggered the RUs alignment transmissions occurred. If one or more RU aligns to the gap at the end of another frame, the results can be disastrous in terms of errors generated in the CU receiver in interpreting data transmitted by the RUs.

Figure 6:
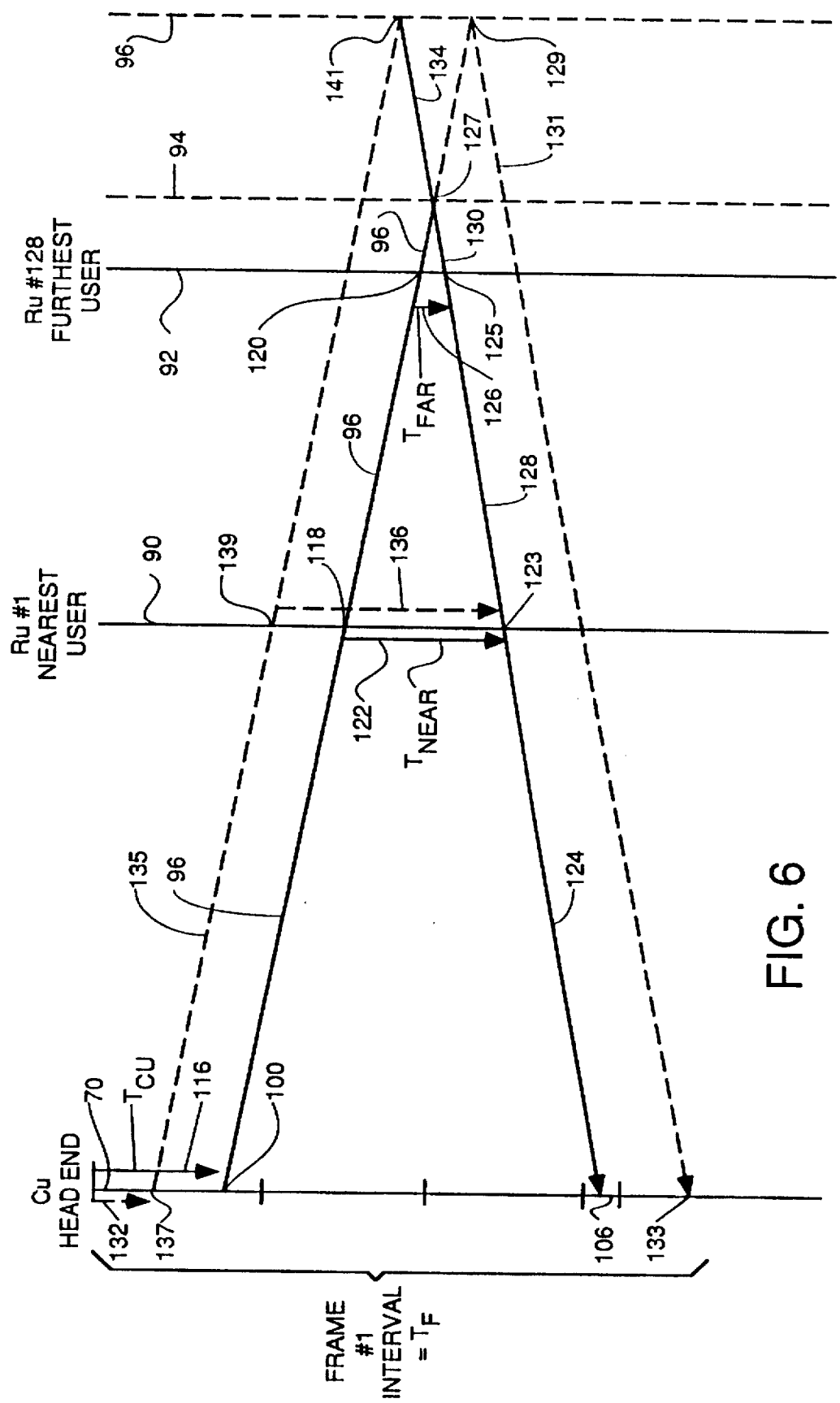
FIG. 6 is a diagram like that of FIG. 5 which illustrates the solution to the misalignment problem outlined in the discussion of FIG. 5.

Referring to FIG. 6, there is shown a diagram like that of FIG. 5 which illustrates the solution to this misalignment problem outlined in the discussion of FIG. 5. In the diagram of FIG. 6, CU 70 imposes a delay, represented by vector 116, prior to transmitting the alignment triggering transmission 96 at time 100. The barker code transmission 96 arrives at the nearest RU, RU #1, at position 90 at time 118. Time 118 establishes the receive frame timing for RU #1. RU #1 then imposes a delay represented by vector 122 and transmits the same barker code alignment transmission 124 at time 123. Time 123 establishes the transmit frame timing reference for RU #1. The time delay between times 118 and time 123 is predictable since the CU will transmit its barker code transmission 96 at the same time during every frame until such time as it is necessary to alter the timing of transmission 96 to keep all RUs in alignment. In other words, the time of reception of the barker code transmission 96 for all RUs is predictable and will be a periodic signal which happens once during each fame. The alignment transmission 124 from RU #1 reaches gap 106 at the end of frame #1.

The alignment transmission 96 from the CU reaches RU #128, the furthest RU, at time 120. Time 120 establishes the receive frame timing reference for RU #128 while at position 92. Thereafter, at time 125, the RU #128 transmits alignment transmission 128. This transmission arrives during the gap 106 at the end of the first frame thereby indicating that RU #128 is properly aligned at this position.

As in the case of RU #1, the delay between times 120 and 125 for RU #128 is predictable.

Now suppose that the network expands, and RU #128 finds itself at position 94. In this position, the CU alignment triggering transmission 96 arrives at time 127. In order to stay aligned, RU #128 will reduce its delay vector 126 to zero and immediately retransmit an alignment transmission 130 comprising the same barker code which it received. The transmission 130 arrives during gap 106 thereby indicating that RU #128 is still aligned at its new position by cutting its delay vector to zero.

Now assume that the network further expands such that RU #128 finds itself at position 96. In this new position, alignment transmission 96 from the CU would arrive at time 129. With a zero delay by RU #128, the resulting alignment transmission 131 would arrive at time 133 just after the end of the gap 106 thereby indicating the RU #128 had been taken out of alignment by the expansion of the network. RU #128 would then continue to adjust its delay vector until it aligned to the next gap following the end of frame #2 thereby causing errors.

To prevent this from happening, when the CU finds that an RU which was previously in alignment has gone out of alignment because of network expansion, the CU will reduce its initial delay from the delay represented by vector 116 to the delay represented by vector 132. With this new delay vector, a barker code alignment triggering transmission 135 will be transmitted at time 137. This alignment triggering transmission 135 will arrive at the position of RU #1 at time 139 and will establish a new receive frame timing reference. If RU #1 has not adjusted its delay vector 122 in advance by one of the mechanisms to be described below, it will go out of alignment. It may then enter a realignment phase and will ultimately, by trial and error, adjust its delay vector to that represented by dashed vector 136. After so adjusting its delay. RU #1 will transmit an alignment transmission 124 at time 123 so as to again hit gap 106 thereby re-entering alignment.

The alignment triggering transmission 135 from the CU arrives at the position 96 of RU #128 at time 141. Using a zero delay vector, RU #128 transmits its alignment transmission 134. This alignment transmission 134 arrives during gap 106 thereby placing RU #128 again in alignment.

FIG. 6 shows an alignment process where the alignment is to the gap at the end of the first frame in which the alignment trigger signal 96 is transmitted. In real life systems, this may not be practical, so the alignment process is carried out to the gap following some integer number of frames in the future. The mathematical expression which defines this relationship is given in equation (1) below:

$$TTA = T_{cu} + T_{ru} + 2 \times T_p = \text{constant} = n \times T_F \qquad (1)$$

where

TTA=the total turnaround time from the CU to the farthest RU;

$T_{cu}$=the delay imposed by the CU illustrated by vector 116 in FIG. 6;

$T_{ru}$=the delay imposed by the farthest RU illustrated by vector 126 in FIG. 6 (also called $T_{far}$);

$2 \times T_p$=two times the propagation delay $T_p$ from the CU to the farthest RU; and $n \times T_F$=an integer multiple of the frame interval $T_F$.

Of course, when the network expands, there is a certain additional delay in the propagation delays which will be called $T_u$ for the uncertainty of this additional propagation delay. Therefore, three additional requirements are imposed with respect to how much delay the CU and the RUs must be able to impose. Those additional requirements are given below in equations (2), (3) and (4):

$$T_{cu} = [T_d + T_u] \text{modulo } T_F \qquad (2)$$

where $T_d$=the span of the network, i.e., equal to the quantity $[TTA_2 - TTA_1]$ where $TTA_2$ equals the total turnaround propagation time for a signal to propagate from the CU to the farthest RU and back, and $TTA_1$ equals the total turnaround propagation time for a signal to propagate from the CU to the nearest RU and back; and modulo $T_F$=the remainder of $[T_d+T_u]$ divided by TF.

$$T_{far} > T_u \qquad (3)$$

where $T_{far}$=the smallest possible $T_{ru}$ of the farthest RU and is equal to the smallest RU delay which can be imposed by the farthest RU;

$$T_{near} < T_F - T_u \qquad (4)$$

where $T_{near}$=the maximum possible $T_{ru}$ of the nearest RU.

What all this means in a practical sense is that to set up the delays in the network so that all RUs are aligned, the following steps are taken and the limitations on possible delays imposed by the CU and RUs given in equations (1) through (3) are imposed so that all RUs align to the same gap. The practical network to be aligned by the following procedure has a CU coupled by a fiber optic trunk line to an optical node. The optical node is located out in the area to be served and can be coupled to as many as 2000 homes by 2000 individual coaxial links. To align such a network, step 1 would be to bring an RU to the position of the optical node and fix its delay at $T_{near} = T_F - T_u$. With this delay, the nearest RU would not hit any gap except by shear luck. Assuming the nearest RU does not hit the gap with this delay, the second step would be to adjust the delay of the CU until the nearest RU hits a gap. When this occurs, the condition $T_{cu} = [T_d + T_u]$ modulo $T_F$ would be true meaning that the CU would have adequately compensated for the uncertainty of the propagation delay increment to $T_d$ caused by network expansion.

Figure 7A:
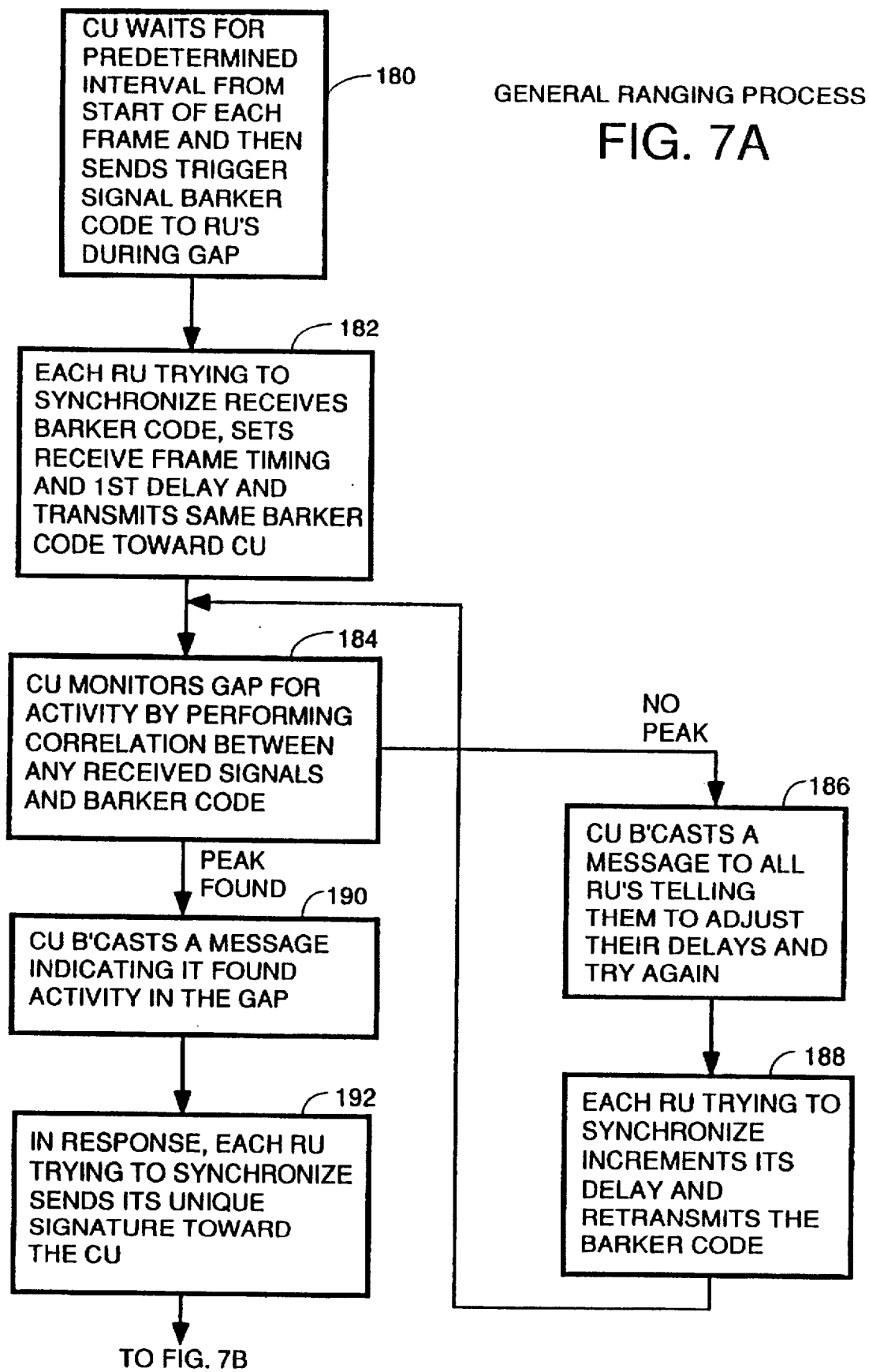
FIG. 7, which is comprised of FIG. 7A, 7B, and 7C, is a flow chart for the general alignment process which is used in training all remote units (RUs) to set their delay vectors properly so as to be in alignment within the same frame.
Figure 7B:
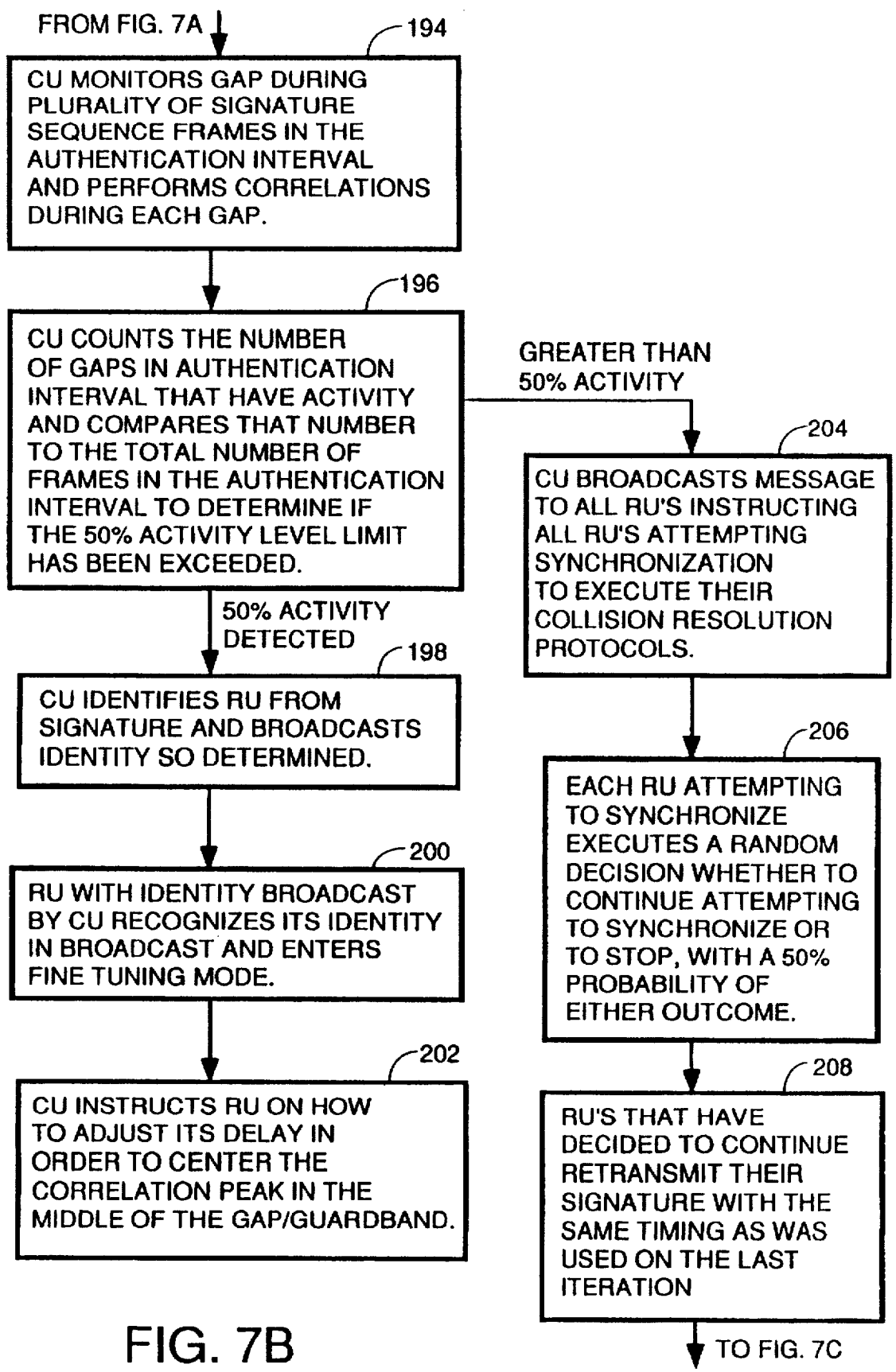
Figure 7C:
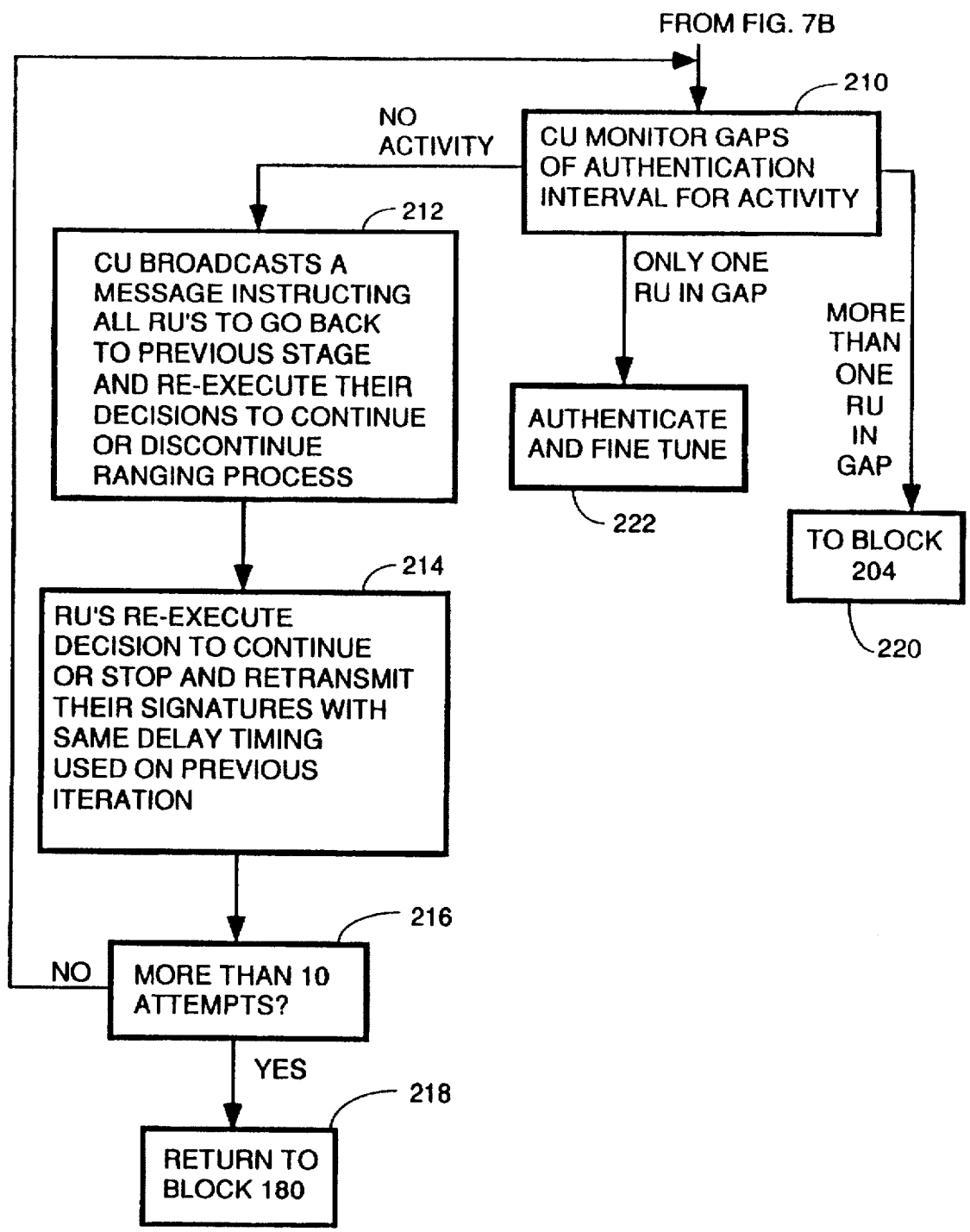

Referring to FIG. 7, which is comprised of FIGS. 7A, 7B, and 7C, there is shown a flow chart for the general alignment process which is used in training all RUs to set their delay vectors properly so as to be in alignment within the same frame. The process starts as symbolized at block 180 with the CU waiting for a predetermined interval from the start of each frame and then sending a trigger signal transmission to the RUs. Usually this trigger signal is sent during the gaps between frames, and the RUs monitor these gaps for these trigger signals. The trigger signal in each frame is a unique barker code.

Block 182 symbolizes the process wherein each RU trying to synchronize (the terms "synchronize", "ranging" and "alignment" all are used synonymously to mean the process of training an RU to set its delay vector properly to get its alignment transmission in the gap) receives the barker code trigger signal transmission from the CU and sets its receive frame timing and then sets a first delay for its delay vector. Thereafter, the RU transmits the same barker code it received from the CU towards the CU as an alignment transmission.

In block 184, the CU monitors the gap for activity by performing a correlation mathematical function between any received signal during the gap and the barker code that was transmitted as the trigger signal. If a barker code identical to the trigger signal is received during the gap, the correlation calculation will result in a correlation peak being found in the gap. If the correlation calculation results in a peak being found, processing proceeds to the process symbolized by block 190. There, the CU broadcasts a message to all RUs indicating that it found activity in the gap. Then the process of block 192 is performed where each RU trying to synchronize sends its signature. That is, in response to the broadcasts from the CU, each RU trying to synchronize sends its unique signature towards the CU in order to determine if that RU's barker code is the barker code the CU found in the gap and whether it is the only RU in the gap. This process is called authentication.

The process of block 192 symbolizes the start of the authentication process. Each RU has a unique signature which comprises the transmission and nontransmission of barker codes during the gaps of a multiple frame authentication period. Specifically, the unique signature of each RU will involve transmitting the barker code during some gaps of the authentication period but not during others. The number of gaps during which the barker code is transmitted compared to the number of gaps during which the barker code is not transmitted during the authentication period is such that if only one RU is aligned to the gap and is transmitting its authentication signature, activity will be found in the gaps of the authentication interval only 50% of the time. This scheme for authentication is chosen so that the CU can detect contentions, i.e., more than one RU in the same gap, in the manner described below.

After performing the process of block 192, the process of block 194 on FIG. 7B is performed. This process involves the CU monitoring each of the gaps during the plurality of signature sequence frames in the authentication interval and performing correlations between the signals received in each of the gaps and the barker code that the CU transmitted.

Next, the process of block 196 is performed. In this process, the CU counts the number of gaps in the authentication interval that have had activity detected therein, and then compares that number to the total number frames in the authentication interval to determine if the 50% activity level limit has been exceeded.

Returning to the consideration of the process of block 184, if the CU, while monitoring the alignment gap for activity, finds no peak resulted from the correlation calculation, then the process of block 186 is performed. In the process of block 186, the CU broadcasts a message to all RUs telling them to adjust their delays and to try again to hit the gap with their barker code transmissions. Then, the process of block 188 is performed wherein each RU trying to synchronize increments its delay vector and retransmits the same barker code as was received from the CU. Thereafter, the process of block 184 is performed again wherein the CU monitors the gap for activity. The loop comprising blocks 184, 186 and 188, taken together, comprise the trial and error process which causes all RUs trying to align themselves to continually increment their delay vectors until at least one of them hits the gap.

Returning to the consideration of block 196, if 50% activity level is detected during the authentication interval, it means that only one RU is in the gap. In such a case, the process of block 198 is performed. In this process, the CU identifies the RU whose barker code transmissions are found in the gap from the unique signature sequence transmitted during the authentication interval. In other words, the CU examines exactly which gaps had correlation peaks therein and the sequence of these gaps and looks up this sequence in a lookup table listing the unique signature sequence for each RU in order to identify the particular RU that has successfully aligned itself. Block 198 is reached only if activity is detected in exactly 50% of the gaps.

After the CU identifies the RU, it broadcasts the identity so determined to all RUs as the last step of block 198.

Next, the process of block 200 is performed. In this process, the RU with the identity broadcast by the CU recognizes its identity in the broadcast message and enters a fine tuning mode.

The fine tuning mode is represented by the process of block 202. In this process, the CU instructs the RU which has aligned itself in the gap on how to adjust its delay vector in order to center the correlation peak calculated by the CU to the exact middle of the gap. In the preferred embodiment, the gap is comprised of 16 chips which comprise 8 chips in the middle of the gap and then 4 chips on either side of this middle group of 8. It is desirable during the fine tuning mode to get the correlation peak centered in the middle of the middle 8 chips. As mentioned above, a chip is a small interval of time equal to the frame period of 125 microseconds divided by the 448 chips which comprise each frame. In other words, each chip is 279 nanoseconds in duration. The fine tuning process of block 202 involves sending messages back and forth between the CU and the RU which has been identified as having aligned itself in the gap. These messages are sent over the management and control channels. Usually the exchange involves only one instruction from the CU to the RU saying, for example, "Increase your delay vector by 2 chips" or, "Decrease your delay vector by 3 chips". The RU then makes the instructed adjustment and retransmits the barker code. The CU agains calculates a correlation peak and examines where the peak occurs in the gap. If the peak occurs in a suitable position, the CU sends a message to the RU telling it to stop adjusting its delay vector as satisfactory alignment has been achieved.

Returning to the consideration of the process of block 196, if the CU determines that greater than 50% of the gaps during the authentication interval had correlation peaks therein, i.e., greater than 50% activity is detected, then the process of block 204 is reached. This process is only reached if more than one RU has aligned itself to the same gap. If this case, because each RU is transmitting its unique signature, and because each signature is a unique sequence with only 50% activity level, the result of two RU's being in the same gap will be that during more than 50% of the gaps of the authentication interval, correlation peaks will occur. It is impossible to find tune the RUs if more than one RU is trying to fine tune during the same gap. Therefore, the CU has to reduce the number of RUs that are in the gap to one, and it starts this process by performing the process of block 204. In this process, the CU broadcasts a message to all RUs instructing only the RUs attempting to synchronize to execute their collision resolution protocols.

Next, the process of block 206 is performed, to start the collision resolution protocol, wherein each RU attempting to synchronize executes a random decision whether to continue attempting to synchronize or to stop attempting to synchronize. Each RU will make this decision with a 50% probability of either outcome.

After all RUs make their random decisions whether to continue, the process of block 208 is performed. In this process, the RUs that have decided to continue to align retransmit their signature sequences without changing their timing, i.e., with the same timing as was used on the last iteration of the trial and error process. In other words, each RU that has decided to continue transmits its unique signature sequence (sometimes hereafter called a "dotted sequence") over another authentication interval using the same delay vectors that are currently set.

Next, the process of block 210 on FIG. 7C is performed wherein the CU again monitors the gaps of the authentication interval for activity.

If the random decisions whether to continue or not result in no RUs transmitting their signatures, then no activity will be found in the gaps of the authentication interval. In this event, the process of block 212 will be performed wherein the CU broadcasts a message instructing all RUs to go back to the previous stage and to reexecute their decisions to continue or discontinue the ranging process.

The RUs then re-execute their decisions whether to continue or stop attempting to align themselves and retransmit their signatures during the authentication interval with the same delay timing used on the previous iteration, as symbolized by block 214.

Following the process of block 214, the process of block 216 is performed to determine if more than 10 attempts to get one RU in the gap have occurred. If so, the process of block 218 is performed to return to block 180 and restart the ranging process from the top. If fewer than 10 attempts have been made, processing returns to the process of block 210 wherein the CU again monitors the gaps of the authentication interval for activity.

If the process of block 210 finds only one RU in the gap, i.e., 50% activity level is detected during the authentication interval, then the process of block 222 is performed. The process of block 222 authenticates the RU by broadcasting the identity of the RU found in the gap and then the RU is fine tuned in the manner previously described with reference to block 202.

If the CU finds in the process of block 210 more than one RU is still in the gap, processing returns to block 204 where the CU broadcasts a message to all RUs instructing them to execute their collision resolutions protocols. This process is symbolized by block 220.

The process of adjusting the delay vector used by the CU in transmitting its trigger signal barker code can result in loss of synchronization by all RUs in the system unless something is done to prevent this before the CU changes its delay. That is, when the CU shortens its delay vector, the RUs closer to the CU than the furthest RU will all go out of alignment unless certain measures are taken to forewarn them of the coming change. There are 3 different embodiments of processes for realigning all of the RUs when the CU changes its delay vector. The preferred one of these embodiments is symbolized by the flow chart of FIG. 9 and involves activity prior to the CU changing its delay vector to prevent loss of synchronization by all RUs when the CU changes its delay.

Figure 8:
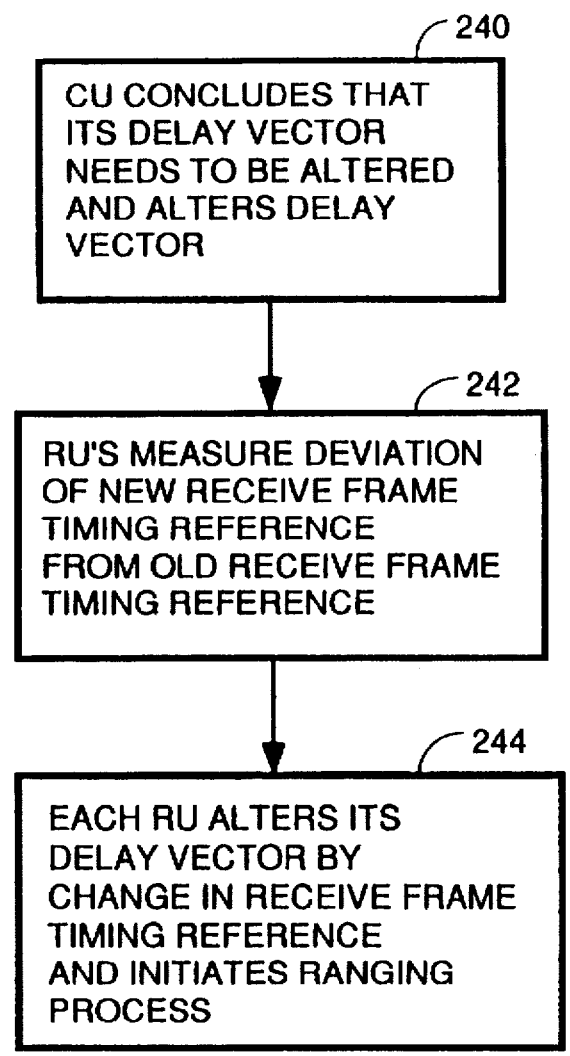
FIG. 8 is a flow chart of one embodiment of a process to resynchronize all RUs after the central unit (CU) has changed its delay vector called the dead reckoning process.

The first of these processes is shown in the flow chart of FIG. 8. This process will be called the dead reckoning resynchronization process for lack of a better term. In this process, the CU concludes, in block 240, that its delay vector needs to be altered in order to keep the farthest RUs in alignment. This conclusion can be drawn in any one of a number of different ways such as by monitoring the farthest RU for continued alignment after the farthest RU tells the CU that it is aligned with the shortest possible delay vector in use. Or, alternatively, the CU can send out a message to the farthest RU periodically inquiring as to whether it is still aligned. This message can take the form of a request for that RU to transmit its authentication signature and then monitoring the next few frames of an authentication interval to determine if that farthest RUs authentication signature shows up in the authentication interval gaps. If the CU concludes in block 240 that it needs to alter its delay vector it then alters the delay vector.

As noted previously, because the CU uses the same delay vector during every frame in transmitting its barker code trigger signal, the RUs have a predictable periodic signal from the CU upon which they can rely to measure the timing change made by the CU. In other words, the time of arrival of the barker code from the CU during each frame is predictable to each RU, and when it changes, the RUs can measure by how much it changed. When the barker code from the CU does not arrive at the predicted time, the RUs know that the CU has just altered its delay vector. The RUs then measure the deviation of the new receive frame timing reference, i.e., the time of arrival of the barker code trigger signal from the CU, by measuring the difference between the old receive frame timing reference and the new receive frame timing reference. This process is symbolized by block 242.

Finally, each RU realigns itself in the process of block 244. In this process, each RU alters its delay vector by an amount equal to the change in the receive frame timing reference. Then each RU initiates a ranging process. The CU monitors the gap at the end of every frame so any RU can initiate ranging at any time.

Figure 9:
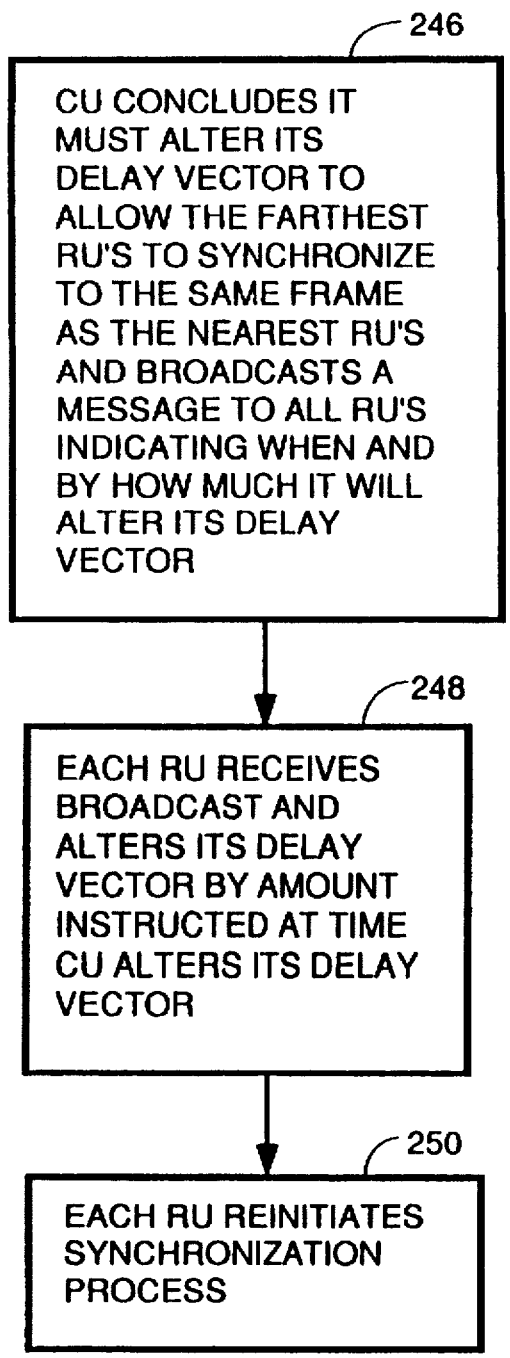
FIG. 9 represents the preferred process for resynchronizing all RUs after the CU has changed its delay vector called the precursor process.

FIG. 9 represents the preferred process for resychronizing all RUs after the CU has changed its delay vector. This process will be called the precursor embodiment herein. This process starts with block 246 wherein the CU concludes that it must alter its delay vector to allow the farthest RUs to synchronize to the same frame as the nearest RUs. The CU, after reaching the conclusion that a change in its delay vector must be made, broadcasts a message to all RUs indicating when and by how much it will alter its delay vector.

Next the process of block 248 is performed wherein each RU receives the broadcast and alters its delay vector by an amount equal to the amount that the CU will be changing its delay vector at the specified time. That is, each RU alters its delay vector by the amount instructed by the CU at the time indicated in the message from the CU that the CU will alter its delay vector.

Finally, the process of block 250 is performed wherein each RU reinitiates a synchronization process.

Both of the embodiments of FIGS. 8 and 9 will result in little or no loss of data because each RU resynchronizes very rapidly. This result follows because each RU's delay vector is immediately set at the delay needed for synchronization at the time the CU alters its delay vector thereby eliminating the delay of the trial and error incrementation of the delay vectors.

The final embodiment for resychronizing after the CU changes its delay vector is for the CU simply to broadcast the message to all RUs saying, "You must all now realign as I have just changed my delay vector." Each RU then re-enters the alignment process symbolized by FIGS. 7A, 7B, and 7C. This process is repeated by each RU until all RUs are aligned.

Referring to FIG. 10, there is shown a typical cable television system arrangement in which the teachings of the invention find utility in a multi-RU, multichannel environment. The central unit or CU 252 is coupled via a coaxial cable, satellite link, microwave link, fiber optic link or some combination of these media 251 to a plurality of subscribers of which subscribers 254 and 256 are typical. The CU sends and receives digital information bidirectionally with each subscriber's RU. Each subscriber has a remote unit or RU which acts as the interface between the subscriber's television, computer, telephone and other devices and the transmission media 251. The CU has a modem therein including circuitry in a transmit channel that assembles frames of data symbols from a TDMA digital data input stream, and encodes and transmits these frames of symbols to the RUs using orthogonal codes. The modem also includes a receive channel which receives the encoded frames of symbols, decodes the symbols using the transpose of the code matrix of the orthogonal codes used by the RU's to transmit the frames, reassembles the TDMA digital data stream from the decoded results and outputs the TDMA stream for use by other equipment providing various services to the subscribers.

Each frame is comprised of symbols that are composed from digital payload data in 128 timeslots in the TDMA stream. Each time slot in the TDMA stream can carry 8 bits in some embodiments, but in the preferred embodiment, each timeslot carries 9 bits for reasons to be described below. Each timeslot is a channel which can carry digital data encoding some service such as video on demand, video teleconferencing, internet access, etc. The timeslots/ channels are assigned on an as-needed basis to the various subscriber RUs to transmit/receive data implementing the service in bidirectional communication with the CU.

The choice of 128 payload timeslots per frame is not coincidental. In telephony, a frame of data also comprises 128 timeslots, each carrying 8 bits of data. Each RU is in synchronization with the CU and knows when the beginning and end of each frame of data occurs. Each RU also knows which timeslot(s) has/have been assigned to it by virtue of side conversations each RU has with the channel assignment circuitry in the CU on the command and control channels (the remaining 16 channels of the 144 total channels).

Referring to FIG. 11, there is shown a block diagram of the system of FIG. 10 which shows more detail about one multichannel embodiment for the internal structure of each RU modems transmit channel circuitry for transmitting data to the CU. Dashed box 254 represents RU#1 while dashed box 256 represents RU#2. Each RU receives a time division multiplexed (TDMA) stream of digital data from the various devices that share the communication capability of coaxial cable/transmission media 251. For example, RU#1 is coupled to an interactive television 258, and is also connected to a personal computer 260 and a videophone 262. An interactive television is a modified conventional TV wherein a user can send digital signals to the CU in response to things he or she sees on the television or as requests for specific video selections. Each of these devices has a digital data input/output port which is coupled to a time division multiplexer switch 264. The switch 264 combines data coming in from devices by placing bytes of data from each device into timeslots in a time division multiplexed (TDMA) stream of digital data on line 266. The TDMA stream for RU#2 is on line 267.

Each timeslot/channel can contain 9 bits of which 8 bits are devoted to encoding the data for that channel and 1 bit is used for management and control purposes. The 9th bit can be used as a tiny side channel for side conversations over and above the main data traffic for the channel. In alternative embodiments, any other number of bits per timeslot may also be used.

The 9 bit groups of bits in each timeslot are divided into three 3-bit groups called triple bits or tribits herein. These three triple bits from the time domain are a very short burst of data which get spread out in time in the code domain. The triple bits are spread out over time by selecting three different triple bit columns from an array in a framer memory described below for each incrementation of the read pointer and multiplexing these linear arrays of triple bits through the transmitter circuitry. The three columns of triple bits of each frame each span all 144 time slots of the TDMA input streams.

All symbols generated for the first frame for all active channels are encoded using orthogonal codes, and the results are combined for simultaneous transmission over the shared transmission media using a synchronous CDMA modulation scheme.

Each RU is capable of receiving data in up to 144 of the timeslots in the input TDMA stream and is capable of getting all that data to the CU. However, only 144 total channels are available for all RUs to share, so rarely does one RU use all 144 channels. Each RU requests the number of timeslots or channels it needs to provide services requested by the subscriber. This request is sent via a message on a command and control channels to the CU. The CU then sends a reply message telling the requesting RU which channels have been assigned to it. The CU will not assign the same channel to multiple RU's.

Each RU then uses the appropriate orthogonal codes in the encoders coupled to receive the data from the timeslots to which it has been assigned. For example, if RU#1 is assigned channels 1 and 2, and RU#2 is assigned to channel 3, RU#1 will use orthogonal codes #1 and #2 in the encoder coupled to receive the data in timeslots 1 and 2, and RU#2 will set orthogonal code #3 into the encoder coupled to receive the data from timeslot 3. That is, one orthogonal code is assigned to each payload channel and each command and control channel in the embodiment shown in FIG. 11. The transmit channel of each RU of the embodiment shown in FIG. 11 has a splitter like splitter 268. The purpose of this splitter in transmitting data to the CU 252 is to split out the data in each time slot of the time division multiplexed incoming data stream and apply the data from each time slot to one of a plurality of orthogonal code encoders for encoding using one orthogonal code from the code set used on the system. For example, in the hypothetical given above, the data from time slot #1 is output from the splitter on line 270 which is coupled to the data input port of orthogonal code #1 encoder 1, block 272, and the data from time slot 2 is sent via line 271 to encoder #2, block 273. The encoder 272 encodes the channel 1 data from time slot 1 using code #1 of the orthogonal code set in use in the system (actually, one row of the code matrix that defines the entire code set), and outputs the resulting modulated signal on line 274 which is coupled to one summing input of a summer node 276. Encoder #2, block 273, encodes the data from channel 2 in time slot 2 using code #2 from the orthogonal code set (a different row of the code matrix—rows or columns of the code matrix may be used interchangeably in the matrix multiplication of the transmit process so long as the matrix multiplication of the received signal vector times the transpose matrix is the opposite, i.e., if rows are used on the transmit side, columns are used on the receive side).

A controller circuit (not shown) in each RU which is coupled to communicate with the CU over a management and control channel and which is also coupled to each of the orthogonal code encoders, receives the channel assignments for the RU and selects the unique orthogonal code for the channel assigned. The controller circuit then controls each encoder to use the appropriate orthogonal code assigned to the channel when encoding data for that channel. Each encoder in the RUs which is active must use a different, unique, orthogonal code. No encoder will use the same code as another "active" encoder. An "active" encoder is an encoder which has been assigned to encode a particular channel for its RU.

After the data from the appropriate timeslot is parsed out of the TDMA stream by the splitter 268 and guided to the proper encoder and the proper orthogonal code is selected for use in the encoder, the data in the assigned timeslots/channels for each RU is encoded. This is done using the appropriate orthogonal codes assigned to those channels. The results are then transmitted to the CU simultaneously from all RUs over the shared transmission media 251. More precisely, the energy representing the data from the various timeslots/channels is spread out over the entire 125 microsecond duration of the frame by the action of the encoders. Because the data from the various timeslots is encoded using orthogonal codes, no interference between the data occurs during transmission of the encoded symbols in the code domain.

There is one encoder for each timeslot in each RU in the embodiment shown in FIG. 11. Each encoder spreads out the energy from its assigned channel over all the chips in the frame. Each encoder in each RU has its encoded output signal coupled to a summing input of a summer like summer 276. The function of the summer in each RU is to sum all the encoded signals and output them on a subscriber branch coaxial cable or other transmission media like branch cable 278. The transmission media like branch 278 are coupled through a directional coupler like coupler 280 to the main coaxial cable/transmission media 251. The combined output signals from each RU are added to the composite signal on the main coaxial cable by one or more directional couplers symbolized by coupler 280.

At the CU, the code domain signals on shared transmission media 251 are decoded by the decoders 282, 284 etc., and the resulting data is put back into the appropriate timeslots in the time domain TDMA data streams for output to the various equipment that is providing the requested services.

At the CU 252, the composite signal received from transmission media 251 is distributed to each of a plurality of decoders. A decoder for channel 1 is represented by block 282. This decoder uses the transpose of the code matrix which was used to encode the channel 1 data to extract any channel 1 information encoded into the composite signal by RU#1 (or whatever RU was assigned to channel 1). This decoding is done in the manner described previously in the discussion of FIGS. 1–3.

Likewise, the decoder for channel 2, represented by block 284, using the transpose code matrix to decodes any channel 2 information encoded into the composite signal by RU#2. In the embodiment of FIG. 11, there is one decoder in the CU for each channel in use, and each decoder uses the appropriate column of the transpose matrix $[c^T]$ corresponding to the code used by the corresponding RU to encode the channel being decoded. The resulting decoded digital signals are output on lines 286 and 288 to a switch which reassembles these digital signals to reproduce a composite of the time division multiplexed data streams which entered the RUs on lines 266, 267 etc.

In the embodiment shown in FIG. 11, only the transmit channels are shown and individual encoders are shown for each channel. In a more practical embodiment, only a single encoder is used in each transmit channel in each modem. This encoder is time shared to encode the data from the various timeslots. Usually, the single encoder is a suitably programmed microprocessor. Each RU modem also has a receive channel (not shown) which is structured similarly to the receive channel circuitry in the CU shown in FIG. 11. In some embodiments, the decoding in the receive channel and the encoding in the transmit channels are both done using a single microprocessor which has been suitably programmed. The choice of whether to use a shared microprocessor or multiple individual channels of hardware is largely dependent on data rate and cost considerations. If the data rates are high, multiple individual channels may be required. If data rates are low enough to use a shared microprocessor and cost is to be minimized, the shared microprocessor is preferred.

Typically, one RU will use less than all the 128 payload channels, but if one RU or a handful are using all 128 channels, no other RU can be awarded any bandwidth since only one RU can be on any particular channel at any particular time. Obviously, the orthogonal code set selected must have at least 128 codes. However, n the preferred embodiment, there are 128 data channels plus 16 management and control channels, for a total of 144 channels. Of the 16 management and control channels, 4 are access channels which carry traffic from the RUs to the CU requesting bandwidth and relinquishing awarded channels after the RU is finished using the channels awarded by the CU. Because there are 144 separate channels, an orthogonal code set having at least 144 unique, orthogonal codes must be used. Each channel has a maximum 72 kilobits per second data capacity in the preferred embodiment.

Channel allocation by the CU can take any one of a number of different forms. For example, the RUs could have a fixed allocation of channels or channels could be awarded in any number to any RU based upon need where the CU polls the individual RUs for their needs or the RUs transmit their needs asynchronously to the CU and the CU arbitrates between the requests to allocate the available channels. Likewise, one RU may have security considerations the require one channel to be dedicated to it at all times and no other RU is allowed to be on that channel as controlled by channel awards by the CU given in messages to the individual RU's. Alternatively, some channels can be made available for all RUs to use with the RUs themselves resolving contentions. In the preferred embodiment, there are four channel allocation schemes which are implemented either individually or in any combination in the CU channel allocation circuitry: (1) a reservation scheme where the RUs bid for bandwidth and the CU reserves certain channels to each of the RU's; (2) a contention mechanism where the RUs are notified by the CU of what channels are available to all RUs for traffic, and where the RUs transmit on those channels at will with contentions detected by the CU and contention notification messages to the RUs in contention to enter contention resolution procedures; (3) polling where the CU inquires of each RU sequentially whether it needs bandwidth and awards bandwidth as needed as determined from the polling with arbitration when not enough channels are available to meet all requests; (4) fixed allocation of the available channels to specific RU's. In the preferred embodiment, all four schemes can be used individually at times or any combination of the schemes can be used at times. Which channel allocation schemes are in use at particular times is established by the configuration data set up by the user. For example, one fourth of the channels may be put on a reservation scheme, one fourth of the channels may be left for contention, one fourth of the channels may have fixed allocation and the last fourth of the channels may be reserved for polling allocation. Each of these different mechanisms for allocation of bandwidth is believed to be known, standing alone. However, the applicant's believe it is new to provide a CU that can use any one of these methods or any user programmable combination of all four methods for user programmable groups of channels, all as established by entry of configuration data by a user during a configuration process.

Since the channel allocation mechanism is centralized in the embodiment of FIG. 11, the RUs have no burden other than to ask for the bandwidth they need. However, in alternative embodiments, the RUs may "bid" for channel allocations and some arbitration process carried out locally in the RUs may resolve any contentions.

By using spread spectrum modulation on the main coaxial cable 251, all the problems associated with pure time division multiplexing or pure frequency division multiplexing on such shared transmission media are avoided. In addition, use of the synchronous CDMA multiplexing and modulation techique with channels assigned on a non-fixed, flexible as-needed basis according to the teachings of the invention eliminates the waste of the so-called synchronous time division multiplexing schemes. In synchronous time division multiplexing schemes, each RU would have a fixed assignment of time slots, and those time slots would be transmitted even if they were empty, i.e., the RU had no traffic to send or receive during some or all of its time slots. Synchronous TDMA multiplexing schemes are described in "Data and Computer Communications" by Dr. William Stallings, at page 211–213, Macmillan Publishing Co., New York (4th Ed. 1994) ISBN0-02-415441-5 which is incorporated by reference herein.

A Code Division Multiple Access Transceiver

Figure 19:
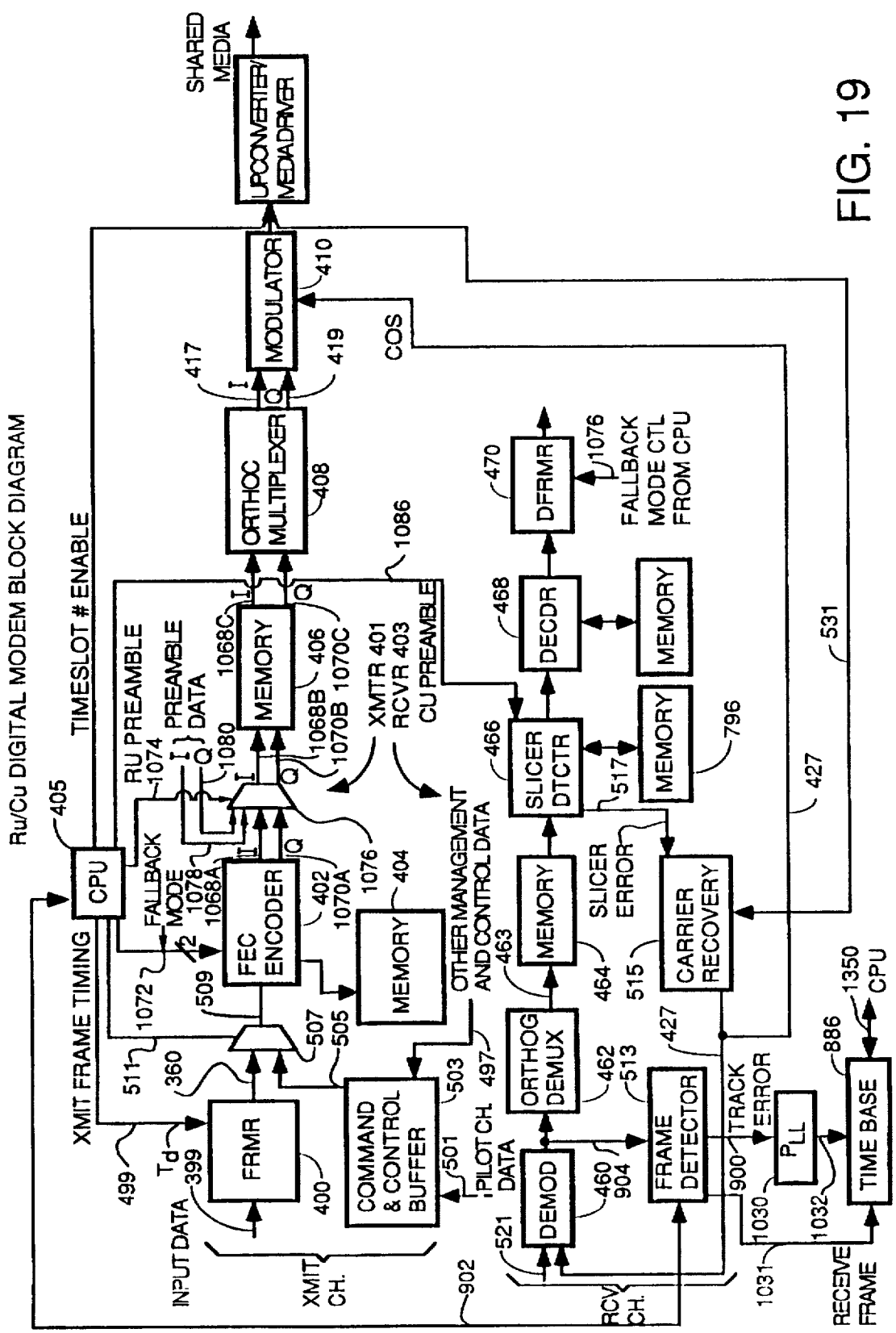
FIG. 19 is a general block diagram of the preferred embodiment of the transceiver circuitry included in each RU and CU.

Referring to FIG. 19, there is shown a block diagram of the preferred embodiment of a transceiver for use in the modem of each RU and CU. The transmit channel of the transceiver uses a framer 400 to compose from the TDMA data stream the symbols of each frame for encoding and transmission. The framer memory 400 and its associated circuitry implement the variable delay, flow control and bridge the two time domains between the TDMA input data and the chip clock code domain (reading is based upon chip clock and writing is based upon byte clock). The output data stream from the framer is an array of tribits that span the entire 144 timeslots, with three such arrays presented during each frame. Each tribit is a symbol in a frame for transmission.

In the preferred embodiment, the circuitry of the transceiver is virtually all digital, so the arrays of tribits are true arrays elements of which are used sequentially in the matrix multiplication of orthogonal encoding.

In analog embodiments, the arrays of tribits will be streams of tribits, with three separate streams per frame.

Before finishing the description of the rest of the transceiver circuitry in FIG. 19, the framer circuit 400 will be described in more detail. The RU's and CU all utilize framer circuitry to implement the delays needed to transmit data in synchronization to each other. The framer is comprised of a FIFO memory and supporting circuitry that stores incoming digital data from the time division multiplexed data stream received by each RU and CU. The symbols of each frame are composed by outputting the data for from the FIFO memory in a different way than it was loaded during each frame. The basic idea is to pass the 9 bit groups of each time slot through the analog of a FIFO delay line implemented by a memory so as to simultaneously implement the delay imposed by each RU and CU needed for synchronization while providing a convenient way to compose the symbols of each frame from the data in the TDMA data stream.

Figure 12:
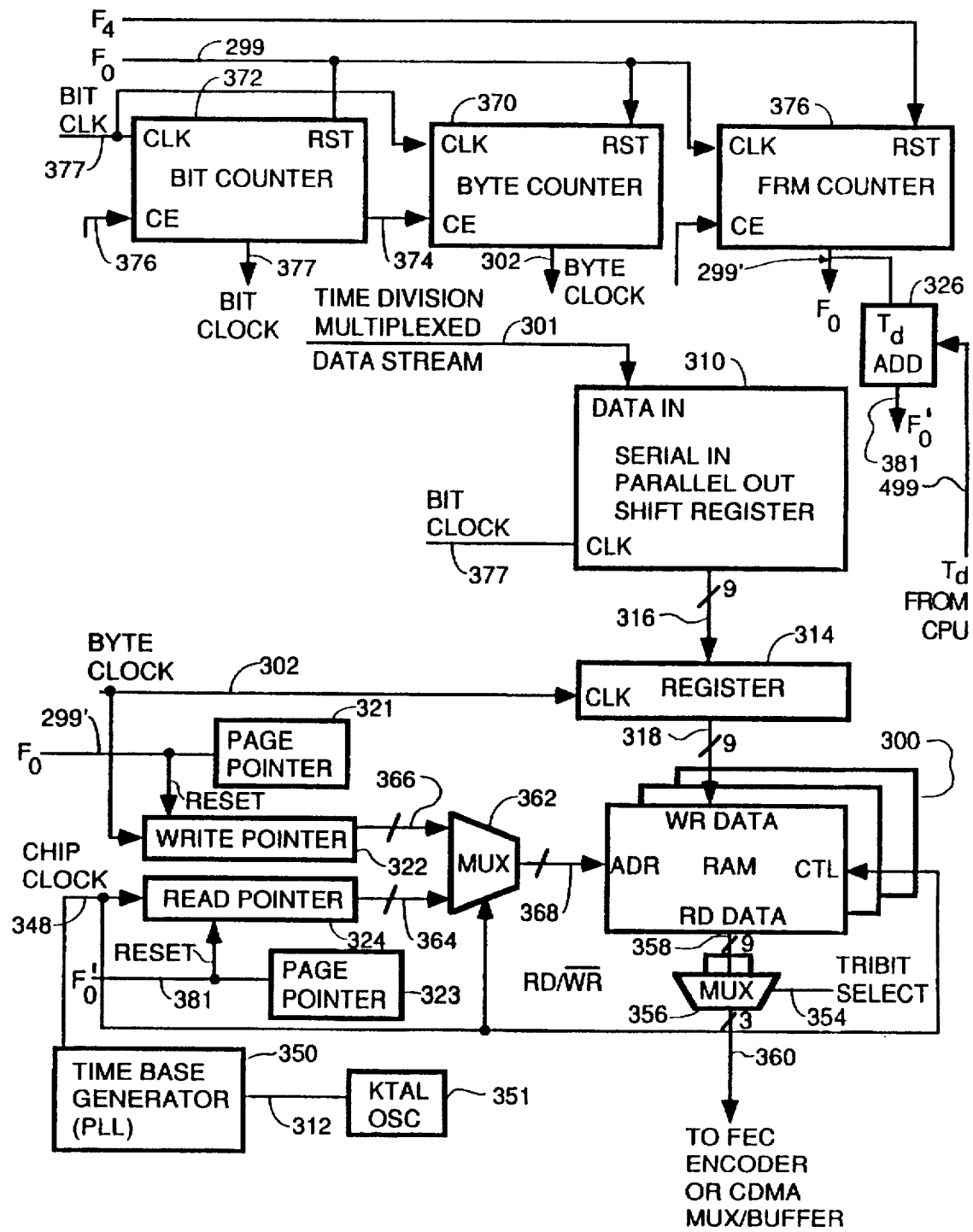
FIG. 12 shows the circuitry that implements the framer memory in the preferred embodiment which converts the TDMA input data streams into three columns of tribits for encoding and conversion by other circuitry into the three symbols of 144 chips apiece that are transmitted during every frame.
Figure 13:
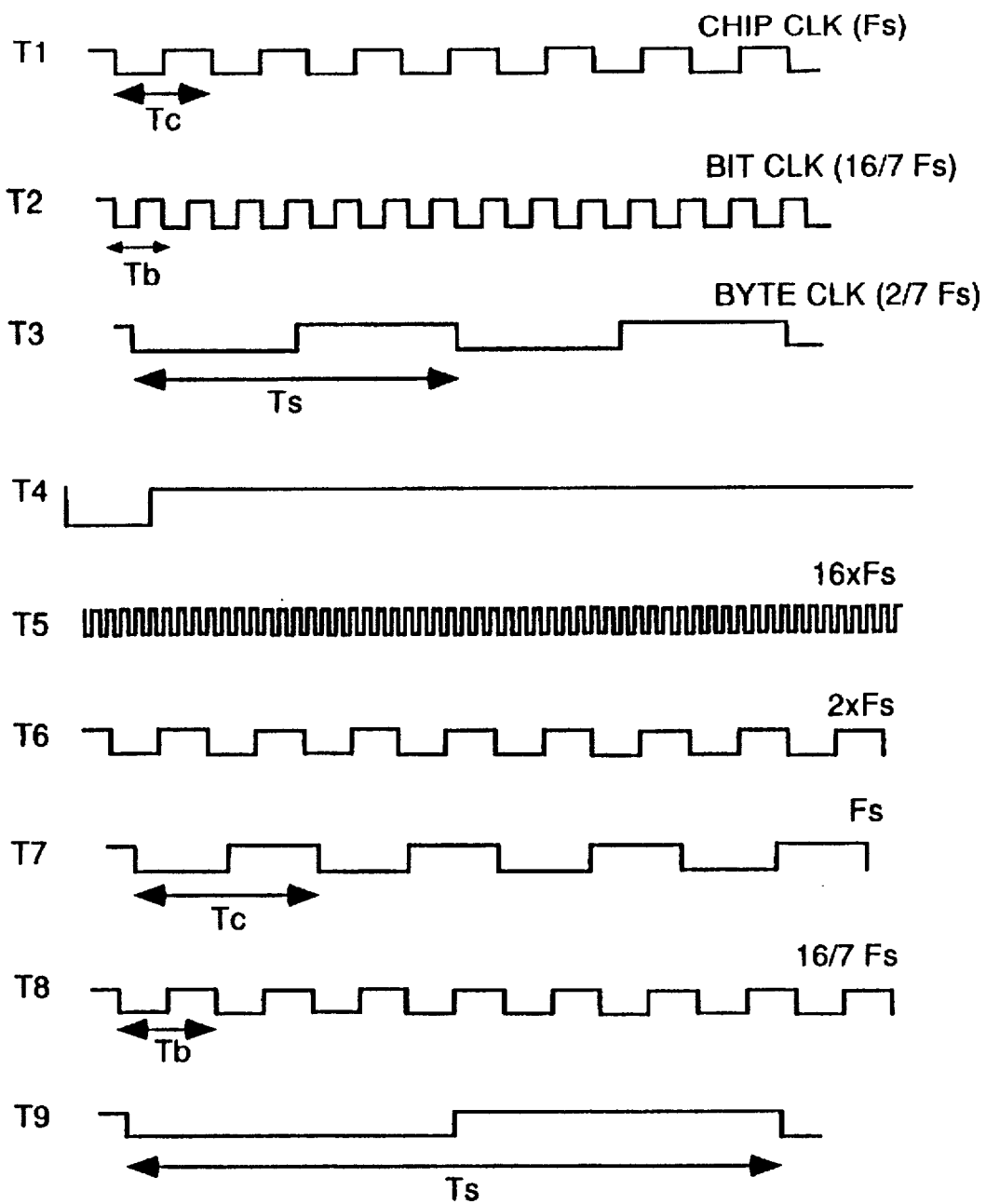
FIG. 13 shows the timing relationships between the chip clock signal which sets timing in the code domain and the bit and byte clocks which set timing in the time domain.

FIG. 12 shows the circuitry that implements the framer in the preferred embodiment, and FIG. 13 shows the timing relationships between the chip clock signal which sets timing in the code domain and the bit and byte clocks which set timing in the time domain. FIG. 13 also shows a number of other signals generated by time base generator 350. The basic period from which all other signals are generated is the chip clock signal shown on time line T1 of FIG. 13. The relationships between the periods of the various signals in FIG. 13 is shown in parentheses at the right edge of each signal. For example, for the bit clock signal shown on time line T2 of FIG. 13, for every 7 periods of the chip clock signal, there are 16 periods of the bit clock signal. For every 7 periods in the chip clock signal, there are two periods in the byte clock signal shown on time line T3 in FIG. 13. Handling of the TDMA stream is synchronized to the bit clock and byte clock signals.

Figure 18:
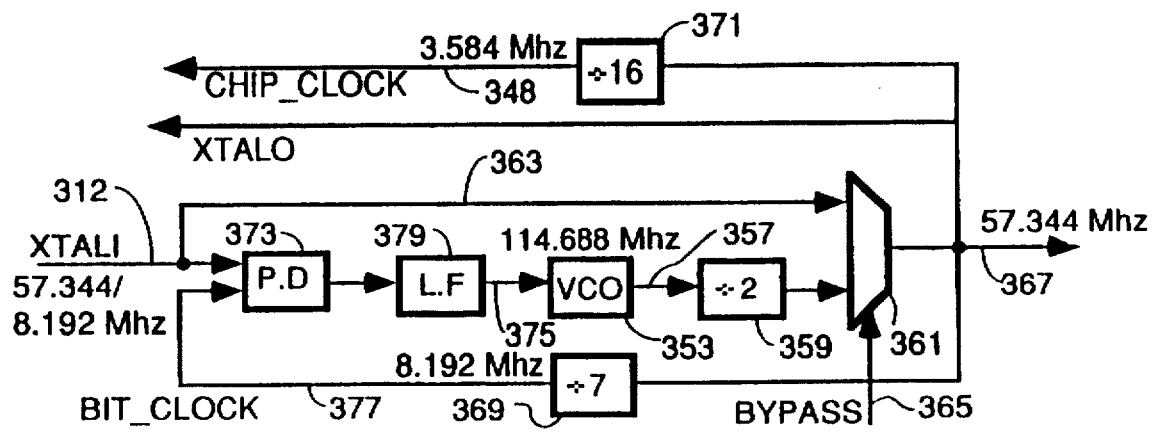
FIG. 18 is a block diagram of the time base generator.

The chip clock signal on line 348 of FIG. 12 is generated by a time base generator PLL 350 and is synchronized with the TDMA data stream by the action of the PLL in keeping both the chip clock and bit clock signals synchronized with the crystal oscillator reference signal. A block diagram of the time base generator 350 is shown in FIG. 18. A voltage controlled oscillator 353 operating at a frequency of 114.688 Mhz sets the basic operating frequency. The output frequency of the VCO on line 357 is divided by two by a divide-by-two counter 359. The result is coupled to one input of a multiplexer 361. The multiplexer has as its other input the crystal controlled oscillator frequency on line 363. The multiplexer switching is controlled by a bypass signal on line 365 so as to normally select the output of the counter 359 and couple it to output line 367. The PLL time base generator generates the bit clock signal on line 377 by dividing the frequency of the signal on line 367 by a factor of 7 in a divide-by-seven counter 369 to generate a bit clock signal on line 377 having a frequency of 8.192 Mhz. The chip clock signal on line 348 is generated by dividing the frequency on line 367 by a factor of 16 in a divide-by-16 counter 371 to generate a chip clock signal having a frequency of 3.548 Mhz. The bit clock and chip clock signals are kept synchronized to the crystal frequency by a phase detector 373 which compares the phase of the crystal signal to the phase of the bit clock signal and outputs a signal which is coupled to the frequency control input 375 of the VCO through a low pass filter 397. The bit clock signal and phase detector causes the PLL to force the transitions of the chip clock signal to line up properly with the bit clock transitions in the relationship of 16 periods of bit clock for every 7 periods of chip clock.

The relationships between timing in the time domain and timing in the code domain are as follows:

There are 144 total time slots or channels in the TDMA stream, of which 128 are payload time slots and 16 are management and control time slots;

Each time slot or channel in the TDMA streams carries 9 bits of digital data synchronized with the bit clock;

One time slot worth of data or 9 bits is stored in the framer for each cycle of the byte clock;

1 frame=144 times slots, each with 9 bits plus 16 chips for the alignment gap;

1 frame also equals 3 symbols plus the 16 chip periods of the alignment gap=448 chip periods;

1 symbol=144 chip periods;

1 gap=16 chip periods;

For every 16 bit clock periods, there are 7 chip clock periods, and for every byte clock period, there are 9 bit clock periods.

To implement the delay necessary in each RU and CU transmit channel circuitry to maintain frame synchronization, consider the following with reference to FIG. 12. The data stream coming into the framer circuitry during each time slot is stored in a different address in memory 300 in FIG. 12 at the data rate of the byte clock signal on line 302. The byte clock signal on line 302 is generated by a byte counter 370 shown at the top of FIG. 12 which generates a byte clock signal transition on line 302 every 9 cycles of the bit clock signal on line 377 from the time base generator 350. Memory 300 is a three page memory and the addressing circuitry of FIG. 12 controls the address and data ports such that data is written into and read from the two pages by alternating the use of these buses. Data from the time slots/channels in the time division multiplexed stream of serial data on line 301 is shifted serially into a serial-in, parallel-out shift register 310 at the bit clock rate of the signal on line 377. The byte clock signal on line 302 causes a register 314 to store the current 9-bit, parallel format output of the shift register on bus 316 after each 9 new bits are shifted into shift register 310.

The 9 bit parallel format output of the register 314 is presented on 9-bit bus 318 to the write data input port of memory 300. Thus, a new 9-bit group of data from the TDMA stream is presented for storage on each cycle of the byte clock signal. Each 9-bit group of data from the TDMA stream is stored in a different memory location of memory 300 as will become clear from the discussion of the address generation circuitry described below.

Data is read out of memory 300 at the same rate at which it was stored, but starting at some programmable time after the data is stored, thereby implementing the variable delay needed to maintain frame synchronization with the CU frame timing. This programmable delay $T_d$ is set by the difference in addresses between the address stored in a receive frame counter (read pointer) and the address stored in a transmit frame counter 324 in FIG. 15 (write pointer).

Figure 16:
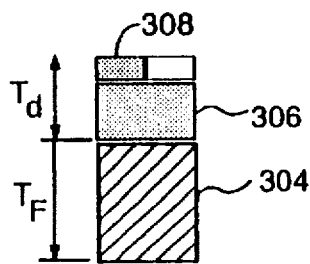
FIG. 16 represents portions of the framer memory 300 with the stippled portion representing the number of addresses difference between the position of the read pointer and the position of the write pointer to implement the transmit frame timing reference delay.

To illustrate this concept, FIG. 16 represents portions of memory 300 with the stippled portion representing the number of addresses difference between the position of the read pointer and the position of the write pointer to implement the delay $T_d$. The cross hatched portion 304 represents one frame of 9-bit bytes while the stippled portions 306 and 308 represent the amount of the delay $T_d$, where portion 306 represents a portion of the delay $T_d$ expressed in full 9-bit bytes, and portion 308 represents the remainder of the delay $T_d$ expressed as part of a byte. In other words, the delay $T_d$ may be some fraction of the number of bit clocks making up an entire 9-bit byte. This is because the delay needed to maintain frame synchronization may not work out to be an integer number of byte clocks.

Figure 15:
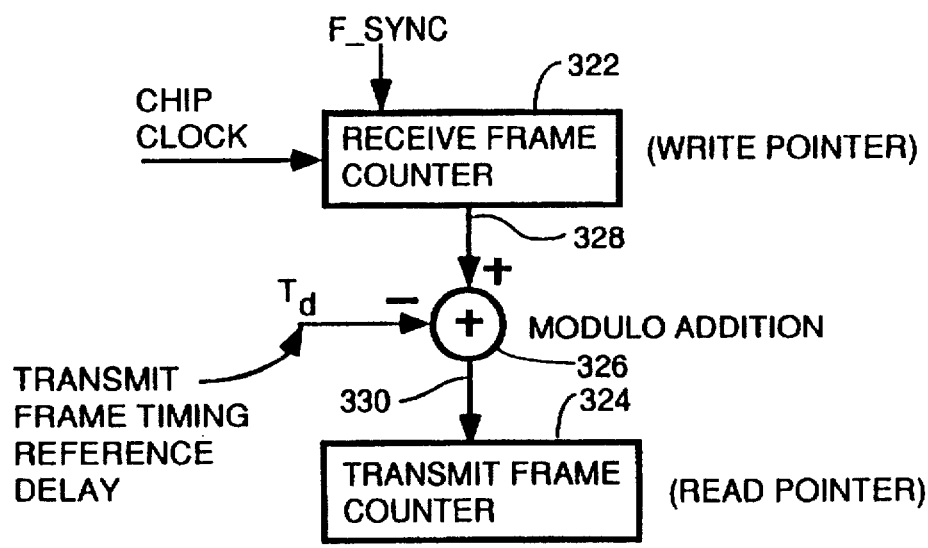
FIG. 15 is a diagram illustrating in block diagram form how the delay necessary in each RU and CU to maintain frame synchronization system-wide is achieved.

FIG. 15 shows how the time delay $T_d$ is implemented using a receive frame counter 322 that generates the write pointer address controlling where incoming data is stored in the memory 300 and a transmit frame counter 324 that generates a read address pointer that controls the read address from which data is read for transmission. The F_sync signal on line 326 resets the write pointer in counter 322 to zero at the beginning of each new frame. A modulo adder 326 adds the number of chip clocks based upon the desired time delay $T_d$ to the output write pointer on bus 328 and inputs the result into the transmit frame counter 324 as the read pointer. The value of $T_d$ is varied on a trial and error basis during the synchronization process until the gap is hit and the CU sends a message to whatever RU is synchronizing telling it to freeze $T_d$ at the value that caused the gap to be hit by the barker code.

Figure 14:
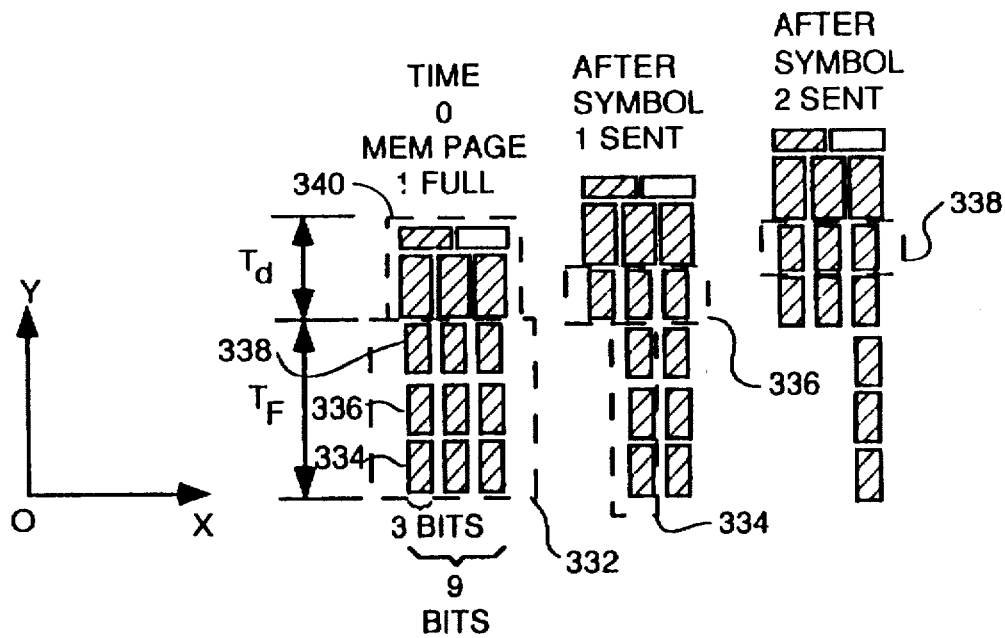
FIG. 14 is a memory filling diagram that illustrates how entire 9-bit bytes are received continuously from the timeslots of the TDMA stream, but 3 bit tribits for each of 128 data channels and 16 command and control channels are sent out simultaneously to circuitry which composes the symbols of each frame.

FIG. 14 is a memory filling diagram that illustrates how entire 9-bit bytes are received continuously, while 3-bit tribits for each of 144 channels are sent out simultaneously to compose the symbols of each frame. FIG. 14 graphically illustrates how the frame memory 300 fills and is emptied during this process. Frame memory 300 has 144 memory locations corresponding to the 144 channels of the system on each of three pages. While one page is being filled, another page is being simultaneously emptied at the same rate. Each memory address on each page can store the 9 bits of data from one of the 144 time slots in the TDMA stream. 16 memory locations on each page are reserved for the storage of management and control data to be sent across the 16 management and control channels. In FIG. 14, address numbers increase with an increasing Y coordinate.

At time (0) in FIG. 14 (the leftmost column), page one of the memory is shown as completely full with one frame of data comprised of three vertical columns of three crosshatched blocks apiece. Each column of three blocks, such as blocks 334, 336 and 338 represent one symbol, each symbol having 48 tribits therein. The middle column of FIG. 14 represents the state of fill of the memory after transmission of the first symbol comprised of blocks 334, 336 and 338. The rightmost column of FIG. 14 represents the state of fill of the memory after transmission of symbol 2 comprised of blocks encircled by dashed line 334.

The width along the X axis of each individual crosshatched block in FIG. 14 is 35 equal to the 3 bits of a tribit, and the entire width of a column of blocks is equal to the 9 bits of a time slot. The positive x direction represents increasing time in the time domain. In other words, the first 9-bit byte that is stored is stored in the lowest row of the lowest three blocks in the left column with increasing time in the TDMA stream extending from left to right.

The blocks surrounded by dashed line 332 in the leftmost column represent 144 memory locations, each storing the 9 bits from one of the 144 time slots in one frame of data. The three crosshatched blocks 334, 336 and 338 represent the first symbol of the first frame, each symbol storing 48 tribits. Note in the middle column, after transmission of the first symbol in the frame, these three blocks are gone. Note also that the data of symbol 1 is read out of the memory "across time", i.e., along the y axis, thereby interleaving the data from the first tribits of individual channels in the time domain into different temporal relationships in the code domain and spreading out the energy of the time slot data over the entire frame interval. This is part of the teaching of code division, multiple access or CDMA modulation schemes.

The three blocks within dashed box 334 in the middle column of FIG. 14 represent the second symbol of data that is to be transmitted in the first frame. Note that these three blocks are gone in the rightmost column representing the state of page one of the memory fill after transmission of the second symbol.

While the first and second symbols are being transmitted, another page of the memory 300 continues to fill up as the data from new timeslots is received. For example, while symbol 1 from page 1 of the memory is being transmitted during the first frame, the data in the three blocks encircled by dashed line 336 in the middle column is received in page 2 of the memory and stored. Thus, while one third of the data from page 1 is read and transmitted, one third of page 2 of the memory is filled with new data. Likewise, while the second symbol of page 1 is being transmitted, the data represented by the three blocks encircled by dashed line 338 in the right column is received and stored in page 2 of the memory.

The blocks encircled by dashed box 340 represents the delay $T_d$ implemented by modulo adder 326 in FIG. 15 and the 16 chip alignment gap.

Figure 17:
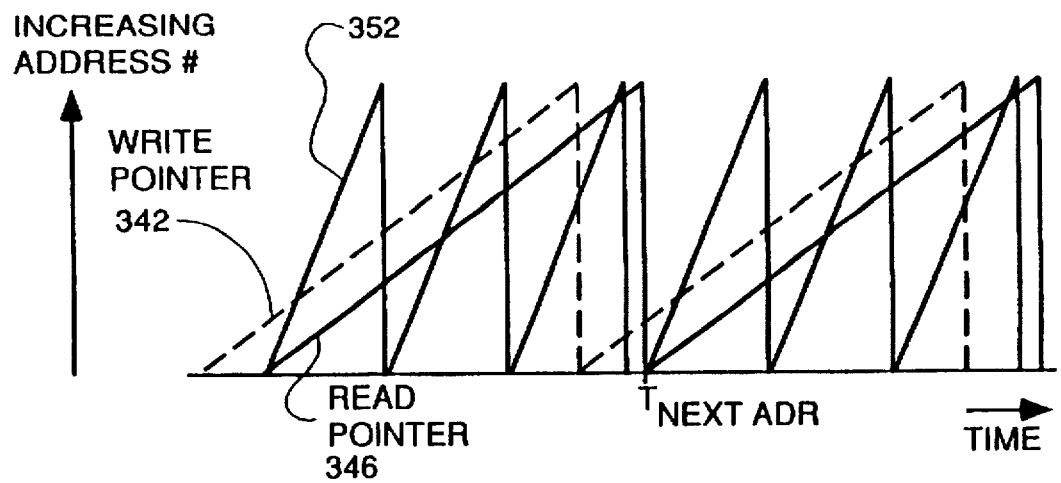
FIG. 17 is a timing diagram showing the relative rates of incrementation of the read and write pointers in the framer.

FIG. 17 is a diagram of the relative rates of address incrementation of the read and write pointers used to manage the framer buffer memory 300 including the relative timing of address incrementation for reading the tribits. Dashed line 342 represents the rate of address incrementation of the write pointer generated by counter 322 in FIGS. 12 and 15. This counter counts transitions in the byte clock signal on line 302 in FIG. 12, with the byte clock signal shown on time line T3 in FIG. 13. Every cycle of the byte clock signal causes register 314 in FIG. 12 to latch a new 9-bit byte therein and present it on bus 318 to the write data port of two-port memory 300. Every cycle of the byte counter also causes write pointer counter 322 to present a new write pointer address on bus 366 for use in controlling where the data on bus 318 is stored. A multiplexer 362 having its output coupled to the address port of memory 300 and having as its inputs the write pointer on bus 366 and the read pointer on bus 364 is suitably switched so that the write pointer and read pointer addresses are presented at the appropriate times at the address port to implement the memory filling and memory reading operations described herein.

The bit clock signal on line 377 in FIG. 12 is used to clock the serial-in, parallel out shift register 310. The bit clock signal is generated by the time base generator shown in FIG. 18 and is counted by a modulo 9 bit counter 372 shown at the top of FIG. 12 for purposes of helping generate the byte clock signal on line 302 in FIG. 12. This counter 372 counts the bit clock signal on line 377 from time base generator 350 modulo 9 and outputs a transition to logic 0 on line 374 after every 9th bit period. The transition on line 374 acts as a count enable signal to byte counter 370 to enable incrementation of the byte counter 370 by the next bit clock cycle. This generates the byte counter signal on line 302. The bit counter 372 is always enabled by the hard wired count enable signal on line 376. Both the bit counter and the byte counter are reset to 0 by asserting the $F_0$ signal on line 373 for fast resetting/resynchronization of the system. The $F_0$ signal occurs at the end of each frame. The $F_0$ signal is generated by a portion of the time base generator not shown in FIG. 18, and is counted as a clock signal by frame counter 375 which outputs a synchronized $F_0$ signal on line 373. The frame counter 376 is reset every 4th frame by a super frame signal $F_4$.

The time delay $T_d$ necessary for hitting the alignment gap with a barker code transmission is added to the $F_0$ signal on line 373 by the modulo adder 326 to generate the $F_0'$ signal on line 381. The $F_0$ signal on line 373 also increments the page pointer 321 for the write pointer and simultaneously resets the write pointer 322 to zero at the end of each frame so as to cause a page swap and begin writing again at address 0 of the next page.

The delayed $F_0'$ signal on line 381 increments the page pointer 323 of the read address circuitry to cause a page swap and simultaneously resets the read pointer counter 324 to zero so as to begin reading at address 0 of the next page at the end of the frame.

Returning to the consideration of FIG. 17, solid line 346 represents the rate of emptying the frame memory 300 in FIG. 12. This rate of emptying is based upon incrementation of the read pointer counter which counts the chip clock signal on line 348 from time base generator 350. Since each symbol stores 144 tribits from 144 different channels and since there are three symbols and a 16 chip gap in each frame, the total number of chips in a frame is 448. Since all the 432 tribits of all three symbols of the frame must be read out while the byte counter is counting to 144 to store a frame's worth of 9-bit bytes of data from 144 channels or time slots, the read pointer is incremented on the chip clock signal. This causes all 432 tribits from all three symbols of a frame to be read out while the next frame of data is being stored thereby preventing overflow of memory 300. This is why the read pointer line 346 in FIG. 17 is shown as emptying the memory at the same rate as the write pointer fills it.

Line 352 in FIG. 17 represents the rate of incrementation of the read pointer counter 324 in FIG. 12. The read pointer counter increments on each cycle of the chip clock signal such that it increments from 0 to 143 during the time to read all the tribits from the first symbol. This has the effect of causing the 9 bits of data from each of the 144 timeslots or channels to appear sequentially at the read data output bus 358.

However, it is desired to only unload all 144 tribits from a single symbol during one symbol time, so some switching on the output bus is needed, as described below.

A tribit select counter which is not shown in FIG. 12 coupled with a multiplexer 356 does this switching. This tribit select counter generates a tribit select signal on line 354 in FIG. 12 which controls switching by a multiplexer 356. This multiplexer has an input coupled to the 9-bit read data output port 358 of the memory 300. The tribit select counter counts at a rate to generate the select signal on line 354 in such a way as to cause only tribits from the first symbol to be output from the multiplexer 356 on bus 360 during the time that first symbol is being transmitted.

Figure 20:
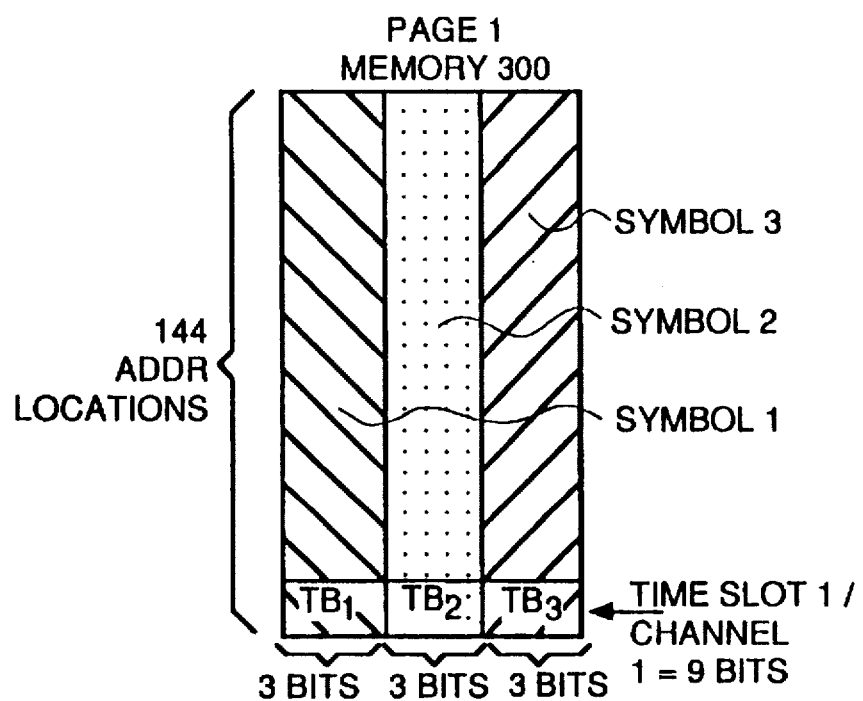
FIG. 20 is a diagram which helps illustrate the manner in which framer memory 300 is emptied for transmission.

FIG. 20 is a diagram which helps illustrate the manner in which framer memory 300 is emptied for transmission. FIG. 20 shows a completely filled page 1 of memory 300 in FIG. 12 comprising 144 memory addresses, each filled with one 9-bit byte, and divided into three columns of 3-bit tribits. Each column, marked by the legends symbol 1, symbol 2 and symbol 3, is comprised of 144 tribits and represents one symbol of a frame. To send this frame of data, the read pointer will increment 144 times during the time the first symbol is being encoded. The state of the tribit select counter during this first 144 cycles is such that only the 144 tribits of symbol 1 will be output on bus 360 to the encoder 402.

After the 144th incrementation, the read pointer counter 324 rolls over to zero and begins to count up to 143 again. At the 144th incrementation, the tribit select counter increments which causes the multiplexer 356 to select the middle column of tribits from symbol 2 in FIG. 20 for output on bus 360 in FIG. 12 to the encoder 402 in FIG. 19. A similar process unloads the 144 tribits of symbol 3.

Bus 360 in FIG. 12 is coupled to a convolutional encoder 402 in FIG. 19 which will be explained in more detail below. In FIG. 12, a multiplexer 362 having its output coupled to the address input of the framer memory 300 has two inputs: one is coupled to the output of the read pointer counter 324 and the other is coupled to the output of the write pointer counter 322. This multiplexer alternately couples the read pointer on bus 364 and the write pointer 366 to the address port 368 of the memory 300 on every cycle of the chip clock signal on line 348. The chip clock signal is also coupled to the control input of the memory 300 to serve as the RD/WR* control signal controlling whether the memory uses the address at port 368 in a read or a write transaction.

Returning to the consideration of the transceiver block diagram of FIG. 19, the output data streams from the framer on bus 360 in FIG. 12 may optionally be passed through a convolutional encoder 402 in FIG. 19 to add redundancy by calculating a 4th bit for each tribit.

The encoder 402 in the transmitter is a state machine which, in conjunction with state memory 404, receives the stream of tribits for each symbol and calculates a 4th redundancy bit for each tribit. This 4th bit provides redundancy for error detection and correction and for use by a Viterbi Decoder in the receiver in ascertaining with greater accuracy the data that was actually sent despite the presence of noise. The 4th bit in each tribit is part of the trellis modulation scheme and is generated by the convolutional encoder 402. A three bit constellation would normally have only 8 points. However, trellis modulation adds redundant bits interspersed in the information stream of tribits and increases the size of the constellation to enable more spacing between constellation points thereby enabling better discrimination between points by the receiver and lowering the bit error rate without increasing the bandwidth. In noisy environments like CATV media, trellis modulation is preferred, but some species of the invention will work without the redundant 4th bits and using a smaller constellation. In the preferred embodiment, the encoder is used to provide greater accuracy and better noise immunity. The encoder, in the preferred embodiment, is a state machine but it could also be a lookup table implemented in RAM or ROM etc. The implementation of the state machine is not critical as long as the implementation is fast enough to keep up with the chip clock data rate. For purposes of this discussion, it will be assumed that the convolutional encoder 402 is present.

M-ary Modulation in Code Division Multiple Access System

Figures 21, 22:
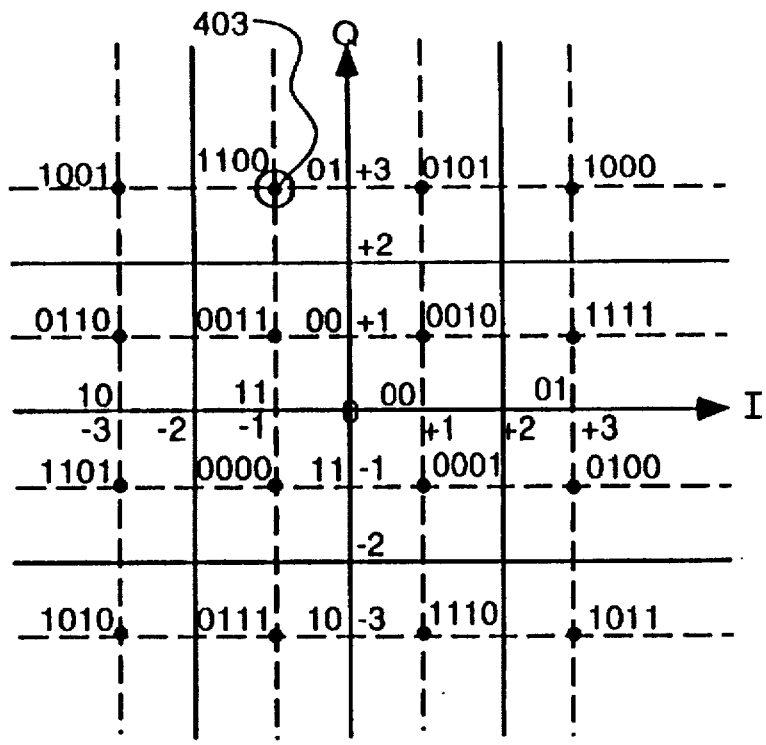
FIG. 21 maps each of 16 possible input points, i.e., permutations of the 4 bit "chips" in each symbol array, to a point in space defined by the in-phase or I axis for the real part and the quadrature or Q axis for the imaginary part of each point to implements M-ary QAM modulation.
FIG. 22 is a table listing all the possible input points of FIG. 21, I.e., the 16 combinations of 4 bit chips in the Code column and the corresponding 2's complement digital representation of the I and Q coordinates for each combination in the Inphase and Quadrature columns, respectively.

The output of the convolutional encoder 402 is an array of 4-bit digital numbers for each of symbols 1, 2 and 3 shown in FIG. 20. Each of these 4-bit numbers has two bits representing a real part and two bits representing an imaginary part. Thus, the information vector |b| shown at 481 for use in the matrix multiplication for CDMA spreading of each symbol is comprised of 144 4-bit elements, each element comprising one tribit plus the additional 4th bit calculated by the convolutional encoder 402 as shown in FIG. 23A. Each 4-bit symbol element in FIG. 23A, such as element 483 represents one third of the information bits from the corresponding timeslot in the TDMA stream input the transceiver plus the redundant bit calculated by the convolutional encoder 402. FIG. 23A illustrates how the information vector |b| for each symbol has its energy spread over time by the process of code division multiplexing implemented using matrix multiplication of the information vector [b] of each symbol times a matrix of orthogonal codes. The first two bits of each 4-bit symbol element are used to define the amplitude of either the I or Q coordinate, and the last two bits are used to define the amplitude of the other coordinate. The constellation of input point mappings of all possible points defined by a 4 bit symbol element or "chip" is shown in FIG. 21. FIG. 21 maps each of 16 possible input points, i.e., permutations of the 4 bits of each chip in each symbol array to a point in space defined by the in-phase or I axis for the real part and the quadrature or Q axis for the imaginary part of each point. The I coordinate of each point represents the amplitude for that point imposed upon the sine wave carrier fed to the modulator 410 in FIG. 19 to modulate that point. The Q coordinate of each point in the constellation represents the amplitude imposed by modulator 410 on the cosine wave carrier fed to it in order to modulate the point in QAM trellis modulation. FIG. 22 is a table listing all the possible 16 combinations of 4 bits in the Code column and the corresponding 2's complement digital representation of the real and imaginary coordinates for each combination in the Inphase and Quadrature columns, respectively. For example, the input point 1100 maps to a point having a +3 imaginary coordinate and a −1 real coordinate on the constellation of FIG. 21. The mapping of FIG. 21 was selected to give maximum separation between points in the constellation for best noise immunity, but any other mapping would also work. Likewise, 2's complement representation is not required for the coordinates as they can be represented in other number systems as well. In the preferred embodiment, the encoder 402 is a trellis encoder coupled to a state memory 404. The function of the trellis encoder 402 is to select the bit to append to each tribit to put it at a place in the 16 point constellation of FIG. 21 which gives maximum noise immunity. This selection is made according to known trellis modulation principles based upon the previous states. In other words, trellis encoder 402 and state memory 404 comprise a state machine which transitions to one of the 16 states or points in the constellation based during each chip time based upon the incoming tribit data and the previous states. The memory 404, in the preferred embodiment, is large enough to record the last state for each of the time slots, so as each tribit arrives, the last state for the time slot from which the tribit was generated is looked up in memory 404, and the tribit is encoded based upon that channel's prior state The stream of 4-bit symbol elements that are output from the encoder 402 are stored in memory 406 as three different linear arrays corresponding to symbols 1, 2 and 3 in FIG. 20. Each 4-bit symbol element is a complex number comprised of 2 bits which define the I or inphase coordinate of a constellation point and 2 bits which define the Q or quadrature coordinate of the same constellation point.

After passing the tribit stream from the framer 400 through the encoder, the resulting 4-bit data streams are stored as separate arrays for each symbol in memory 406. Each symbol is comprised of two linear arrays of 2 bit numbers: one array contains multiple 2-bit elements defining the real or inphase "I" coordinates for all the elements of the symbol and the other array stores the 2-bit elements which define the imaginary or quadrature "Q" coordinate of each symbol element. The 144 array elements of each symbol define an information vector b for each symbol. The code division multiplexer 408 then spreads each information vector with a separate orthogonal code for each channel and combines the spread data into a single orthogonally coded data stream.

FIG. 23 shows the matrix multiplication process which is performed within code division multiplexer 408 in FIG. 19 to multiply each of the two linear arrays that define each symbol times the orthogonal code matrix [c]. In the preferred embodiment, the matrix multiplication is performed by a microprocessor, but any machine that can do the matrix multiplication will suffice to practice the invention.

The encoding in CDMA MUX 408 spreads the energy of the symbols over time using orthogonal codes or orthogonal, cyclic codes. This is done in two steps. First, a linear array information vector of just real, i.e., inphase coordinates of the symbol to be transmitted, symbolized by array 405 in FIG. 23, is multiplied by the code matrix 407. This operation generates another linear array of real or inphase coordinates along the R axis of a result space in a results constellation similar to the constellation of all possible input points shown in FIG. 21. This first linear array 409 defines the real axis coordinates in the result constellation for a plurality of chips from the first symbol to be transmitted.

Second, the same process is repeated for the imaginary coordinate linear array (not shown) for the same symbol the real coordinates of which were just processed. This results in another linear array comprising the imaginary or quadrature coordinates of the chips in the results array. This imaginary component array of the results array also is not shown in FIG. 23.

The real component array, represented by linear array 409, is part of an overall result or "chips out" array which contains both the real and imaginary coordinates of a plurality of chips to be transmitted. These chips map to points in the result space, and the points in the result space map to whatever points in the input point space that are defined by the real and imaginary components in the information vector array b, of which array 405 is the real part. The mapping between the input point space and the results space is defined by the contents of the code matrix and the orthogonal codes.

Before performing the matrix multiplication, the 2's complement values of the real and imaginary components of the information vector b input array are converted to their decimal equivalents as shown in FIG. 23 in some embodiments. FIG. 23 is a PATENT simplified version of the system in which there are only 4 channels resulting in 4 elements of each symbol. The 4 real components of the information vector b shown in array 405 after conversion to their decimal equivalents, are, respectively, +3, −1, −1 and +3. This column of numbers is multiplied by the first row in the code matrix to yield the result 4 as the first real component in array 409 of the results array. This result is derived from summing the partial products as follows [(3×1)+(−1×1)+(−1×1) +(3×1)]=4. The next component down in the real part array 409, i.e., 0, is derived by multiplying the next real component down in the array 405 times the second row of the code matrix in a similar manner yielding [(−1×−1)+(−1×−1)+(−1×1)+(−1×1)]=0. In the preferred embodiment, arrays 405 and 409 would be 144 elements long, and the code matrix 407 would have 144 elements in each row and would have 144 rows.

The CDMA MUX 408 in FIG. 19 that does the matrix multiplication can be a programmed microprocessor or a dedicated custom logic circuit, etc. Any design which can perform the multiplication of the information vector times the code elements for all the active channels will suffice. Since the code matrix is comprised of purely 1's and −1', the multiplication is made simpler. If the codes in the code matrix are Hadamard codes, the matrix multiplication can be made using the Fast Hadamard Transform algorithm in a digital signal processor or microprocessor. If the code matrix is comprised of sin and cosine terms, the Fast Fourier Transform can be used. Although any orthogonal or any cyclic code can be used to practice the invention, cyclic codes are preferred.

The resulting real and imaginary component linear arrays of the results or chips out array are stored in a memory within the CDMA Mux 408 which is not separately shown. The components of these two arrays are then output on separate I and Q buses to a modulator 410 where they are used to amplitude modulate the amplitudes of two RF carriers that are 90 degrees out of phase using a trellis code modulation scheme. The constellation of possible data points arranged into a trellis is shown in FIG. 21. The resulting two AM carriers are summed and output on the shared transmission media 412. This is done as illustrated in FIG. 24.

Figure 24:
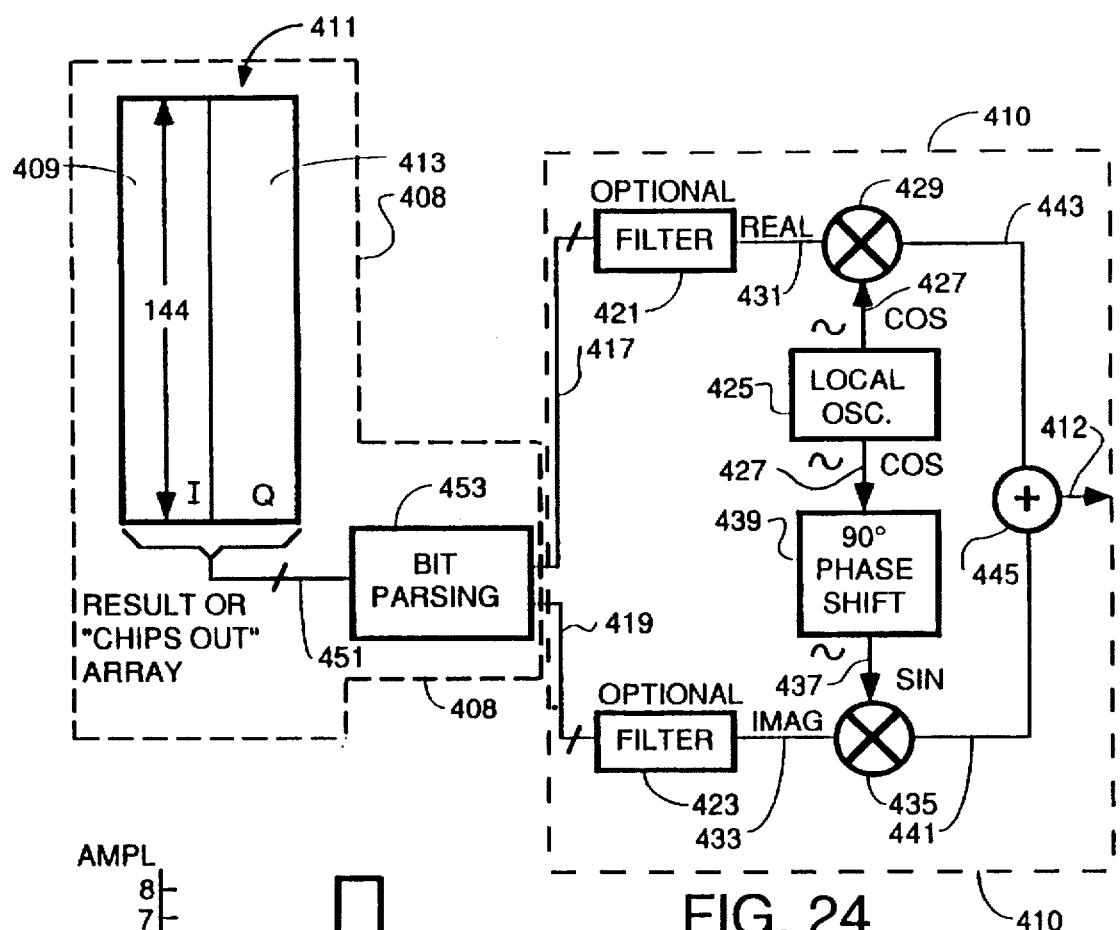
FIG. 24 is a block diagram illustrating more details of the components and operation of the multiplexer 408 and the QAM modulator 410 used in the preferred species within the inventive genus.

Referring to FIG. 24, more details of the coordination of the multiplexer 408 and the modulator 410 are illustrated. The result or chips out array is stored in memory 411 which is part of the CDMA MUX, and comprises the real or inphase array 409 and the imaginary or quadrature array 413 of the 144 result points or chips in the result space. On every chip clock, one result point or chip comprising a real component and an imaginary component is output on bus 451 to a bit parsing unit or bit splitter 453. The bit parsing unit 453 splits off the real component and outputs those bits on bus 417. The imaginary component will be parsed out, and those bits will be output on bus 419.

Figure 25:
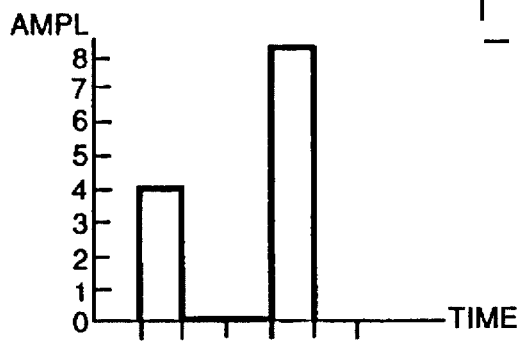
FIG. 25 is a plot of the changes in amplitude over time of the real components of the results vector for the array 409 illustrating the need for bandwidth limiting filters.

Because the RF signals that carry the information from the 144 channels must share the transmission media with other RF signals having adjacent frequencies, two optional digital passband Nyquist filters 421 and 423 are used to limit the bandwidth of the signals on buses 417 and 419 to 6 Mhz to avoid interference with signals on neighboring frequencies. The digital signals on buses 417 and 419, when converted to their decimal equivalents usually have rapid transitions between levels in adjacent intervals. This is illustrated in FIG. 25 which is a plot of the changes in amplitude over time of the real components of the results vector for the array 409. These filters 421 and 423 are Nyquist passband filters having center frequencies at the carrier frequency and having 6 dB bandwidth points which are each separated in frequency from the center frequency by a frequency gap $1/(2T_c)$ where $T_c$ is the chip rate period, i.e., the time between transitions from one chip level to the other. The Nyquist filters 421 adn 423 remove high frequency Fourier components caused by sharp edges in such signals. This filtering effectively rounds off corners of the waveform defined by the transitions between successive chip levels in the "chips out" array, and limit most of the power density in the Fourier spectrum of such signals to a 6 Mhz band centered around the frequency of the RF carrier generated by local oscillator 425. This local oscillator generates a sine wave, RF carrier at a frequency selected to be compatible with the switching rate of multiplexer 408 and to not interfere with existing cable TV service signals on adjacent frequencies.

The local oscillator cosine wave is applied to the carrier input 427 of an amplitude modulator 429 which also receives the filtered real component of each chip on bus 431. The modulator 429 modifies the amplitude of the carrier signal on line 427 in accordance with the amplitude of the decimal equivalent the real component on bus 431 and outputs the result on bus 443.

The imaginary or quadrature component of each chip, after filtering, is input on bus 433 to another amplitude modulator 435. This modulator receives at a carrier input 437 a sine wave of the same frequency as the cosine wave on line 427, but shifted in phase by 90 degrees by phase shifter 439. Modulator 435 modifies the amplitude of the sine wave in accordance with the amplitude of the imaginary component on bus 433, and outputs the result on line 441. Lines 441 and 443 are coupled to a summer 445 which sums the two waveforms and outputs them on the shared transmission media via line 412.

In some embodiments, the line 412 may be coupled to suitable interface circuitry to drive the signal on line 412 into a wireless or cellular system, a terrestial microwave link, a coaxial cable of a cable TV, telephone or other system, a fiber optic link of a cable TV, telephone or other system, a local area or wide area network or any other media developed in the future for real time communication of data. Such interface circuitry is known and will not be described further herein.

Returning to the consideration of FIG. 19, the receiver side circuitry of the transceiver will be described in more detail. As is the case with the transmit channel, the processing performed in the receiver may be performed using analog or digital or some combination of analog and digital circuitry. The receiver will be described as if all processing was digital as it is in the preferred embodiment. The signal received from the shared transmission media is passed through an analog-to-digital converter (not shown) and the resulting digital data stream is passed to a demodulator 460.

Figure 26:
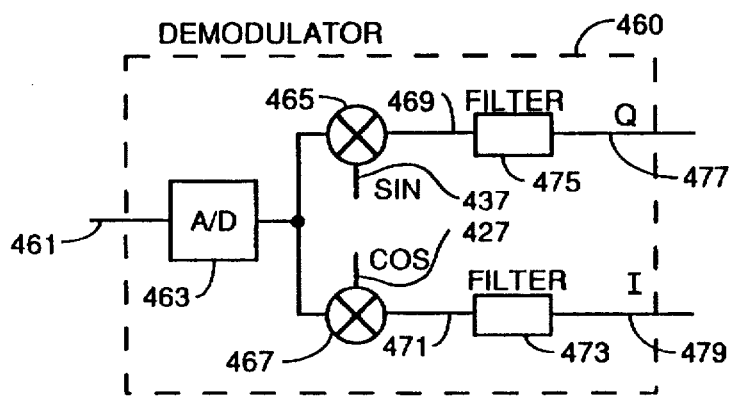
FIG. 26 is a more detailed block diagram of the structure of the demodulator in the receive channel.

FIG. 26 is a more detailed diagram of the structure of the demodulator 460. The received analog signal from the shared transmission media is coupled on line 461 to the analog input of an A/D converter 463. The stream of digital data resulting from the analog-to-digital conversion is simultaneously fed to two multipliers 465 and 467. Multiplier 465 receives as its other input, a stream of digital values that define a sine wave having the same frequency as the RF carrier sine wave on line 437 in FIG. 24. Multiplier 467 receives as its other input, a stream of digital values that define a cosine wave having the same frequency as the RF carrier cosine wave on line 427 in FIG. 24. The results output on lines 469 and 471 is a digital data stream which basically defines the mix products comprised of a fundamental carrier frequency and upper and lower sidebands. Digital filters 473 and 475 filter out the desired sidebands that contain the real and imaginary parts of each chip or result point that was transmitted. The stream of quadrature or imaginary components of the received chips are output on bus 477. The stream of inphase or real components of the received chips are output on bus 479. The receiver of FIG. 19 also includes conventional phase lock loop circuitry for clock recovery and carrier recovery. In other words, the receiver recovers the bit clock timing used by the CU and synchronizes to it using conventional phase lock loop circuitry and also recovers and synchronizes to the sine and cosine carriers used by the CU to transmit the symbol data. These clock and carrier signals are then used for transmissions by the RU to the CU so that the CU can coherently communicate with the RU's without having to synchronize to different clock and carrier signals used by the RU's. In alternative embodiments, the RUs can use their own clock and carrier signals which are unrelated to the CU's versions and the CU can contain its own phase lock loop circuitry to recover these signals and synchronize to them in order to demodulate and interpret the data transmitted by the RUs.

In some embodiments, the streams of real and imaginary components of the 144 chips of each symbol on buses 477 and 479 are stored in two linear arrays in CDMA Demultiplexer 462 in FIG. 19. The CDMA Demultiplexer 462 multiplies each of the real and imaginary component arrays times the transpose of the code matrix used by the CDMA MUX 408 of whatever RU or CU that transmitted the data to reverse the orthogonal code encoding process. This matrix multiplication process results in two linear arrays of decoded chip real and imaginary parts for each symbol. These arrays are stored by the CDMA Demultiplexer 462 in memory 464. In alternative embodiments, the CDMA Demultiplexer processes the two streams of real and imaginary components "on the fly" such that they do not have to be first stored as input arrays in a memory in the CDMA Demultiplexer 462.

After the linear arrays of real and imaginary components for a symbol are stored in memory 464, the result for each symbol is an array of received chip points in a received chip space having a real axis and an imaginary axis. The mapping by orthogonal code transformation from the constellation of possible input points shown in FIG. 21 leads to a constellation of possible points in a received chip space. A detector 466 examines the points in each of the arrays and compares the received chip points they define against the legitimate possible points in the received chip space. The detector, othewise known as a slicer, is a known type of circuit and no further details are necessary herein. The function of the detector is to restore the gain and phase of the received signal, recover the chip clock therefrom and lock onto it so as to be in synchronization with the transmitter, determine the boundaries of each chip and determine the values for the I and Q coordinates of each received chip and compare the I and Q coordinates of each received chip point against the closest points in the constellation of legitimate possible points in the received chip space that could have been transmitted. The detector also locks the frequency of its local oscillators in the detector generating the sine and cosine signals used for demodulation to the phase and frequency of the sine and cosine carriers encoded in the data. The detector then makes a preliminary decision as to which of the possible legitimate points in the received chip constellation each received chip is likely to be.

The detector 466 then outputs its preliminary determinations to a Viterbi Decoder 468 which performs the prior art Viterbi algorithm. The Viterbi Decoder uses the 4th bit in each chip of each symbol to detect and correct errors. This is done by performing the Viterbi algorithm to derive the most probable tribit path defined by the points actually sent from the path in the received chip space defined by the 4-bit components of the symbols actually received, after they have been processed by the detector. The addition of the 4th bit to each tribit converts the input constellation from an 8 point to a 16 point constellation by addition of redundancy. The addition of this redundant 4th bit increases the distance between the path through a space defined by successive input constellations, one for each symbol time. In other words, each channel or timeslot has one tribit per symbol. The fourth bit is added to each tribit in each symbol based upon the three bits of the tribit for that symbol and the state of the same channel's 4 bit chip in the last symbol transmitted. These sequences of chips map a path through the space previously defined which is farther from the same type path mapped through a group of succesive 8 point constellations if only the tribits during each symbol time were plotted with no redundant bit added to each tribit. The fact that the chip path is farther from the 3 bit path makes it easier for the receiver to divine from the noise corrupted received data what the actual tribits transmitted were. Viterbi Decoders are well known in the art of digital communications, and no further details will be given here. This Viterbi algorithm could be carried out by a programmed digital computer if slow speed is enough or by a dedicated hardware circuit if speed is important. Viterbi Decoder based systems are used by Qualcomm, Inc. in San Diego in cellular phone systems to combat noise in digital cellular phone transmissions, and the details of their patents and products are hereby incorporated by reference.

The output data points from the Viterbi Decoder are a stream of tribits. These tribits are stored in a memory in a deframer circuit 470 which functions to reassemble a replica of the TDMA data stream in the time domain from the incoming stream of chips or tribits comprising each symbol. This process is done by reversing the reading and writing processes described above in filling and emptying the framer memory 300 of FIG. 14.

Fallback Mode

The transmitters in the RU and CU have a fallback mode wherein less data is placed in each symbol for each channel and more redundancy is added when noise power gets too high. The noise power is detected by the CU, and when it reaches a predetermined threshold, the CU commands all RU modems to reduce the amount of payload in each symbol and add more redundancy. Fallback mode is implemented by a mode control signal on line 530 in FIG. 28A to the encoder circuit 526. This mode control signal can command three modes: idle mode where the encoder pass the tribits adding only zeroes as the 4th bit; normal mode where 4th bits are added based upon the previous state for that timeslot during the last symbol time; and fallback mode where more redundant bits are added to each 4-bit group and correspondingly less payload data in included in each 4 bit group.

Code Diversity in CDMA To Improve Performance

Referring to FIG. 27, there is shown a diagram of a machine to achieve code diversity in CDMA systems so as to improve the performance thereof. It has been found by the applicants that in CDMA systems, some codes are more sensitive than others to misalignment and narrow band interference and will have higher bit error rates. In most systems, the higher bit error rate caused by one code would be unacceptable and the codes which are more sensitive to noise could not be used. In some systems with large nubmers of channels of digital data to send. there are only one or a few code sets which have enough codes which are orthogonal to accomodate all the channels. For example, with 144 different timeslots/channels, there is only one code set with 144 orthogonal codes. Rather than omit the codes which are too sensitive and possibly not have enough codes to accomodate all channels, the codes are shuffled between channels randomly thereby spreading usage of the weaker codes around among the different channels.

This concept can be used in any CDMA system. In CDMA systems where all the timeslot data is collected in one physical location, code diversity can be implemented using a shuffler 500 shown in FIG. 27. In this application, the shuffler is a crossbar switch which receives a plurality of inputs 502 and has a plurality of outputs 504. The inputs 502 each carry the digital data from one timeslot. The outputs 504 each carry the digital data from a randomly assigned one of the inputs, which changes periodically, and are coupled to matrix multiplication circuitry such that each timeslot's data gets multiplied by a different code during different periods. The inputs 502 are coupled to the inputs of a crossbar switch within shuffler 502 which periodically or randomly shuffles each of the inputs to a different output line for coupling to a multiplier for multiplication by a CDMA spreading code assigned to that output line. The crossbar switch can take the form of the high speed crossbar switch disclosed in U.S. Pat. No. 5,355,035 which is hereby incorporated by reference.

In systems like the CDMA CATV system disclosed herein where at each RU not all the timeslot data for all 144 timeslots is present at each location, the shuffler takes a different form and is located in the CU. In this embodiment, the inputs 502 represent requests for bandwidth relayed to the CU by all the RU's, and the outputs 504 represent code assignment transmissions to the RU's over the command and control channels where the code assignments could change every frame or even after transmission of each symbol. At the CU however, all the timeslot data of channels to be transmitted to the RU's is located in one place, so the shuffler can take the physical crossbar switch form previously discussed in the paragraph next above. The shuffler 500 can also take the form of a suitably programmed computer to shuffle the timeslots to different codes as well as perform the matrix multiplication.

The use of this shuffling technique spreads the weak codes around but the weak codes still cause errors. If the level of errors generated by this technique cannot be tolerated, forward error correction is used in conjunction with the code diversity to eliminate the errors. Forward error correction means sufficient redundant bits are inserted into the data stream to allow any errors to be corrected without the need for a transmission back to the RU's from the CU's requesting retransmission of frames with errors. In the specific embodiments disclosed herein. Trellis modulation is used with a convolutional encoder in each RU and CU transmitter to calculate and add to each tribit a redundant 4th bit. These 4th bits are used by the receivers and Viterbi Decoders therein to correct errors by making judgments from the received data which points from the constellation of possible points were actually sent.

In the preferred embodiment for a transmitter described below with reference to FIG. 28AA, a diversity shuffler 506 implements code diversity by coordinating the shuffling of timeslot data to different, randomly selected CDMA spreading codes by the signals on buses 532 to the framer 508 and the signals on bus 533 to the buffer 533. This will be described in more detail below.

Preferred RU Transmitter Block Diagram

Referring to FIG. 28AA, there is shown a block diagram of the preferred species of transmitter circuitry within the genus of the invention. The transmitter of FIG. 28A is used in the transceivers of the RU modems. The CU transmitters are identical except there is no need for the access control circuitry 540 or the multiplexer 544.

In FIG. 28A, block 506 is the diversity scrambler that implements the time to code transformation. Block 508 is the framer circuitry that implements the variable delays needed to implement the ranging process to achieve the necessary frame synchronization and time alignment of the CDMA spread channel data for synchronous CDMA. The framer circuitry 508 is described in more detail in FIG. 12. Block 548 is a buffer that stores the shuffled 4 bit groups of symbol elements which serve as the information vector [b] for the matrix multiplication performed by the CDMA Multiplexer 527. Code diversity is implemented by block 506 by controlling the order of tribits read for each symbol from framer memory 508 via read pointers sent to the framer on bus 532. The tribits exit the framer on bus 518 in the order dictated by the addresses on bus 532. They are pseudorandomly scrambled by scrambler 524 in the manner described below (in the preferred embodiment) and redundant bits are added by encoder 526 if operating in normal or fallback mode. Some embodiments have no encoder, and some embodiments have an encoder which has no idle and/or no fallback mode.

The encoded bits pass through switch 544 and are written into buffer 548 in the order dictated by write addresses on bus 533. Elswhere herein, the manner in which the multiplexer 544 is operated to overlay media access control data on bus 542 with payload data on bus 507 in buffer 548 is described. Buffer 548, when fully written, during each symbol time has 144 4-bit symbol elements comprising an information vector the order of which is randomly scrambled anew each symbol'time in the preferred embodiment. In other embodiments, the codes may be assigned seqentially during each symbol for all active timeslots, or a rolling sequential assignment of codes to all active timeslots may be used.

Figure 28B:
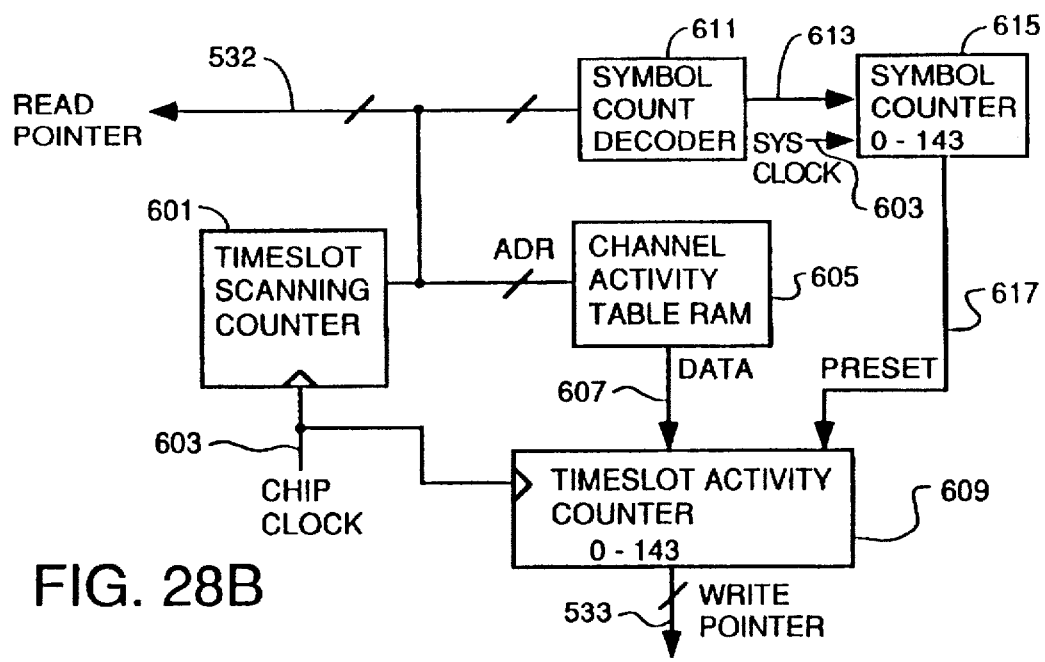
FIG. 28B is a block diagram of one embodiment for achieving code diversity using rolling sequential code assignment.

Referring to FIG. 28B, there is shown a block diagram of a simple embodiment for the code diversity shuffler 506. This embodiment does not do random shuffling but does a rolling shuffle in the following manner. Each RU and the CU has a code diversity shuffler of the same type and all shufflers operate synchronously to shuffle the same timeslots to the same codes simultaneously. A timeslot scanning counter 601 increments from 0 to 143 in synchronism with a system clock on line 603. This count is output on bus 532 as an address to a random access memory 605 which stores a copy of the channel activity table. The channel activity table is a table which stores data indicating which of the 144 timeslots are currently being used. The CU broadcasts data to all RUs indicating which channels are currently assigned, and each RU updates its activity table using circuitry not shown in FIG. 28B. Bus 532 carrying the timeslot scanning counter output is also coupled to the framer 508, and the count on bus 532 acts as a read pointer controlling which tribit from the current symbol being read is output from the framer on bus 518. The count on bus 532 is also coupled to an address input of RAM 605 and causes data to be output on bus 607 indicating whether the channel corresponding to the current count is currently assigned. This data is, for example, a logic 1 if the timeslot is assigned and logic 0 if not. The bus 607 is coupled to the increment input of a timeslot activity counter 609 which has its clock input coupled to the system clock on line 603. When a logic 1 is output on bus 607, the timeslot activity counter 609 increments on the next upward clock transition. Counter 609 counts sequentially from 0 to 143 and then rolls back over to zero. The output of the counter 609 on bus 533 is coupled as a write pointer to the address input of buffer memory 548 in FIG. 28A and controls where the tribit output by the framer 508 is written, after encoding by encoder 526, in the information vector [b] stored in buffer memory 548. The read pointer on bus 532 is also coupled to a symbol count decoder 611 which generates an incrementation signal on line 613 each time the count on bus 532 reaches 143 thereby indicating the first tribit of a new symbol will be read on the next upward system clock transition. A symbol counter 615 then increments on the next upward clock transition to generate a new symbol count on bus 617. This symbol count is coupled to a preset input of the timeslot activity counter 609 and causes the timeslot activity counter to be preset to whatever symbol count exists on bus 617 and to continue to increment from there as active timeslots are found. When symbol counter reaches 143, it rolls over to 0. Thus, for each new symbol, the timeslot activity counter starts incrementing from a new number. This causes a rolling shuffle of the positions in which the 4-bit groups are placed in buffer memory 548 thereby causing each active timeslot to be spread using a different code during each new symbol to achieve code diversity.

Figure 28C:
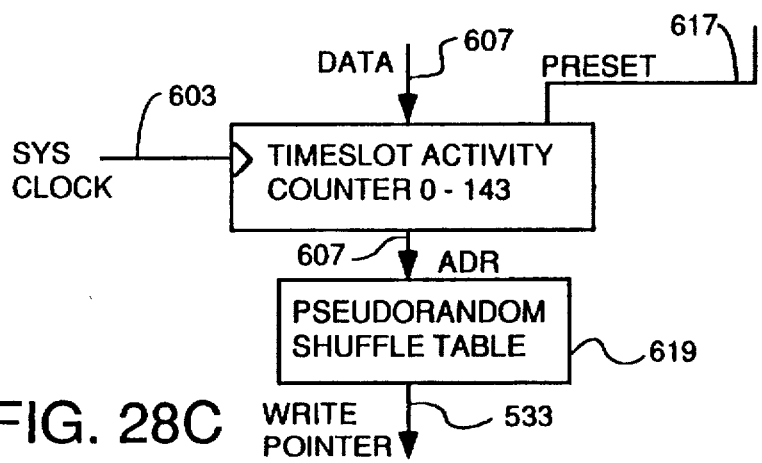
FIG. 28C is a partial block diagram of the modifications to the block diagram of FIG. 28B to achieve code diversity with pseudorandom code assignment.

FIG. 28C is a block diagram of another embodiment for a code diversity shuffler that can be substituted for diversity shuffler 506 in FIG. 28A. This embodiment does a pseudorandom shuffle of codes using a shuffling table filled with pseudorandomly distributed write pointers. In FIG. 28C, all elements are the same as in FIG. 28B, except that the output on bus 533 from the timeslot activity counter 609 is coupled as an address input to a memory 619 which can be either a RAM, ROM, PROM, EEPROM or EPROM. Memory 619 stores a collection of 144 write pointers which are pseudorandomly distributed relative to the sequential address inputs. Each count on bus 607 from the timeslot activity counter causes whatever pseudorandom write pointer is stored in that address in memory 619 to be output as the write pointer on bus 533 to buffer memory 548 in FIG. 28A. All RUs and CUs have an identical copy of the pseudorandom shuffle table stored in memory 619, and all RU's and the CU synchronously scan the activity table and synchronously, pseudorandomly assign the same CDMA spreading codes to the active timeslots.

Figure 28D:
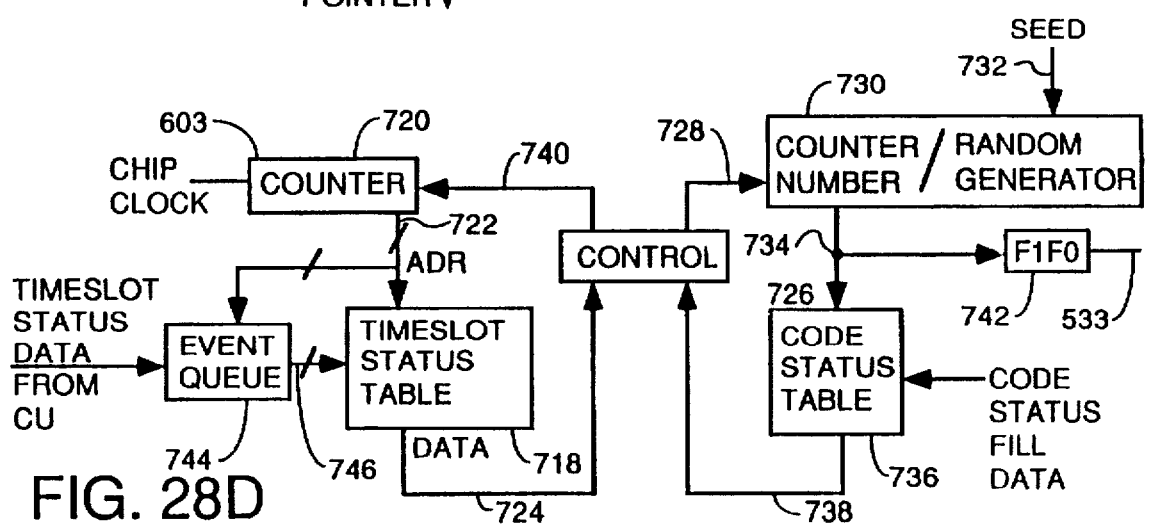
FIG. 28D is a block diagram of the preferred embodiment of a code shuffler to achieve code diversity using pseudorandom code assignment.

FIG. 28D shows a block diagram of a preferred code diversity shuffler that may also be used for shuffler 506 in FIG. 28A. A timeslot status table in memory 718 stores a current map shared by all RUs and the CU of which timeslots/channels are currently active. In the preferred embodiment, the data stored in this table for each timeslot includes its present mode, its next mode and local/remote information. Permissible modes include: idle where no code is assigned, normal where a code is assigned, fallback #1 where more than one code is assigned to a timeslot and fallback #2 where even more codes are assigned to an active timeslot than in fallback #1 mode. The addresses in table 718 are sequentially scanned using addresses generated on a bus 722 by a counter 720 driven by the chip clock on bus 603.

The data regarding the status of each sequentially scanned timeslot is output on bus 724 to control logic 726. The status data on bus 724 tells the control logic whether or not a CDMA code needs to be assigned. If control logic 726 sees data indicating a timeslot is active on bus 724, it generates a signal on bus 728 causing counter/random number generator 730 to generate a pseudorandom number on bus 734 to act as a write pointer for purposes of guiding the encoded 4-bit group from encoder 526 in FIG. 28A into the storage location in buffer memory 548 which will be multiplied by the code pointed to by the number on bus 734. The code number on bus 734 is generated from a seed number on bus 732. All RU and CU code diversity shufflers receive this same seed and all RUs having active timeslots and the CU operate synchronously to assign the same CDMA code to the active timeslots so that the CU can recover the CDMA spread data transmitted by the RU using the same CDMA code(s) that were used to spread it. The pseudorandom number generated in this manner is output on bus 734 as an address into a code status table stored in random access memory 736, and is also stored in FIFO memory 742 for later output as a writer pointer on bus 533. The code status table stores information shared by all RUs and CUs regarding which codes are eligible for use. Some codes may be block from usage because they either do not have sufficient noise immunity or for some other reason are not to be used. The data regarding whether use of the code pointed to by the address on bus 734 is permissible is output to the control logic via bus 738. If the data on bus 738 indicates the code pointed to by the address on bus 734 is permissible for use, the control logic generates a signal on bus 740 telling counter 720 that it should now generate an address to read the contents of the next address in sequence in the timeslot status table. All active timeslots are assigned a code once per symbol.

It is important in the embodiment of FIG. 28D that the contents of the timeslot status table and the code status table be constantly updated by all the RUs and CU so that they all share the same information. Updates of code status and timeslot status are broadcast by the CU on a broadcast channel using message protocol with CRC and ECC bits appended. The messages about timeslot status are stored in event queue 744 which also receives the address pointer on bus 722. As the address of each timeslot appears on bus 722, the event queue searches for update messages regarding that timeslot and updates the contents of the timeslot status table via bus 746.

Returning to the consideration of FIG. 28A, block 510 generates the ranging pulses needed for the ranging process to achieve frame synchronization. This circuit receives as its input on bus 512 a P parameter which sets the power of the ranging pulse, data which defines the barker code of the ranging pulse, and RU/CU information which tells the circuit 510 whether it is in an RU or CU. The data on line 512 also controls whether a single barker code is transmitted or a specific sequence of barker codes during successive gaps to make up the signature sequence and controls the position of a barker code pulse relative to the center of the gap. Circuit 510 carries out the ranging process including contention resolution, pulse position modulation, steering and signature transmission described elsewhere herein. Circuit 510 also plays a role in the equalization process. Equalization is the process of reducing or diminishing undesired noise in the desired data caused by, for example, reflections from impedance discontinuities in the coax or other media, misalignment of frames etc. Equalization is implemented in part by circuit 510 in placing a particular, predetermined pattern of signals in one or more gaps between frames so that the RU receivers can determine the noise characteristics then present in the channel and take steps to "equalize" or reduce the noise or other anomaly. In some embodiments, this is done by the RU placing a filter having a transfer function which is the inverse of the transfer function of the equivalent circuit representing the media connecting each RU to the CU.

Block 514 is a register or memory storing command and control data to be transmitted on the 16 access and command and control channels of the 144 total channels. Block 516 is a multiplexer which selects between the payload data for the 128 payload channels from the framer 508 on bus 518 or command and control data on bus 520. The selected data stream is then output on bus 522. Typical command and control data includes data messages exchanged between the RU and CU and CU regarding ranging such as "I want to start ranging", "I found more than one barker code in the gap, please perform your contention resolution procedure" etc.

Bus 522 is coupled to a randomizer machine 524. The purpose of the randomizer is to pseudorandomly scramble the incoming data so as to make it look more like white noise. This reduces the dynamic range at the output of the transmitter. The randomizer receives its scrambling instructions from a scramble register 525 which receives and stores a seed code on bus 529. In some embodiments, the randomizer 524 can be omitted.

Convolutional encoder 526 serves to receive the stream of tribits and add a redundant 4th bit to each as previously discussed. Because the 4th bit to be added to each tribit depends upon the state of the tribit from this channel during the last symbol, a memory 528 is used to keep a record of the state of each channel's 4 bit chip state during the last symbol transmission. This information is supplied to the convolutional encoder via bus 530 as each channel's tribit is encoded during each symbol. The encoder has three modes previously described, and the diversity shuffler 506 controls the mode by a signal on bus 534.

Media Access Control

Block 540 represents circuitry to acquire an access channel and carry out media access control communications to implement ISO MAC layer protocols.

Since there are only 4 access channels across which all message traffic requesting channel bandwidth and awarding same, contentions will occur when more than one RU simultaneously requests bandwidth on the same access channel. Therefore, access channels are aquired according to the following protocol. Each RU transmitter receives a seed number on bus 550 and pseudorandomly selects which access channel to attempt to use and pseudorandomly selects which 6 symbols of a superframe comprised of 12 symbols to send. The RU then sends an authentication code identifying itself in the form of the unique sequence of 6 of the 12 symbols of a superframe of 4 frames, said unique sequence pseudorandomly selected using the seed. All RUs use the same seed, to the liklihood of more than one picking the same authentication code is small. The 6 symbols sent can contain the RU's message telling the CU how many channels it needs, or a separate message can be sent after access is achieved. The CU listens on all access channels, and during each superframe determines if more than 6 symbols were sent. It so, the CU broadcasts a message on the control channel indicating there is a contention on a particular access channel. The RUs trying to gain access then do the contention resolution protocol described elsewhere herein used for ranging. If only 6 symbols are detected during the superframe, the CU broadcasts a message on the control channel indicating which 6 symbols were found. The CU can include in the broadcast message code assignments for the requested channels in reservation embodiments or, in another embodiment, can simply transmit updates to the timeslot activity table indicating which timeslots or channels have been awarded to the RU which gained access. The RU that sent these six symbols then knows that it has been awarded access, and updates its timeslot activity table which is maintained in the diversity shuffler 506. All RUs hear the timeslot activity update message and similarly update their timeslot activity tables.

Once an access channel is acquired, circuit 540 may, in some embodiments, present data on bus 542 to multiplexer 544 which comprise access control messages that are sent on the 4 access channels of the 144 total channels. Multiplexer 544 either selects these media access messages on bus 542 or the encoded chips from the convolutional encoder 526 to the code division multiplexer 527 via bus 546 and buffer 548. The multiplexer 544 is controlled to edit the contents of the buffer 548 to overlay the 4-bit groups of the access control symbols with the payload data on bus 507 so that the media access control 4-bit groups go into the right addresses of the buffer 548 so as to get spread by the CDMA codes assigned to the access channels.

The media access control messages constitute requests from RUs for bandwidth and awards of specific channels to the RUs by the CU in some embodiments. The awards of specific channels to specific RUs implement a reservations scheme and the awards can take many forms such as broadcasts on the control channel of timeslot activity table update messages or specific messages on the access channels in other embodiments. Also, other media access protocols other than the reservation scheme which are described elsewhere herein are also possible through various protocols some of which may require message traffic on the access channels. In an important alternative embodiment, all the different schemes for allocating channels to specific timeslots may be used or combinations of schemes for various groups of channels may be used. In this embodiment, the type of scheme used is programmable by the user, and in a variation of this embodiment, may be changed by the CU computer based upon traffic conditions and the number of contentions and efficiency considerations.

Because a reservation scheme is implemented in the preferred embodiment, no contentions occur on the 140 non media access control channels so no contention resolution protocols are carried out for these channels since there will be no contentions. However, contentions are expected to occur on the 4 access control channels shared between all the RUs so contention resolution will have to be carried out in the manner described elsewhere herein.

Spreading of the chips from the convolutional encoder by code division multiplexing is done by the CDMA Multiplexer 527. This circuit or software routine sets the amplitude of the output chips on line 558 based upon all the inputs and the results of the multiplication of the orthogonal codes times the input information vectors on bus 549. There is only one orthogonal, cyclic code that has 144 different codes. That code is used and is, in hexadecimal representation: 0218 A503 BA4E 889F 1D92 C1F 3 AB29 8DF6 ADEF. Although cyclic codes are used in the preferred embodiment for ease of implementation, any other orthogonal, noncyclic code set can also be used in alternative embodiments, or other orthogonal, cyclic codes can be used where fewer channels/timeslots are required. The cyclic code given above uses the convention that all logic 0's represent −1s and all logic 1s represent +1 in the CDMA spreading matrix. The first code of the 144 different codes in the code set will be all 1s regardless of the contents of the code given above. The second code in the code set is the code given above: 0218 A503 BA4E 889F 1D92 C1F3 AB29 8DF6 ADEF. The third code is obtained by shifting the code to the right one binary place starting the second least significant bit position and taking the overflow bit that "falls off" the most significant bit position edge of the code in the second least significant bit position. The fourth code is obtained by repeating process done to obtain the 3rd code on the 3rd code.

The results of the matrix multiplication performed in the CDMA Multiplexer 527 are coupled to one input of a multiplexer 556 on bus 558, and the other input of the multiplexer is coupled to receiving the ranging data on bus 560. The multiplexer selects the data on bus 558 for coupling to a precode filter 560 during the three symbol transmission times of each frame, and selects the ranging pulse data on bus 560 during the gap following transmission of the last symbol in each frame. The selected data is output on bus 558 to a precode filter 560 which is used in the equalization process.

Equalization

Equalization, as that term is used herein, is the process of compensating for distortions and noise that occur caused by misalignment of CDMA codes. The precode filter 560 performs a predistortion at the RU transmitter so that the data arrives at the CU undistorted. The amount of the predistortion is calculated to substantially or exactly compensate for the current distortion conditions, and is controlled by the RU/CU Coefficient signal on bus 561. Each RU uses its own RU/CU Coefficient signal to establish a predistortion which is approriate to its own signals for its position on the network so as to cause its signal to reach the CU with little or no distortion.

The output of the precode filter on line 562 is applied to a scaler 564 which scales the amplitude level of the digital numbers on bus 562 in accordance with a signal on bus 566 which indicates the activity level of the modem, i.e., how many timeslots are currently in use by this modem. The purpose of this scaling is to enhance performance by taking advantage of the full precision of a digital to analog converter 576 at the output of the transmitter. A digital to analog (D/A) converter has a dynamic range for its analog output. When few timeslots are active, the summation of the CDMA spreading matrix multiplication partial products does not lead to chip amplitudes which extend to the full limits of the D/A converter's dynamic range. As a result, the full precision of the D/A converter is not used, and the inherent noise of the D/A conversion process affects the transmitted signal more. To make use of the full precision of the D/A converter, scaler 564 "amplifies" the incoming signal based on the activity level such that the resulting swing in digital values going into the D/A converter 576 causes output analog signals which swing between the limits of the dynamic range of the D/A converter. These signals are later reduced in amplitude by a circuit (not shown) which limits the amplitude swings to prevent interfering with other signals sharing the media.

The output of the scaling circuit on bus 568 is coupled to shaping filter 570 which digitally filters the data to limit the bandwidth of the transmitted signal to the width of the 6 mHz channel devoted to digital data communication on the coaxial cable or other media 24. The shaping filter has a squared raised cosine filter characteristic suitable to satisfy Nyquist criteria in a known manner so as to provide optimal signal-to-noise enhancement and so as to minimize inter symbol interference. The coefficient data on bus 572 provide ability to further control the filter characteristics of filter 570. The output of the filter on bus 574 is coupled to the input of the digital to analog converter 576 for converstion to an analog signal for application to the coaxial cable 24 (not shown). The details of the quadrature amplitude modulator in digital to analog converter 576 are not shown but are similar to the modulator shown in FIG. 24.

Figure 29:
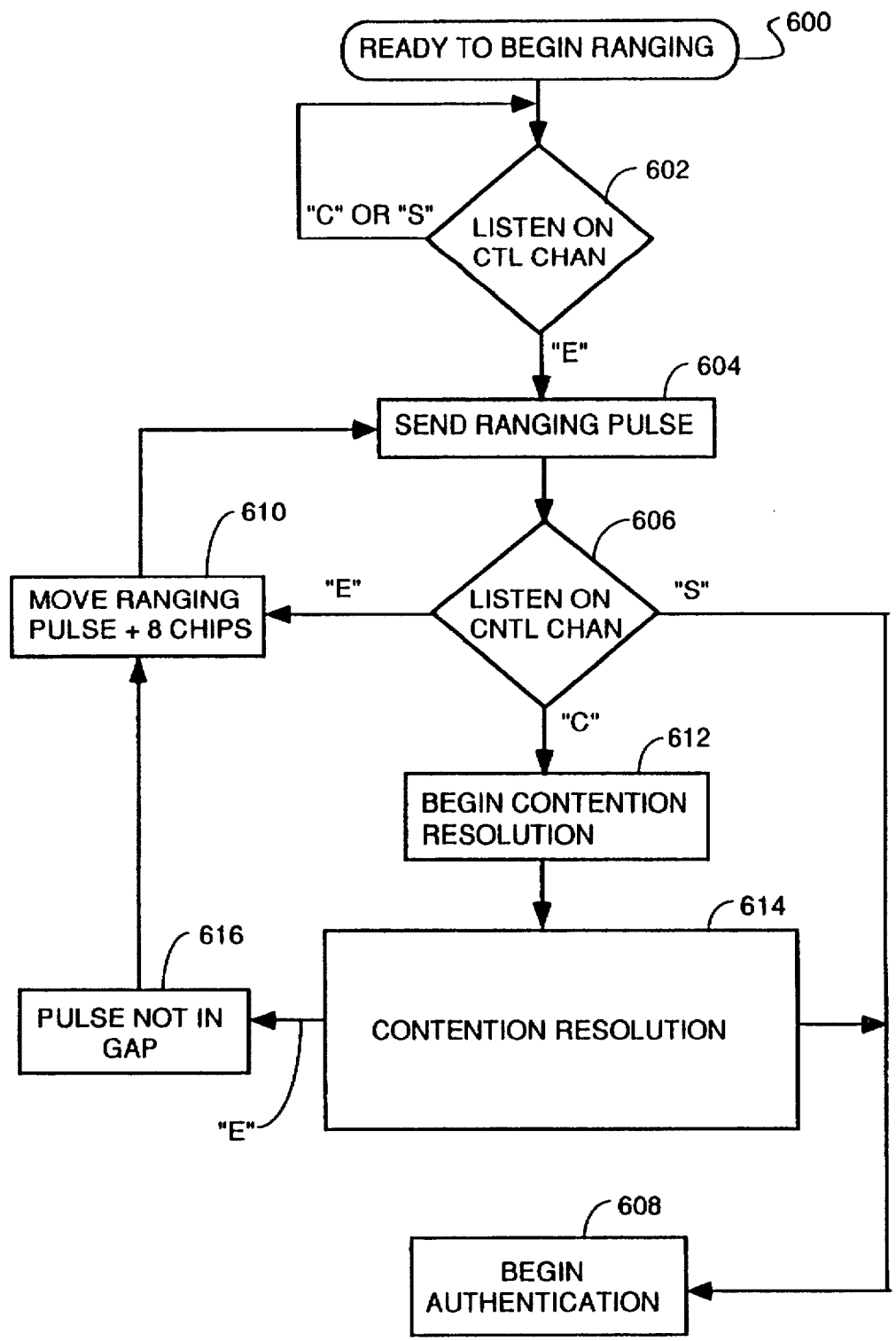
FIG. 29 is a flow chart for the process of preferred method of ranging using contention resolution carried out by the circuit/programmed microprocessor 510 of FIG. 28A in an RU modem transmitter.

Referring to FIG. 29, there is shown a flow chart for the a method of ranging using contention resolution carried out by the circuit/programmed microprocessor 510 of FIG. 28A in an RU modem transmitter. Block 600 is reached after an RU has powered up and performed a self test and found itself to be operable. Next, test 602 is performed to listen on the control channel to wait until it is clear for transmission ("E"). 602. If test 602 determines that a collision ("C") is occurring on the control channel or a single RU is transmitting ("S") on the control channel. Test 602 vector processing to block 604 when the control channel is free. Block 604 represents the process carried out by circuit 510 in FIG. 28A of transmission of a ranging pulse (typically a copy of the barker code transmitted in every frame by the CU). The multiplexer 556 is switched to select input bus 560 before transmission of the ranging pulse.

After the ranging pulse is transmitted, the CU receiver listens in the gap to determine if it finds a ranging pulse in the gap, and, if so, if only one ranging pulse is present. Block 604 vectors to test 606 after transmission of the ranging pulse in order to listen on the control channel. The CU will transmit an S on the control channel if a single pulse is found in the gap, and will transmit an E on the control channel if the gap is found to be empty. If test 606 hears an S on the control channel, processing is vectored to block 608 to start the authentication process. If block 606 hears an E on the control channel indicating the gap is empty, processing vectors to block 610 to move the ranging pulse plus 8 chips, and processing vectors back to block 604 to send a new ranging pulse. Processing then vectors back to test 606 to listen on the control channel again. This loop continues until either an S for single pulse is heard on the control channel or a C for collision is heard. The CU sends a C when it hears more than one ranging pulse in the gap.

When test 606 hears a C, processing is vectored to block 612 to start the contention resolution process which is then performed as symbolized by block 614. Contention resolution continues until only one pulse is found in the gap or no pulse is found in the gap. If, as a result of contention resolution, no pulse is found in the gap, the CU sends an E on the control channel, which vectors processing to block 616. Processing then vectors to block 610 to move the ranging pulse 8 chips forward, and the process repeats itself.

Preferred Authentication Process

Figure 30:
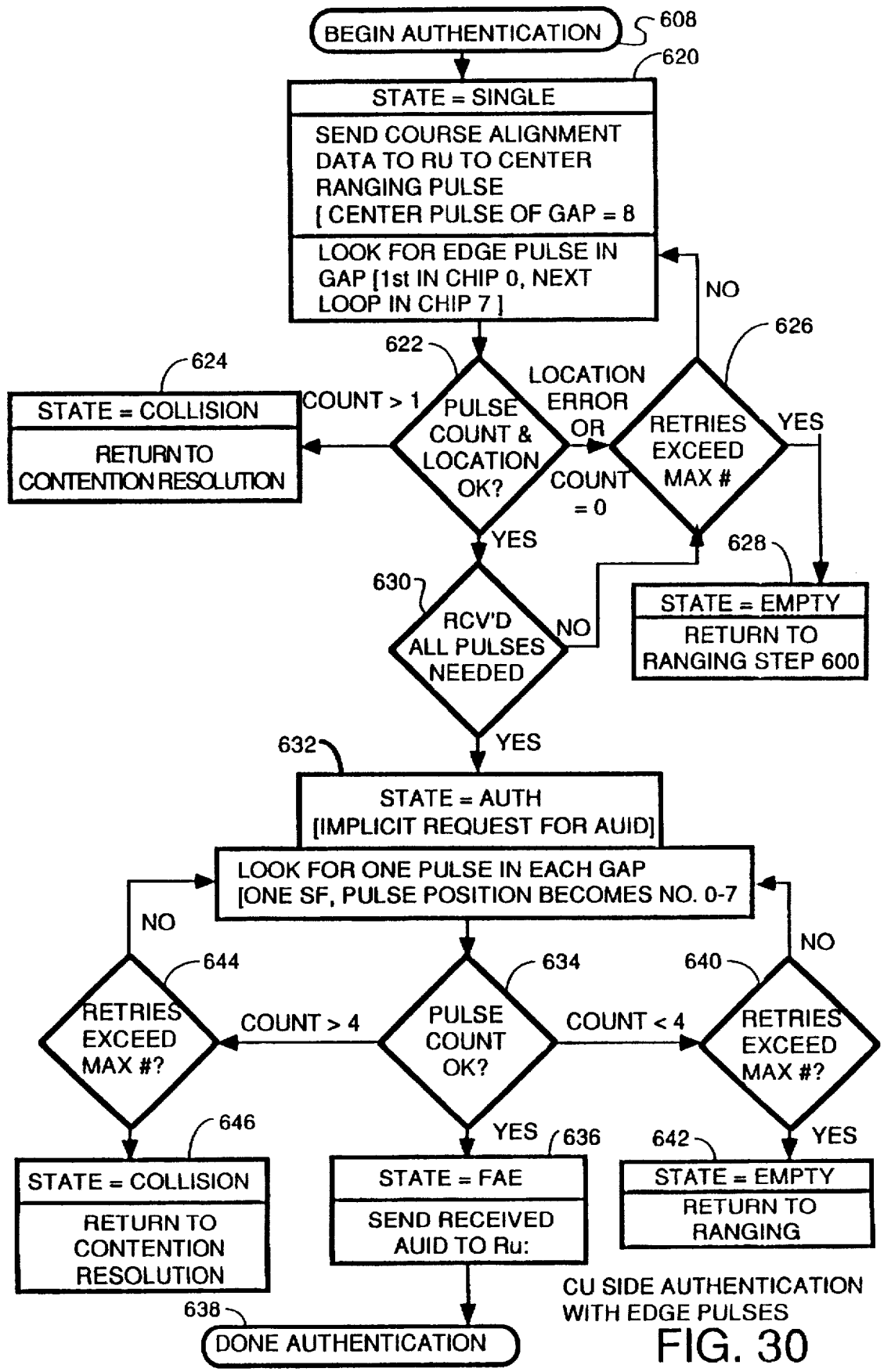
FIG. 30 represents one embodiment for an authentication process in support of the preferred ranging process which uses pulse position modulation to send the authentication code. In this embodiment, each RU that has been attempting to establish synchronization sends one ranging pulse during the gaps of each of 8 frames but varying the position of the pulse in the gap during each gap.

Authentication is started when the CU sends a message on the control channel that it has found a ranging pulse from a single RU in the gap. In both embodiments, the gaps of multiple frames are used to send an authentication code. Each RU that has been attempting to synchronize hears the "S" on the control channel in step 606 in FIG. 29 indicating the CU has detected the ranging pulse from a single RU in the gap, and vectors processing to the authentication process represented by block 608. There are several possibilities for how authentication is performed. The flow chart of FIG. 30 represents one embodiment which uses pulse position modulation to send the authentication code. In this embodiment, each RU that has been attempting to establish synchronization sends one ranging pulse during the gaps of each of 8 frames but varying the position of the pulse in the gap during each gap. In another embodiment previously described, the RU sends an authentication barker code sequence comprised of sending the barker code during some gaps of the 8 frame authentication sequence but not during others in a predetermined sequence. Each RU has a unique sequence, but all RUs send pulses during only half the authentication sequence gaps.

Preferred Contention Resolution Process

Referring to FIG. 30, there is shown a flow chart of the preferred process for contention resolution performed in the RU modems by the circuit represented by block 510 in FIG. 28A when more than one RUs ranging pulse is found in the gap. The authentication process begins at block 608 and immediately proceeds to block 620. There, the CU sends out an S on the control channel indicating that it has found a single RUs ranging pulse in the gap. Which RU it is is not clear at this point, and the purpose of the authentication process is to determine which RU has hit the gap and so notify that RU so it can freeze its delay at the delay that hit the gap. Before starting the process of determining the RU identity, the CU sends out a command on the control channel for all RUs who are ranging to move their ranging pulses plus or minus the number of chips separating the ranging pulse the CU saw from the middle of the middle 8 chips of the gap. In block 620, this process is signified by the phrase send course alignment data to RU to center ranging pulse. Because ranging pulses from other RUs may also be in the gap, but at an edge, when they also move the position of their ranging pulses, their pulses may also land somewhere in the middle 8 chips of the gap. Since authentication requires that only one ranging pulse be in the gap, block 620 looks for a so-called "edge pulse" or neighbor in the gap in addition to the single pulse previously found so as to make sure there is truly only one ranging pulse in the gap so as to avoid ambiguity. That is, the CU looks to find out if another RUs pulse which was originally in the gap but outside the middle 8 chips has landed in the middle 8 chips after the position of the pulse which was originally found in the middle 8 chips has been moved to the center of the gap. The CU looks for these extraneous pulses first by commanding a shift in the ranging pulse originally found in the gap which led to the broadcast of the S on the control channel to move sufficiently to land in chip 0 of the middle 8 chips. Then test 622 looks for more than one pulse as described in the next paragraph. Then, the CU commands a move of the original ranging pulse to the other extrement, i.e., to move to chip 7 of the middle 8 chips, and the process of test 622 is repeated.

The determinination of whether more than one ranging pulse is in the middle 8 chips is performed by test 622 which counts the ranging pulses in the middle 8 chips of the gap and determines their locations. If the count of the number of ranging pulses found in the middle 8 chips is greater than one, the CU broadcasts a C on the control channel indicating a collision state, which causes all RUs to vector processing to their contention resolution protocols, as symbolized by block 624. If test 622 determines that the pulse count is 0 or their is a position error in the position of the single pulse found in the middle 8 chips, test 626 is performed to determine if the number of retries exceeds the maximum allowable number. If not, the process of block 620 is performed again to send new course alignment data to the RUs on the control channel. If the number of retries found by test 626 is found to exceed the maximum, the process of block 628 is performed where the CU broadcasts an E on the control channel indicating the gap is empty. This causes all RUs trying to synchronize to return to their ranging processes and start over at block 600 in FIG. 29.

Once test 622 determines that there is only a single Rus ranging pulses in the gap and it is within the middle 8 chips, processing is vectored to test 630 which determines if noise has caused detection of what was thought to be a ranging pulse but which was only noise. This test is performed by determining if at least two out of three ranging pulses were received when the ranging pulse was commanded to move to the extreme left edge, the extreme right edge and the center of the middle 8 chips of the gap. If ranging pulses were detected at at least two of these three positions, no false alarm exists, and processing is vectored to block 632. If a false alarm is detected, processing is vectored back to test 626 to start over in positioning the ranging pulse.

The process symbolized by block 632 is the process of the CU broadcasting an A on the control channel which signals all RUs that are attempting to synchronize to send their authentication codes. Therefore block 632 states State=Auth which means that the CU is broadcasting an implicit request for the authentication ID (AUID) of the RU whose pulse is in the gap. In response, all the RUs trying to synchronize send their AUIDs in the form of four ranging pulses during the gaps of each of the next four frames of a superframe, each ranging pulse being located in a specific one of the 8 chips positions of the middle 8 chips in the gap. The positions and sequence during these four gaps of the authentication superframe tell the CU which RU has hit the gap. This is the meaning of the language in block 632 "Look for one pulse in each gap [one SF, Pulse Position Becomes No. 1–7]" The steps following block 632 just check for errors in this process. Specifically, test 634 is performed after each frame to increment a pulse counter and determine if the pulse count has reached 4 by the end of the superframe. If the pulse count is 4 at the end of the authentication superframe, test 634 vectors processing to block 636 where the CU broadcasts an FAE message on the control channel indicating authentication is finished and sends the AUID code out on the control channel for recognition by the RU that sent it. The AUID will be a sequence of 4 numbers from 0–7 which indicate in which chip of the middle 8 of the gaps of the authentication superframe each ranging pulse was found. Each RU that is attempting to synchronize will compare this sequence of 4 numbers to the 4 numbers of its AUID. If there is a match, that RU will know that it successfully hit the gap and will freeze its transmit delay timing at the number that puts its ranging pulse in the center of the 8 middle chips of the gap. Step 638 is then reached indicating that authentication is complete.

If test 634 determines that the pulse count is less than 4 after any gap in the authentication superframe is complete, processing is vectored to test 640 to determine if the number of retries exceeds the maximum allowable number. Test 640 sends processing back to block 632 to look for pulses in the authentication superframe gaps and record their positions until the superframe is over and the pulse count is less than 4. Some number of superframes with the RUs sending their AUIDs can be allowed in some embodiments. Eventually, the number of retries exceeds the maximum, and processing is vectored by test 640 to block 642. In block 642, the CU broadcasts an E on the control channel and, in response, all the RUs attempting to synchronize will return to the ranging process.

Likewise, if at any time, the count determined by test 634 exceeds 4 during the authentication superframe or at the conclusion thereof, an error has occurred or another RU has moved its ranging pulse into the gap. If this happens, test 644 is performed to determine if the maximum number of retries has been exceeded. If not, processing returns to block 632. Typically, more than one authentication superframe will be permitted with the RUs sending their AUIDs during each superframe. Eventually, after several superframes, if block 636 is not reached, test 644 will trigger vectoring of processing to block 646 where the CU broadcasts a C on the control channel indicating a collision has occurred thereby causing the RUs to return to their contention resolution protocols.

Figure 31:
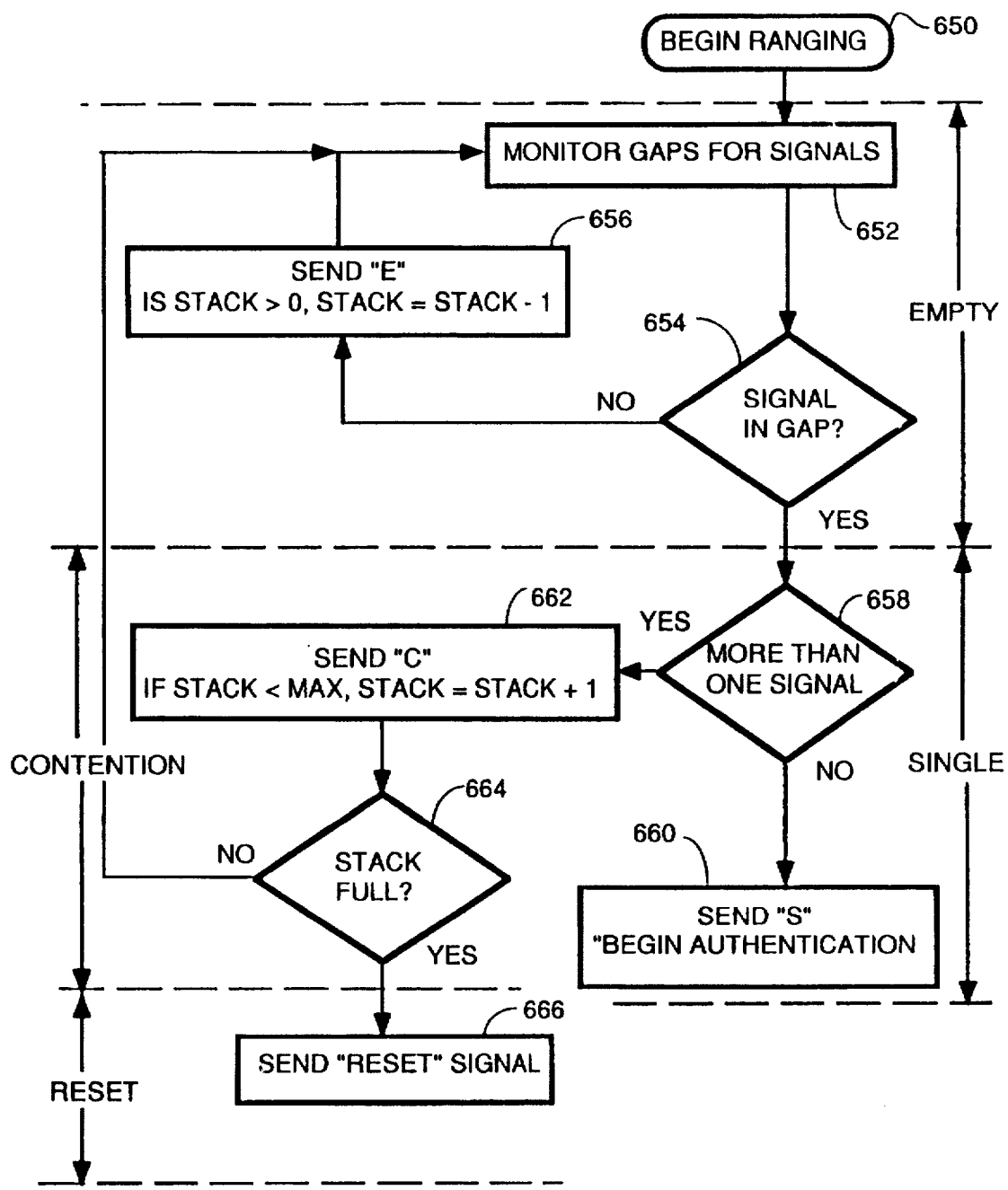
FIG. 31 is a flow chart representing the preferred ranging and contention resolution carried out on the CU side.

Referring to FIG. 31, the ranging and contention resolution protocol performed on the CU side is detailed in flow chart form. Ranging starts with block 650 where the CU sends out a unique barker code. This barker code is a unique pattern of data, which, when received by the RUs is echoed by them back toward the CU after imposing a programmable delay. It is this programmable delay that is being adjusted during the ranging process until the echoed barker code in the form of a ranging "pulse" hits the gap. Block 652 represents the process carried out by the CU of monitoring the gap to determine if any RUs ranging pulse has hit it. This monitoring is typically done by performing a correlation calculation between any signal received in the gap and the barker code originally transmitted, but in other embodiments, it can be any other form of monitoring such as threshold comparison etc. which is effective given the noisy environment. Threshold monitoring of sharp or high power pulses is less desirable however, because sharp pulses tend to splatter the band with a broad range of Fourier components, while high power ranging pulses that will rise above the noise can, before alignment is achieved, arrive coincidently with payload data from other RUs and interfere therewith. Test 654 represents the examination of the results of the correlation calculation or other monitoring activity to determine if any pulse was found in the gap. If not, step 656 is performed where the CU broadcasts an E on the control channel indicating the gap is empty, thereby causing the RUs to adjust their delays and resend their barker codes or ranging pulses during the next frame. Step 656 also subtracts one from an iteration stack which counts the number of iterations or attempts to range. Then the monitoring step 652 is performed again.

If test 654 determines that there is a ranging pulse in the gap, processing vectors to test 658 where the CU determines if there is more than one ranging pulse in the gap. If there is only one ranging pulse in the gap, step 660 is performed where the CU broadcasts an S on the control channel indicating to all RUs that are ranging to begin their authentication processes.

If more than one ranging pulse is found in the gap, step 662 is performed to broadcast a C on the control channel indicating to the RUs that there is a contention and forcing them to carry out their contention resolution protocols. The CU then checks the status of an iteration stack to see if it is full. The iteration stack is used to keep track of the rounds of ranging for purposes of contention resolution and more rapid ranging of all RUs attempting to synchronize in some embodiments. The stack is incremented by one, and tested in test 664 to determine if the maximum number of iterations has been reached. If not, processing returns to block 652 to again monitor the gap for ranging pulses transmitted during the next frame. If the maximum number of iterations has been reached, step 666 is performed to broadcast an R on the control channel thereby causing all RUs to reset and start the ranging process again.

Figure 32:
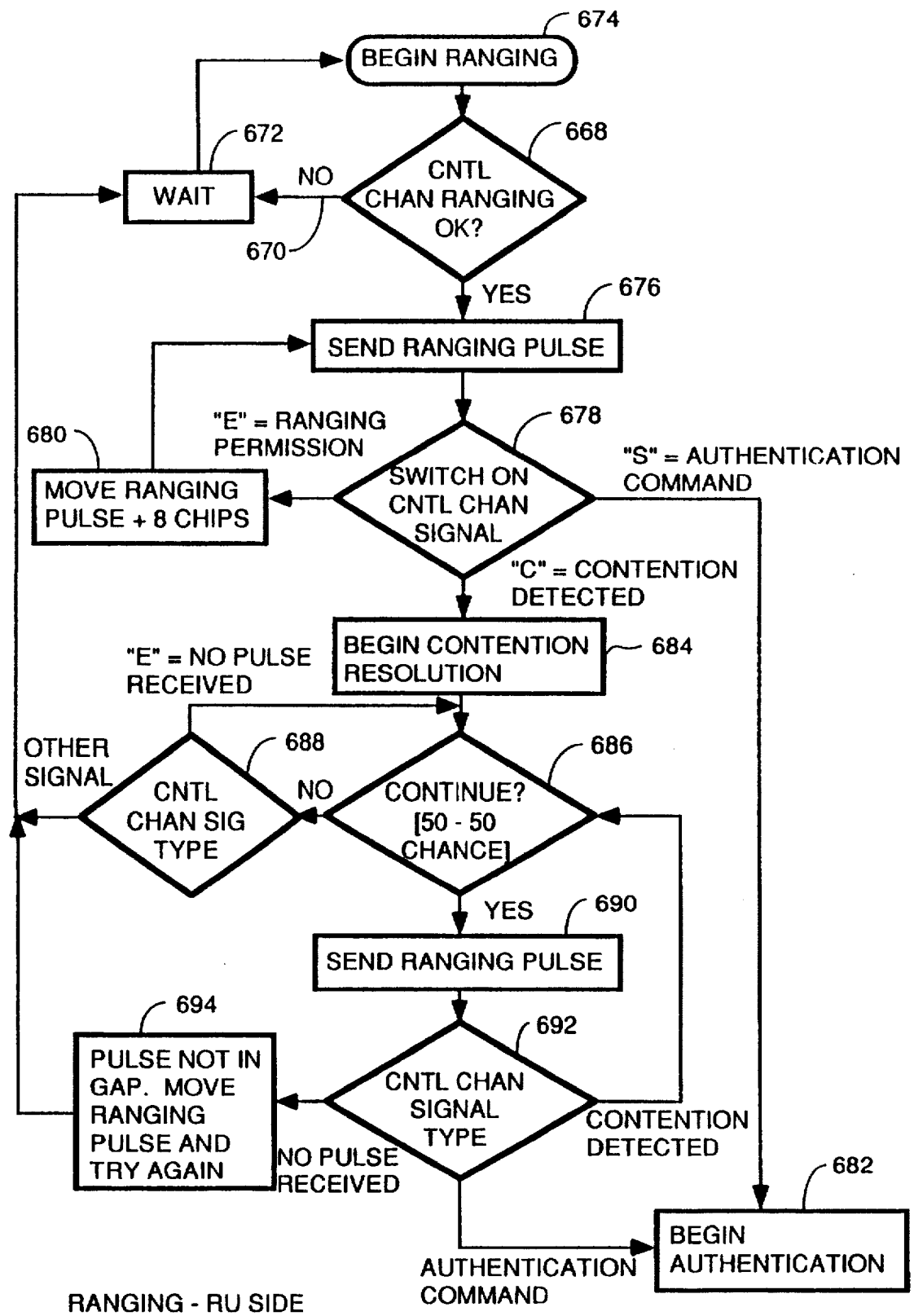
FIG. 32 is a flow chart representing one embodiment of the ranging or alignment and contention resolution process to achieve frame synchronization carried out by the RUs using a binary tree algorithm.

Referring to FIG. 32, there is shown a flow chart for a ranging process carried out by the RUs using a binary tree algorithm. The process starts with one or more RUs that are not in frame synchronization but which wish to achieve frame synchronization so as to be able to send data to the CU. These RUs first must synchronize their receivers to broadcasts on the control channel from the CU so that they can receive status commands from the CU which control their activities during the ranging process. The RUs can synchronize to the CU broadcasts themselves without assistance from or the need to send anything to the CU by recovering the system clock signal from the periodic broadcasts of the barker code signals every frame from the CU. Once this has happened, test 668 determines that control channel signals can be received and ranging can start. Until this happens, path 670 is taken to wait state 672 and block 674 to idle until the RU receiver synchronizes to the CU and can receive its broadcasts.

When RU receiver synchronization has been achieved, step 676 is performed to pick some arbitrary delay and send a ranging pulse using that delay. Test 678 is then performed to switch on the control channel signal and determine the state of the CU. If the CU did not find any ranging pulse in the gap, it broadcasts an E on the control channel.

Each RU then changes its delay by adding 8 chip times, as symbolized by block 680, and transitions to step 676 to send another ranging pulse. This process continues until one or more RUs set their delays such that their ranging pulses arrive in the gap. If the CU detects a single pulse in the gap, it broadcasts an S on the control channel which the RUs interpret as an authentication command. Each RU then transitions to step 682 to begin the authentication process, which has been previously described. Basically, the authentication process involves the RU sending its identification code as either a unique sequence of ranging pulse positions in the middle 8 chips of the gaps of multiple frames or as a unique sequence of the presence and absence of ranging pulses in the gaps of multiple frames.

If multiple RUs hit the same gap, test 678 finds that the CU is broadcasting a C on the control channel indicating that the RUs need to perform their contention resolution protocols, as symbolized by block 684. As symbolized by test 686, each RU then "flips a coin" to determine if it should contine and examines the outcome. If an RU decides not to continue, processing in that RU transitions to test 688 where the RU determines the control channel signal type. If an E is being broadcast, it means that all RUs that were ranging decided to stop, and processing returns to step 686 to "flip the coin" again. If test 688 determines that any other signal is being received, processing returns to block 672 and the ranging process starts over for that RU.

If the coin toss results in the RU deciding to continue ranging, step 690 is performed to send another ranging pulse. Then test 692 is performed to listen to the control channel and determine what the CU state is. If the CU found no pulse in the gap, step 694 is performed to move the ranging pulse, i.e., adjust the transmit frame timing delay, and try again. Accordingly, processing transitions back to test 668 through step 672. If the CU is broadcasting a C, more than one pulse has been detected in the gap, and processing returns to step 686 to flip the coin again to decide whether to continue ranging. If test 692 determines that the CU is broadcasting the S or authentication command, processing transitions to step 682 to begin authentication. After authentication, the CU sends fine tuning commands over the control channel to the RU which just authenticated itself to adjust the position of its ranging pulse to the center of the gap.

Figure 33:
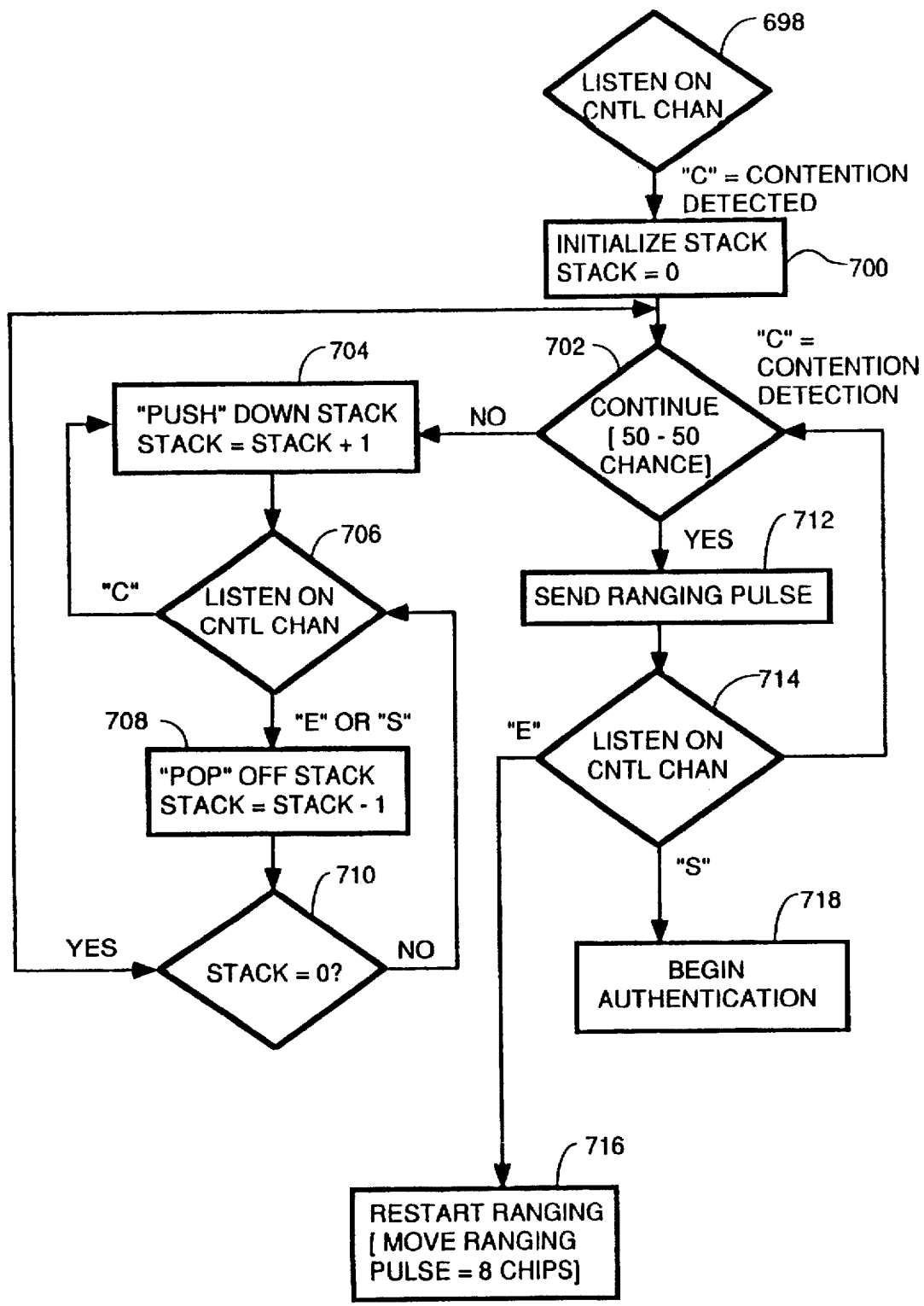
FIG. 33 is a flow chart representing another embodiment for a ranging and contention resolution process carried out by the RUs using a binary stack.

Referring to FIG. 33, there is shown a flow chart of the preferred process of ranging and contention resolution using a binary stack. This process is slightly faster than the binary tree algorithm in achieving alignment because in this process, the RU remembers upon which iteration it "failed", i.e., the coin toss after a contention caused the RU to stop attempting ranging. The process starts with step 698 to listen on the control channel. When a C is broadcast by the CU, step 700 is performed to initialize a binary stack to 0. This stack is used to keep track of the iteration number when the coin toss resulted in a decision to discontinue ranging. Next, step 702 "flips the coin" to make the decision as to whether to continue. If the decision is to not continue, step 704 is performed to push down the stack by setting the value on the stack to stack +1. Then test 706 is performed to listen again on the control channel and determine the CU state. If there is still a contention, step 704 is performed to increment the stack again. If test 706 determines that the CU says the gap is empty or only a single ranging pulse is in the gap, step 708 is performed to pop the stack, i.e., to set the stack value to stack −1 in step 708. Next, test 710 is performed to determine if the stack value has reached 0. If it has, processing returns to step 702 to flip the coin again to decide whether to resume ranging. If test 710 determines that the stack has not reached zero, test 706 is performed again to listen on the control channel.

Returning to the consideration of step 702, if the original coin toss caused the RU to decide to continue ranging, step 712 is performed to send a ranging pulse. Then test 714 is performed to listen on the control channel to determine the CU status. If a C is being broadcast, more than one RU is in the gap, and processing returns to step 702 to flip the coin again. If an E is being broadcast, the gap is empty and the delay for the next ranging pulse is adjusted by moving the pulse +8 chips and restarting the ranging process in step 716 by transitioning to step 600 on FIG. 29. If test 714 determines that the CU is broadcasting an S meaning a single pulse has been found in the gap, processing vectors to step 718 to begin the authentication process.

Preferred RU Receiver Block Diagram

Referring to FIG. 34, there is shown a block diagram of the preferred organization for a receiver for the RU modems. The quadrature amplitude modulated combined carrier arrives at the receiver on coaxial cable 24 or other media. An RF section detects the QAM modulation using a detector like that shown in FIG. 26, and outputs an analog signal on line 752 carrying the chip amplitude information for all time slots. The RF section also includes a passband filter having a center frequency centered on the frequency of the 6 mHz wide band carrying the chip data and having a 6 mHz bandwidth. The RF section also includes a variable gain amplifier that has a gain control input coupled to line 758 coupled to automatic gain control circuit 756. This signal is converted to digital information by A/D converter 754 which performs IF sampling as is known in the prior art was first described by Colinberg, whose papers are hereby incorporated by reference. The sampling rate is 4 times the symbol period. The advantage of using IF sampling is that it allows the use of one A/D converter to sample both the sine and cosine carriers. In alternative embodiments, two A/D converters may be used, each having a sample rate substantially greater than the symbol period.

The gain of the signal represented by the digital data output by the D/A converter is examined by automatic gain control (AGC) 756, and if the amplitude is not high enough, the AGC circuit generates a signal on line 758 to increase the gain of the variable gain amplifier in the RF section. The RF section is coupled to the local oscillator carrier frequency synthesizer 760 by a cable 762 so as to receive local sine and cosine carrier signals which match the frequency of the sine and cosine carriers used by the transmitters to QAM modulate the chips onto RF signals carried by the media.

Phase separation of the sine and cosine components of the QAM modulated data represented digitally on bus 760 is performed by matched filter 761. The matched filter has a filter characteristic that is the mirror image of the squared raised cosine filter characteristic of the shaping filter 570 in the transmitters, illustrated by FIG. 28A.

In an alternative embodiment, the output of of the matched filter 762 is filtered by a feed forward equalization (FFE) filter 764 which functions to cut down on precursor intersymbol interference. The FFE filter is an adaptive FIR filter. Adaptive FIR filters and many of the other digital signal processing components of the circuitry disclosed herein are known and are discussed in detail in Elliott, Handbook of Digital Signal Processing: Engineering Applications, (Academic Press, Inc. San Diego, 1987), ISBN 0-12-237075-9, which is hereby incorporated by reference. In the preferred embodiment, the FFE filter 764 is placed between circuits 765 and 767 to filter the data on bus 769.

Next, despreading of the data and reassembly of the appropriate data into the corresponding timeslots to undo the code shuffling that happened in the transmitters is performed. The first step in this process is accomplished by CDMA MUX 766. This multiplexer multiplies the incoming data by the transpose code matrix CT of the code matrix used by CDMA MUX 527 in the transmitters represented by FIG. 28A. The resulting despread data is stored in buffer memory 768 sequentially in the order of the individual code multiplications. The CDMA MUX 766 generates suitable read/write control signals to cause buffer 768 to sequentially store the despread data on bus 776 output by the CDMA MUX 766. A deshuffler circuit 770 receives the same seed number on bus 772 as was received by code diversity shufflers 506 in the transmitters and generates the same pseudorandom numbers as were generated from this seed during every symbol time (the receiver chip clocks are synchronized to the transmitter chip clocks). These pseudorandom numbers are used to generate read address pointers which are coupled to the address port of buffer 768 via address bus 774 along with suitable read/write control signals. The data stored at that address is then output by the buffer on bus 795 which is coupled to one of two inputs of a switch/multiplexer 791. Because the address pointers are generated in the same sequence as in the transmitters when shuffling data, the data read out of the buffer 768 is read out in the correct sequence to put the despread data back into the sequential order of the timeslots.

This deshuffling operation is not necessary if the receiver is located in an RU because the CU does not use code hopping for data it sends to the RUs. Therefore, in some embodiments of RU receivers buffer 768 and deshuffler 770 do not exist. In other embodiments, they do exist, but are not used and a switch 791 guides the despread data on bus 776 from the CDMA MUX 766 around buffer 768 and directly into the input of the amplifier 788. An RU/CU signal on line 793 controls the state of switch 791 such that either the data output bus 795 of buffer 768 or the bus 776 is coupled to input 789 of the amplifier 788. If the receiver is in a CU, bus 795 is coupled to bus 789, while if the receiver is in an RU, bus 776 is coupled to bus 789.

The despread data on bus 776 is simultaneously read by a crosstalk detector 778 which functions to determine the amount of interference between adjacent codes and also plays a role in clock recovery so that all RU and CU receivers and transmitters can be synchronized to the same clock. Crosstalk between channels encoded with adjacent cyclic, orthogonal codes always comes from adjacent channels and happens when the data encoded with adjacent cyclic CDMA codes do not arrive precisely aligned in time. In other words, to have zero crosstalk, the clock time at which the first chip of a symbol transmitted on one channel spread with a cyclic CDMA code arrives at the receiver must be exactly the same time as the clock time at which the first chip of a symbol transmitted on an adjacent channel spread with an adjacent cyclic code. A slippage of one chip clock means complete overlap and total crosstalk since adjacent cyclic codes are generated by shifting the code by one place to the right. A slippage or misalignment of less than one complete chip clock will mean that some crosstalk exists. The crosstalk detector detects the amount of crosstalk affecting each chip of each channel by subtracting the amplitude of a corresponding chip of the next sequential channel from the amplitude of the corresponding chip the next previous channel.

The amount of crosstalk or clock tracking error detected by the crosstalk detector 778 is fed on line 780 as an error signal to a control loop logic 781 which outputs a clock phase/frequency correction voltage on line 782. This signal is coupled to the phase/frequency control input of a voltage controlled crystal oscillator 784 which generates a clock reference signal on line 786.

Although a global automatic gain control adjustment was made by AGC 756, data is being received from many different RUs located at many different positions on the network. A separate gain control adjustment is desirable for each RU. Therefore, a variable gain amplifier 788 is employed to amplify each timeslot's data individually. The control loop logic 781 assists in this process by sending a desired gain signal on line 790 to amplifier 788 based upon inputs received on buses 792 and 794. The input on bus 792 is data identifying which particular timeslot's data is currently at the input 789 of the amplifier 788 and is generated by deshuffling circuit 770. The input on bus 794 is generated by a memory 796 which stores individual gain control numbers for each of the 128 payload channels (or all 144 channels in some embodiments). The control loop 781 uses the information received on bus 792 regarding which timeslot's data is currently being amplified to generate an address pointer to that timeslot's gain control number in memory 796. The control loop 781 then sends the address pointer to memory 796 via bidirectional bus 794 along with suitable read/write control signals and receives from the memory the gain control number. The control loop then places this gain control number on bus 790 to control the digital amplification process carried out by the amplifier 788.

When the receiver is located in an RU, the multiple timeslots being received from the CU all originate from the same location and the same transmitter so they all need to be amplified by the same gain. Therefore, in an RU receiver, memory 796 need only be a register that stores one gain.

The control loop 781 also has an input on bus 798 from slicer 800. The slicer includes circuitry to measure both gain and phase error for each channel's data. These errors are measured by circuitry in the slicer which compares the amplitude and phase of each received chip to the amplitude and phase of each possible legitimate chip position in the 16 chip constellation of FIG. 21. Recall that the constellation of FIG. 21 represents all the permissible 4 bit chips that can be part of a symbol. Each chip is comprised of 2 bits plus a sign bit which define the real or I axis coordinate and 2 bits plus a sign bit which define the imaginary or quadrature Q axis component. Therefore, in polar coordinates, each constellation point has a magnitude and phase. For example, in FIG. 21, chip 0010 has a magnitude and phase represented by vector 801. Assume that chip 0011, after transmission losses, crosstalk etc. get demodulated and the I and Q components after demodulation map to point 803 in the constellation having a magnitude and phase represented by vector 805. The circuitry in slicer 800 responsible for quantifying the magnitude and phase errors compares the magnitude and phase of vector 805 to the magnitude and phase of vector 801 and generates gain control error and phase error signals from the differences. The gain control error data for each timeslot is communicated to the control loop 781 via bus 798 and is used by the control loop to update the gain number stored in memory 796 for each corresponding timelot or channel.

The control loop uses the phase error data received from the slicer 800 on bus 798 to generate a phase rotation command on bus 802 to phase rotation circuit 765. The phase rotation circuit adjusts the amplified data on bus 789 representing each received chip so as to rotate the phase thereof to correct the phase error for that received chip. This is done by a matrix multiplication of the complex number representing each chip by cosine (theta) +j sine (theta) where theta is the amount of desired rotation.

The control loop 781 also uses the phase error data on bus 798 to generate a clock steering voltage on line 806 to alter the phase and/or frequency of a 4 mHz reference clock output on line 810 by a voltage controlled crystal oscillator. This 4 mHz reference frequency on line 810 is used by frequency synthesizer 760 to generate local sine and cosine carrier signals on line 762 that match the frequency of the sine and cosine carriers used in the QAM modulators in the transmitters (corresponding to carriers on lines 427 and 437 in FIG. 24). These local carriers are coupled to the RF section and are used there in a demodulator like that shown in FIG. 26 as the sine and cosine local carriers on lines 480 and 482, respectively.

The feed forward equalizer 764 functions to eliminate or substantially reduce precursor intersymbol interference, and a decision feedback equalizer 820 functions to reduce or eliminate post cursor intersymbol interference. If a transmitter were to send an impulse signal on one symbol with adjacent symbols empty, the receivers in an ideal system would receive the impulse with zeroes on either side of it. However, because of system impairments, the receivers will receive an impulse and there will be some nonzero data in symbols on either side of the impulse. The nonzero data in symbols that precede the impulse symbol in time are precursor intersymbol interference. The FFE circuit 764 removes this interference. The nonzero data in symbols that follow the impulse symbol in time is postcursor interference which is removed by the DFE circuit 820. Both the DFE and FFE circuits are FIR filters with adaptive coefficients which they receive on buses 842 and 844, respectively, from a least mean square calculation circuit 830. The FIR filters are given initial values for the adaptive coefficients that are close enough to allow the adaptation process to proceed. These preset coefficients are supplied via buses 824 and 822.

The adaptaption process for the FIR filters is carried out by a least mean squared calculation circuit 830. This circuit receives a signal on bus 831 from a difference calculation circuit 832. The difference calculation circuit calculates the error between the desired data on bus 836 and available data on bus 834 and outputs this error on bus 831. The least mean square (LMS) calculation circuit then correlates this error with the input data on bus 769 to the FFE and DFE FIR filters read via bus 838 (this assumes the FFE FIR filter is located at its preferred position just before subtractor 767 so as to receive data from bus 769 and output data to the + input of the subtractor 767). If the FFE FIR filter is located where shown in FIG. 34, bus 838 connects to bus 840 instead of bus 769. After the LMS calculation circuit makes this correlation, it send adaptation coefficients to the FIR filters via buses 842 and 844. The LMS circuit implements a calculation which is based upon the fact that the needed change in the adaptive coefficients to the adaptive FIR filters 764 and 820 is proportional to the error on bus 831 times the conjugate of the data being input to the filters. In other words, the error is multiplied by complex numbers representing the received chips which have had the signs of their Q or imaginary components inverted.

The DFE filter eliminates or reduces post cursor interference by supplying a subtraction value on bus 846 to subtractor 767. The data sent by the DFE filter on bus 846 is subtracted from the data on bus 769 (or from the output of the FFE filter, depending upon its position). Eliminating the precursor interference and post cursor interference from the data on the bus 834 allows the slicer 800 and a Viterbi Decoder 850 to make better decisions about what chips were actually sent despite the channel impairments. The LMS, DFE and FFE circuits can be eliminated in some simple embodiments with, for example, only 4 points in their constellations. But to get more data throughput, more complex constellations are needed, and in such a situation, the points are closer together and ISI interference makes decisional discrimination between the constellation points more difficult. This creates a need for the above described ISI elimination circuitry.

After correction for ISI interference, the corrected data is passed via bus 834 to slicer 800. The purpose of the slicer is to make instantaneous decisions regarding which point in the constellation each chip represents for purposes of generating the gain and phase errors needed by the control loop and for purposes of generating the desired data on bus 836. The slicer does not make used of the 4th redundant bit in each chip for this purpose, and, as a result, makes errors in interpreting chips. It is up to the Viterbi Decoder 850 to correct these errors of interpretation.

Viterbi Decoders are well known in the art. Basically, Viterbi Decoder 850 and memory 852 keep track of the present and last state for each timeslot for purposes of tracing a path through a three dimensional state defined by the constellation of permissible input points stretched out over a third axis representing time which is orthogonal to the I and Q axes. There is one of these three dimensional states for each timeslot. By making use of the redundant bit or bits in each chip, and examining the path the states of each timeslot take through the appropriate 3-D space over time, the Viterbi Decoder makes a better informed decision as to which legitimate point in the constellation of permissible points each received code represents. The information on bus 792 to the Viterbi Decoder from the deshuffler tells the Viterbi Decoder which timeslot during which each code received on bus 836 was transmitted. The Viterbi Decoder uses this information to generate an address pointer to memory 852 pointing to the state information for that timeslot. This allows memory 852 to output the state information which is used by the Viterbi Decoder to make its analysis.

After the Viterbi Decoder 850 outputs the correct data for each timeslot on bus 854, deframer 856 reassembles the data into the time division multiplexed timeslots in which these same data originally arrived at the transmitter for encoding and CDMA spreading. The resulting TDMA stream of 9-bit bytes is output on serial data format bus 858. Each 9-bit byte in this data stream is comprised of the deshuffled, descrambled three tribits into which it was originally broken in the framer to form the three symbols of the frame during which this 9-bit byte was transmitted.

The output bus 854 from the Viterbi Decoder 854 is also coupled to a command and control channel circuit 860 which stores and/or processes codes sent on the command and control channels in the downstream data. Some switching or multiplexing function to select the command and control codes out of the stream of data on bus 854 is provided but is not shown. Codes sent on the access channel in the upsteam data are stored and/or processed by an access channel circuit 862 which receives these codes from the output of the slicer via bus 836. The processing of the command and control channel codes and access channel codes may occur in circuits 860 and 862, respectively, or the codes may simply be buffered there until they can be read by a management and control process performed in other circuitry not shown.

The ranging process in its various embodiments described earlier herein is carried out in the R/Tng circuit 763. This circuit receives an RU/CU signal on line 759 which tells the circuit whether it is performing its function in an RU or a CU. If it is performing its function in an RU, circuit 763 carries out those functions indicated for any selected one of the embodiments of the CU in the ranging, contention resolution and authentication flow charts of FIGS. 7A–7C, 8, 9 and 29–33. These functions include listening on the control channel and receiving data from the CU via bus 755 as to how many ranging pulses appeared in the gap, contention resolution and communication with the ranging circuit 510 in the transmitter via bus 757. These messages to the transmitter on bus 757 include telling the transmitter ranging circuit 510 when the barker code or other signal from the CU has been received in each frame (transmission 80 in FIG. 4B) thereby establishing the receive frame timing reference, whether to transmit another ranging pulse after contention resolution, and how to adjust the delay factor that establishes the transmit frame timing reference before sending each ranging pulse or barker code, and, in some embodiments, what barker code to transmit. Further, the circuit 763 receives data from the CU indicating when authentication is desired and sends data to the transmitter ranging circuit 510 telling it when to start sending that particular RUs authentication code. Circuit 763 also monitors the authentication code broadcast by the CU after an authentication interval to determine if it is the RU that hit the gap and, if so, sends message to the transmitter to freeze its current value for the transmit frame timing reference delay at the value last used for transmission of the ranging pulses in the authentication code sequence ("training" the transmit frame timing delay to achieve frame synchronization). The circuit 763 also monitors the control channel for instructions from the CU on how to adjust its transmit frame timing reference delay to exactly center the ranging pulse in the center of the gap.

If the signal on line 759 indicates the receiver of FIG. 34 is operating in a CU, the circuit 763 carries out those functions indicated for any selected one of the embodiments of the CU in the ranging, contention resolution and authentication flow charts of FIGS. 7A–7C, 8, 9 and 29–33. Those functions include: setting and determining CU transmit frame timing delay (barker code alignment triggering transmission 135 in FIG. 6), monitoring gaps for receipt of barker codes during ranging by performing cross correlation between the barker code sent by the CU (or a known barker code if the CU sends some other "every frame" signal to establish each RUs receive frame timing reference), determining how many barker codes have appeared in the gap during ranging and authentication and determining how many RUs have their timing set to hit the gap, determining the position of the barker code(s) in the gap, ordering changes of position of the barker code in the gap, scanning the gap for additional unwanted pulses at the edges of the gap, sending signals to the transmitter via bus 757 telling it what messages to broadcast on the control channel such as "no codes in gap-adjust your delays and try again", "one code in gap", "multiple codes in gap-enter contention resolution", "move barker codes x chips left or right", "saw sequence xxxxxxx in gaps during authentication frames", "no activity in gap during authentication interval-reexecute your contention resolution protocols" etc. Circuit 763 may be implemented with a suitably programmed microprocessor on both the RU and CU side.

Clock Recovery

The RUs cannot begin the process of ranging until they have synchronized to the master clock of the system. The master clock runs in the CU and is encoded into the downstream data sent from the CU to the RUs during the gaps. The downstream data is comprised of the barker codes sent every frame by the CU to the RUs during the gaps between frames. All the RUs synchronize to this downstream data by extracting the master clock signal therefrom thereby achieving clock synchronization and frame synchronization. Frame synchronization, as that term is used in the clock recovery context, only means the RUs know when the CUs frames start. Frame synchronization, as the term is used for ranging or training purposes, refers to the establishment of the proper transmit frame timing reference delays in each RU such that each RU hits the middle of the gap with its ranging pulses such that all symbols transmitted by each RU, regardless of differences in location and propagation delay arrive simultaneously at the CU for despreading. Clock recovery from the barker codes transmitted during the gaps is done using phase lock loop 880, voltage controlled oscillator 784, phase detector 778, control loop 781 and loop filter in frame detector 882 in FIG. 34. The phase detector 778 determines the phase error by comparing the phase of the clock signal derived from the barker code received from the CU to the phase of the local oscillator clock generated by the PLL 880 and generates a phase error signal on bus 780. This phase error signal is passed by control loop 781 to the voltage controlled oscillator 784 which changes its frequency in a direction to eliminate the phase error. The phase of the local oscillator clock is derived from a signal on bus 884 from time base generator 886. The time base generator generates the needed bit clock, byte clock, chip clock and other timing signals from the local oscillator signal received on line 888.

Although the teachings of the invention have been presented herein in terms of a few preferred and alternative embodiments, those skilled in the art will appreciate numerous modifications, improvement and substitutions that will serve the same functions without departing from the true spirit and scope of the appended claims. All such modifications, improvement and substitutions are intended to be included within the scope of the claims appended hereto.

What is claimed is:

1. A method for transmitting multiple channels of digital data simultaneously over a cable television media carrying cable television programming, comprising:

receiving multiple channels of digital data;

selecting portions of said digital data from each channel and organizing said portions as an information vector having n elements;

performing code division multiplexing by performing a matrix multiplication of said information vector times a code matrix comprised of n orthogonal spreading codes, each code comprising one row or one column of said code matrix and having n elements, said matrix multiplication generating a result vector having n elements, each element comprised of the sum of the partial products of multiplication of each of the n elements of said information vector times the n elements of one of said orthogonal spreading codes;

modulating the n elements of said result vector onto one or more radio frequency carriers and transmitting the resulting radio frequency carriers on a cable television media carrying cable television programming while limiting the overall bandwidth of the resulting radio frequency signals so as to not interfere with said cable television programming.

2. The process of claim 1 wherein the step of modulating the n elements of said result vector onto one or more radio frequency carriers comprises the step of dividing each of said n elements of said result vector into an inphase and a quadrature part, and modulating the amplitude of a first radio frequency carrier during successive times using the inphase parts of each of said n elements of said result vector, and modulating the amplitude of a second radio frequency carrier during the same successive times using the quadrature parts of each of said n elements of said result vector, said second radio frequency carrier having the same frequency as said first radio frequency carrier but differing in phase by 90 degrees, and summing the two resulting radio frequency carriers and placing the summed signal on said cable television media.

3. The process of claim 1 wherein the step of performing code division multiplexing includes the steps of changing the particular orthogonal code each element of each new information vector is multiplied by while calculating said partial products which are summed to generate the individual elements of each new result vector.

4. The process of claim 3 wherein said orthogonal codes are cyclic codes, and wherein the step of changing the orthogonal codes the elements of each new information vector are multiplied by includes the steps of pseudorandomly selecting the particular orthogonal code each new information vector is multiplied by to generate the partial products which are summed to generate each element of each new result vector.

5. A method for transmitting to a central unit multiple channels of digital data generated by a plurality of sources coupled to a plurality of physically distributed remote units which are coupled to said central unit via a cable television media designed to carry radio frequency signals, said multiple channels of digital data being transmitted simultaneously over said cable television media as a plurality of frames of digital data, said cable television media also carrying frequency division multiplexed cable television programming, comprising:

receiving one or more channels of digital data at each remote unit;

at each remote unit, constructing an information vector by selecting portions of said digital data from each channel of digital data received at said remote unit and organizing said portions as selected elements of said information vector having n elements where each element of said information vector corresponds to one of said channels but wherein any element of said information vector corresponding to a channel from which no data is received by any particular remote unit is set to zero;

at each remote unit, performing code division multiplexing by performing a matrix multiplication of the information vector generated at said remote unit times a code matrix comprised of n orthogonal spreading codes, each code comprising one row or one column of said code matrix and having n elements, said matrix multiplication generating a result vector having n elements, each element of said result vector comprised of the sum of the partial products of multiplication of each of the n elements of said information vector times the n elements of one of said orthogonal spreading codes, and wherein zero elements of said information vector cause zero elements in said result vector;

at each remote unit, modulating the n elements of said result vector onto one or more radio frequency carriers;

summing the one or more radio frequency carriers generated by each remote unit with one or more radio frequency carriers generated by other remote units and transmitting the resulting radio frequency carriers on a cable television media carrying cable television programming while limiting the overall bandwidth of the resulting radio frequency signals so as to not interfere with said cable television programming.

6. The process of claim 5 wherein said channels of digital data received by each remote unit are received in the form of a time division multiplexed data stream comprised of a plurality of timeslots wherein each timeslot contains one or more data bits from one channel such that all channels have a timeslot into which data from that channel may be tranmitted in said time division multiplexed data stream to a remote unit.

7. The process of claim 6 wherein said step of constructing said information vector comprises the steps of storing a portion of the bits from each timeslot as a corresponding element of said information vector, and wherein each said frame of data transmitted from each remote unit to said central unit comprises transmission of data generated from a sufficient number of code division multiplexed information vectors so as to code division spread all data from all timeslots to be transmitted during a single frame.

8. The process of claim 7 wherein each timeslot contains 9 bits, 8 of which are data from any source external to said remote unit and the 9th bit of which is available to send miscellaneous command and control information from the remote unit to said central unit, and wherein data from three information vectors are code division multiplexed from each remote unit to said central unit during each frame, and wherein each information vector is constructed at a remote unit by placing 3 bits from each timeslot containing data received at a remote unit into an element of said information vector, and repeating this process for each of said three information vectors constructed during each frame so as to transmit all 9 bits from each timeslot containing data during a frame.

9. The process of claim 7 wherein each timeslot contains a number of bits divisible by an integer of 1 or more, said integer being the number of symbols to be transmitted during each frame, and wherein the process of constructing said information vector comprises taking from each timeslot as an element of said information vector a predetermined number of bits equal to the total number of bits in each timeslot divided by said integer.

10. A method for transmitting to a central unit a plurality of frames of data generated by a plurality of physically distributed remote units which receive a plurality of channels of digital data generated by a plurality of sources coupled to said plurality of physically distributed remote units, said plurality of remote units being coupled to said central unit via a cable television media designed to carry radio frequency signals, said multiple channels of digital data being transmitted simultaneously over said cable television media as said plurality of frames, said cable television media also carrying frequency division multiplexed cable television programming, comprising:

establishing frame synchronization at each remote unit by determining a transmit frame timing reference delay for each said remote unit such that, when each remote unit transmits data using that remote unit's transmit frame timing reference delay, said data will arrive at said central unit with its frame boundaries aligned in time with the frame boundaries of frames tranmitted from other remote units;

receiving one or more channels of digital data at each remote unit where said channels of digital data received by each remote unit are received in the form of a time division multiplexed data stream comprised of a plurality of timeslots wherein each timeslot contains one or more data bits from one channel such that all channels have a timeslot into which data from that channel may be tranmitted in said time division multiplexed data stream to a remote unit, and wherein each timeslot contains a number of bits divisible by an integer of 1 or more, said integer being the number of symbols to be transmitted during each frame;

at each remote unit, constructing an information vector having n elements by selecting portions of the bits of said digital data from each timeslot of digital data received at said remote unit and organizing said portions of bits as selected elements of said n elements of said information vector, where each element of said information vector corresponds to one of said timeslots but wherein any element of said information vector corresponding to a timeslot from which no data is received by any particular remote unit is set to zero, and wherein each said frame of data transmitted from each remote unit to said central unit comprises transmission of data generated from a sufficient number of code division multiplexed information vectors so as to code division spread all data from all timeslots to be transmitted during a single frame, and wherein the process of constructing said information vector comprises taking from each timeslot as an element of said information vector a predetermined number of bits equal to the total number of bits in each timeslot divided by said integer and encoding each predetermined number of bits taken from each timeslot with one or more redundant bits and storing said predetermined number of bits taken from each timeslot plus the redundant bits as an element of said information vector, said redundant bits being calculated based upon the present state of said predetermined number of bits taken from each timeslot and upon the previous state of these same predetermined bits for this same timeslot during the last frame, said calculation being performed using an algorithm designed to generate redundant bits which will aid a Viterbi Decoder in a receiver in said central unit to better determine from received data corrupted by media impairments what said predetermined bits were prior to encoding with said redundant bits;

at each remote unit, performing code division multiplexing by performing a matrix multiplication of the information vector generated at said remote unit times a code matrix comprised of n orthogonal spreading codes, each code comprising one row or one column of said code matrix and having n elements, said matrix multiplication generating a result vector having n elements, each element of said result vector comprised of the sum of the partial products of multiplication of each of the n elements of said information vector times the n elements of one of said orthogonal spreading codes, and wherein zero elements of said information vector cause zero elements in said result vector;

at each remote unit, modulating the n elements of said result vector onto one or more radio frequency carriers and transmitting each frame of modulated radio frequency signals to said central unit using the transmit frame timing reference delay determined for this particular remote unit so as to achieve upstream frame synchronization with other remote units;

summing the one or more radio frequency carriers generated by each remote unit with one or more radio frequency carriers generated by other remote units and transmitting the resulting radio frequency carriers on a cable television media carrying cable television programming while limiting the overall bandwidth of the resulting radio frequency signals so as to not interfere with said cable television programming.

11. The process of claim 10 wherein the step of code division multiplexing of said information vector each element of which is comprised of said predetermined number of bits from each timeslot plus one or more redundant bits results in said result vector having elements comprised of a second predetermined number of bits, and wherein said step of modulating said n elements of said result vector comprises the steps of dividing said second predetermined number of bits of each result vector element into a first predetermined number of I bits and a second predetermined number of Q bits, and using said I bits to modulate the amplitude of a first radio frequency carrier having a frequency selected so as to not interfere with said frequency division multiplexed cable television programming, and using said Q bits to modulate the amplitude of a second radio frequency carrier having the same frequency as said first radio frequency carrier but leading or lagging in phase from the phase of said first radio frequency carrier by 90 degrees, and summing the two resulting amplitude modulated radio frequency carriers for transmission on said cable television media.

12. The process of claim 10 wherein the step of performing code division multiplexing includes the steps of occasionally changing the particular orthogonal code each element of each new information vector is multiplied by while calculating said partial products which are summed to generate the individual elements of each new result vector.

13. The process of claim 10 wherein the step of occasionally changing the orthogonal codes the elements of each new information vector are multiplied by includes the steps of pseudorandomly selecting the particular orthogonal codes the elements of each new information vector are multiplied by to generate the partial products which are summed to generate each element of each new result vector.

14. The process of claim 10 wherein the step of performing code division multiplexing includes the steps of changing the particular orthogonal code each element of each new information vector is multiplied by while calculating said partial products which are summed to generate the individual elements of each new result vector.

15. The process of claim 14 wherein the step of changing the orthogonal codes the elements of each new information vector are multiplied by to generate said partial products which are summed to generate each element of said result vector includes the steps of pseudorandomly selecting the particular orthogonal codes the elements of each new information vector are multiplied by to generate the partial products which are summed to generate each element of each new result vector, and wherein said central unit uses the same pseudorandom sequence to determine which codes have been used to code division multiplex the elements of each information vectors for purposes of demultiplexing.

16. A method for transmitting to a central unit multiple channels of digital data generated by a plurality of sources coupled to a plurality of remote units which are coupled to said central unit via a cable television media designed to carry radio frequency signals but which are physically distributed from said central unit, said multiple channels of digital data being transmitted simultaneously over said cable television media as a plurality of frames of digital data, each said frame being separated from adjacent frames by guardbands, said cable television media also carrying frequency division multiplexed cable television programming, comprising:

establishing frame synchronization at each remote unit by determining a transmit frame timing delay for each said remote unit, said transmit frame timing delay for each said remote unit being established by a trial and error process of setting an initial value for said transmit frame timing delay and transmitting a timing signal during a frame, said timing signal recognizable by said central unit as a timing signal and monitoring a guardband following said frame during which said timing signal was transmitted with said central unit to determine if said timing signal appeared in said guardband, and transmitting a signal from said central unit indicating whether or not said timing signal appeared in said guardband, and, if said remote unit determines from the transmission from said central unit that a timing signal did not appear in said guardband, adjusting said transmit frame timing delay to a new value and retransmitting a new timing signal, and monitoring a guardband following the frame during which said new timing signal was transmitted with said central unit and transmitting from said central unit a signal indicating whether a timing signal appeared in said guardband, and, when said remote unit determines from said transmission from said central unit that a timing signal has appeared in said guardband, transmitting from said remote unit an identification code using the latest value for said transmit frame timing delay, said identification code indicating the identity of said remote unit, and monitoring said guardbands for said identification code with said central unit and transmitting a message from said central unit indicating which identification code was received, and monitoring said transmission with said remote units and comparing in each remote unit the identification code received by said central unit with the remote unit's identification code, and, if there is a match, stopping the process of adjusting said transmit frame timing delay value, and subsequently using the transmit frame timing delay value that resulted in said timing signal arriving during a guardband for all subsequent transmissions from said remote unit whose identification code was received from said central unit, and repeating the above described frame synchronization process for each remote unit that needs to achieve frame synchronization until frame synchronization is achieved, such that, when more than one remote unit transmits data using their respective transmit frame timing delays, said data from all transmitting remote units will arrive at said central unit simultaneously;

receiving one or more channels of digital data at each remote unit;

at each remote unit, constructing an information vector by selecting portions of said digital data from each channel of digital data received at said remote unit and organizing said portions as selected elements of said information vector having n elements where each element of said information vector corresponds to one of said channels but wherein any element of said information vector corresponding to a channel from which no data is received by any particular remote unit is set to zero;

at each remote unit, performing code division multiplexing by performing a matrix multiplication of the information vector generated at said remote unit times a code matrix comprised of n orthogonal spreading codes, each code comprising one row or one column of said code matrix and having n elements, said matrix multiplication generating a result vector having n elements, each element comprised of the sum of the partial products of multiplication of each of the n elements of said information vector times the n elements of one of said orthogonal spreading codes, and wherein zero elements of said information vector cause zero elements in said result vector;

at each remote unit, after frame synchronization has been achieved by that remote unit, modulating the n elements of said result vector onto one or more radio frequency carriers;

summing the one or more radio frequency carriers generated by each remote unit with one or more radio frequency carriers generated by other remote units and transmitting the resulting radio frequency carriers on a cable television media carrying cable television programming while limiting the overall bandwidth of the resulting radio frequency signals so as to not interfere with said cable television programming.

17. The process of claim 16 wherein said channels of digital data received by each remote unit are organized by said remote unit in the form of a time division multiplexed data stream comprised of a plurality of timeslots wherein each timeslot contains one or more data bits from one channel assigned to said remote unit by said central unit.

18. The process of claim 17 wherein said step of constructing said information vector comprises the steps of storing a portion of the bits from each timeslot as a corresponding element of said information vector, and wherein each said frame of data transmitted from each remote unit to said central unit comprises transmission of data generated from a sufficient number of code division multiplexed information vectors so as to code division multiplex all data from all timeslots to be transmitted during a single frame.

19. The process of claim 18 wherein each timeslot contains 9 bits, 8 of which are data from any source external to said remote unit and the 9th bit of which is available to send miscellaneous command and control information from the remote unit to said central unit, and wherein data from three information vectors are code division multiplexed from each remote unit to said central unit during each frame, and wherein each information vector is constructed at a remote unit by placing 3 bits from each timeslot containing data received at a remote unit into an element of said information vector, and repeating this process for each of said three information vectors constructed during each frame so as to transmit all 9 bits from each timeslot containing data during a frame.

20. The process of claim 18 wherein each timeslot contains a number of bits divisible by an integer of 1 or more, said integer being the number of symbols to be transmitted during each frame, and wherein the process of constructing said information vector comprises taking from each timeslot as an element of said information vector a predetermined number of bits equal to the total number of bits in each timeslot divided by said integer.

21. The process of claim 20 wherein the step of constructing said information vector is carried out by encoding each predetermined number of bits taken from each timeslot with one or more redundant bits prior to performing said code division multiplexing and storing said predetermined number of bits taken from each timeslot plus the redundant bits as an element of said information vector, said redundant bits being calculated based upon the present state of said predetermined number of bits taken from each timeslot and upon the previous state of these same predetermined number of bits for this same timeslot during the last frame, said calculation being performed using an algorithm designed to generate redundant bits which will aid a Viterbi Decoder in a receiver in said central unit to better determine from received data corrupted by media impairments what said predetermined bits were prior to encoding with said redundant bits.

22. The process of claim 21 wherein the step of code division multiplexing of said information vector each element of which is comprised of said predetermined number of bits from each timeslot plus one or more redundant bits results in said result vector having elements comprised of a second predetermined number of bits, and wherein said step of modulating said n elements of said result vector comprises the steps of dividing said second predetermined number of bits of each result vector element into a first predetermined number of I bits and a second predetermined number of Q bits, and using said I bits to modulate the amplitude of a first radio frequency carrier having a frequency selected so as to not interfere with said frequency division multiplexed cable television programming, and using said Q bits to modulate the amplitude of a second radio frequency carrier having the same frequency as said first radio frequency carrier but leading or lagging in phase from the phase of said first radio frequency carrier by 90 degrees, and summing the two resulting amplitude modulated radio frequency carriers for transmission on said cable television media.

23. The process of claim 16 wherein the step of performing code division multiplexing includes the steps of changing the particular orthogonal code each element of each new information vector is multiplied by while calculating said partial products which are summed to generate the individual elements of each new result vector.

24. The process of claim 23 wherein the step of frequently changing the orthogonal codes the elements of each new information vector are multiplied by includes the steps of pseudorandomly selecting the particular orthogonal code each new information vector is multiplied by to generate the partial products which are summed to generate each element of each new result vector.

25. The process of claim 22 wherein the step of performing code division multiplexing includes the steps of changing the particular orthogonal code each element of each new information vector is multiplied by while calculating said partial products which are summed to generate the individual elements of each new result vector.

26. The process of claim 25 wherein the step of changing the orthogonal codes the elements of each new information vector are multiplied by includes the steps of pseudorandomly selecting the particular orthogonal code each new information vector is multiplied by to generate the partial products which are summed to generate each element of each new result vector.

27. An apparatus for transmitting multiple channels of digital data from a remote unit to a central unit over a shared transmission media using synchronous code division multiple access modulation, comprising:

means for accepting incoming data of a time division multiple access stream comprised of N time slots or channels each of which contains one or more bits of digital data and spreading the data of said N channels over a frame comprised of M contiguous symbols and a guardband during which no data from said time divsion multiple access stream is transmitted, said spreading being carried out by reorganizing said data from said N channels into said M information vectors each comprised of a plurality of subgroups of bits from said time divsion multiple access stream, each information vector containing at least one subgroup of data from each said channel;

means for encoding said M information vectors using a plurality of orthogonal codes to generate M result vectors and using said result vectors to modulate radio frequency carrier signals using M-ary QAM modulation and for transmitting said modulated radio frequency carrier signals over said shared transmission media said composition of said information vectors and said encoding said information vectors using orthogonal codes being such that the temporal relationships of the data bits in said time divsion multiple access stream is altered in said symbols, and such that when modulated radio frequency carrier is transmitted over said shared transmission media, the energy distribution of the signals resulting from said data from said N channels is spread out over substantially all of said frame;

means for adjusting the timing of said transmission of each frame from said remote unit to said central unit such that each transmitted frame arrives at said central unit aligned in time with frame timing established by said central unit.

* * * * *